United States Patent [19]
Akizawa et al.

[11] Patent Number: 5,603,003
[45] Date of Patent: Feb. 11, 1997

[54] HIGH SPEED FILE ACCESS CONTROL METHOD AND COMPUTER SYSTEM INCLUDING A PLURALITY OF STORAGE SUBSYSTEMS CONNECTED ON A BUS

[75] Inventors: Mitsuru Akizawa, Hachioji; Kanji Kato, Tokorozawa; Hiroyoshi Suzuki, Yokohama; Toshiyuki Maki, Isehara; Hirofumi Yamashita, Kokubunji; Akira Kito, Ebina; Hidenori Yamada, Hadano, all of Japan

[73] Assignees: Hitachi, Ltd., Tokyo; Hitachi Computer Engineering Co., Ltd., Kanagawa, both of Japan

[21] Appl. No.: 24,462

[22] Filed: Mar. 1, 1993

[30] Foreign Application Priority Data

Mar. 4, 1992 [JP] Japan .................................. 4-46685
Sep. 25, 1992 [JP] Japan .................................. 4-256156

[51] Int. Cl.⁶ .............................. G06F 12/08; G06F 13/00
[52] U.S. Cl. .................... 395/441; 395/821; 395/280; 395/440
[58] Field of Search ................................ 395/440, 441, 395/821, 824, 832, 840, 841, 872, 878, 280, 494, 495, 496, 497.04, 419

[56] References Cited

U.S. PATENT DOCUMENTS

| | | | |
|---|---|---|---|
| 4,314,331 | 2/1982 | Porter et al. | 395/425 |
| 4,958,351 | 9/1990 | Flora et al. | 371/40.1 |
| 5,128,810 | 7/1992 | Halford | 360/39 |
| 5,129,088 | 7/1992 | Auslander et al. | 395/700 |
| 5,206,943 | 4/1993 | Callison et al. | 395/425 |
| 5,218,689 | 6/1993 | Hotle | 395/425 |
| 5,274,799 | 12/1993 | Brant et al. | 395/575 |
| 5,303,244 | 4/1994 | Watson | 371/10.1 |
| 5,321,826 | 6/1994 | Ushiro | 395/425 |
| 5,371,855 | 12/1994 | Idleman et al. | 395/250 |
| 5,402,428 | 3/1995 | Kakuta et al. | 371/10.1 |

Primary Examiner—Matthew M. Kim
Attorney, Agent, or Firm—Fay, Sharpe, Beall, Fagan, Minnich & McKee

[57] ABSTRACT

In a computer system having an interface with an I/O bus given disconnect/reconnect functions and a plurality of magnetic disk subsystems connected with the I/O bus, control divides a file at a disk access time with reference to disk management information, file management information and file descriptor translation information to read/write a plurality of such files asynchronously. Thus, high speed file access can be realized by only the plurality of magnetic disk subsystems without requiring any special control hardware. A corresponding relation between subfiles in a virtual directory and the application request file can be taken to construct the directory, thus making the divided storage transparent to the application.

50 Claims, 51 Drawing Sheets

FIG. 7

| | DISK MANAGEMENT TABLE | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va0 | va0 | va0 | va0 | | | |
| 0 | hd00= va000 | hd10= va001 | hd20= va002 | hd30= va003 | | | hd60 |
| 1 | | | | | | | hd61 |
| 2 | va020 | va021 | va022 | va023 | | | hd62 |
| 3 | | | | | | | hd63 |
| 4 | | | | | | | hd64 |
| 5 | | | | | | | hd65 |

PARTITION NUMBER

| FILE DESCRIPTOR OF MASTER FILE | FILE DESCRIPTOR OF SUBFILE | | | | | | |
|---|---|---|---|---|---|---|---|
| vfd | fd0 | fd1 | fd2 | fd3 | fd4 | fd5 | fd6 |
| 4 | 5 | 6 | 7 | 8 | | | |
| 20 | 21 | 22 | 23 | 24 | | | |
| | | | | | | | |
| | | | | | | | |

| FILE DESCRIPTOR OF MASTER FILE | FILE DESCRIPTOR OF SUBFILE | | | | | | |
|---|---|---|---|---|---|---|---|
| vfd | fd0 | fd1 | fd2 | fd3 | fd4 | fd5 | fd6 |
| 4 | | | | | | | |
| 20 | | | | | | | |
| | | | | | | | |
| | | | | | | | |

| FILE DESCRIPTOR OF MASTER FILE | FILE DESCRIPTOR OF SUBFILE | | | | | | |
|---|---|---|---|---|---|---|---|
| vfd | fd0 | fd1 | fd2 | fd3 | fd4 | fd5 | fd6 |
| 5 | 6 | 7 | 8 | | | | |
| 21 | 22 | 23 | 24 | | | | |
| | | | | | | | |
| | | | | | | | |

FIG. 23

| | DISK MANAGEMENT TABLE ||||||| 
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va0 | va0 | va0 | va0 | | | |
| 0 | va000 | va001 | va002 | va003 | | | |
| 1 | va000 | va001 | va002 | va003 | | | |
| 2 | va000 | va001 | va002 | va003 | | | |
| 3 | va000 | va001 | va002 | va003 | | | |
| 4 | va000 | va001 | va002 | va003 | | | |
| 5 | va000 | va001 | va002 | va003 | | | |

PARTITION NUMBER

FIG. 25

| | | DISK MANAGEMENT TABLE 210 | | | | | |
|---|---|---|---|---|---|---|---|
| id NUMBER | | 0 | 1 | 2 | 3 | 4 | 5 | 6 |
| NAME | | hd0 | hd1 | hd2 | hd3 | hd4 | hd5 | hd6 |
| VIRTUAL ARRAY SUBSYSTEM | | va0 | va0 | va0 | va0 | | | |
| PARTITION NUMBER | 0 | va000 | va001 | va002 | va003 ← va00 | | | |
| | 1 | | | | | | | |
| | 2 | | | | | | | |
| | 3 | | | | | | | |
| | 4 | | | | | ← va0 | | |
| | 5 | | | | | | | |

FIG. 27

| | DISK MANAGEMENT TABLE | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va0 | va0 | va0 | va0 | | | |
| 0 | va000 | va001 | va002 | va003 | va00 | | |
| 1 | va010 | va011 | va012 | va013 | va01 | | |
| 2 | va020 | va021 | va022 | va023 | va02 | | |
| 3 | | | | | | | |
| 4 | | | | | va0 | | |
| 5 | | | | | | | |

210

PARTITION NUMBER

FIG. 29

| | | \multicolumn{7}{c}{DISK MANAGEMENT TABLE} | | | | | | | |
|---|---|---|---|---|---|---|---|
| \multicolumn{2}{c}{id NUMBER} | 0 | 1 | 2 | 3 | 4 | 5 | 6 |
| \multicolumn{2}{c}{NAME} | hd0 | hd1 | hd2 | hd3 | hd4 | hd5 | hd6 |
| \multicolumn{2}{c}{VIRTUAL ARRAY SUBSYSTEM} | va0 | va0 | va0 | va0 | va1 | va1 | |
| | 0 | va000 | va001 | va002 | va003 | va100 | va101 | |
| | 1 | | | | | | | |
| | 2 | | | | | | | |
| | 3 | | | | | | | |
| | 4 | | | | | | | |
| | 5 | | | | | | | |

PARTITION NUMBER

FIG. 31

| | DISK MANAGEMENT TABLE 210 | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va0 | va0 | va0 | va0 | va1 | va1 | |
| 0 | va000 | va001 | va002 | va00 / va003 | va100 | va101 | va10 |
| 1 | va010 | va011 | va012 | va01 / va013 | va110 | va111 | va11 |
| 2 | va020 | va021 | va022 | va02 / va023 | va120 | va121 | va12 |
| 3 | | | | | | | |
| 4 | | | | | | | |
| 5 | | | | | | | |

PARTITION NUMBER       va0              va1

FIG. 33

| | DISK MANAGEMENT TABLE 210 | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va0, va1 | va0 | va0, va1 | va1 | va0 | | va0 |
| PARTITION NUMBER 0 | va000 | | va001 | | va002 | | va003 |
| 1 | va010 | va011 | va012 | va013 | | | |
| 2 | va020 | | va021 | | va022 | | va023 |
| 3 | | | | | | | |
| 4 | | | | | | | |
| 5 | | | | | | | | va00 → row 0 (va000, va001, va002, va003)
va11 → row 1 (va010–va013)
va02 → row 2 (va020–va023)
va1 → columns 0–3
va0 → columns 0, 1, 2, 4, 6

FIG. 35

| | | DISK MANAGEMENT TABLE | | | | | | |
|---|---|---|---|---|---|---|---|---|
| | id NUMBER | 0 | 1 | 2 | 3 | 4 | 5 | 6 |
| | NAME | hd0 | hd1 | hd2 | hd3 | hd4 | hd5 | hd6 |
| | VIRTUAL ARRAY SUBSYSTEM | va0 | va0 | va1 | va1 | | | |
| PARTITION NUMBER | 0 | va000-p0 | va001-p0 | va100-b0 | va101-b0 | | | |
| | 1 | va00-p0 | | va10-b0 | | | | |
| | 2 | | | | | | | |
| | 3 | | | | | | | |
| | 4 | | | | | | | |
| | 5 | | | | | | | | va0, va1

FIG. 37

| | DISK MANAGEMENT TABLE | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va1 | va1 | va1 | va1 | | | |
| 0 | | | | | | | |
| 1 | va110 -p1 | va111 -p1 | va112 -p1 | va113 -p1 | va11-p1 | | |
| 2 | va120 -b1 | va121 -b1 | va122 -b1 | va123 -b1 | va12-b1 | | |
| 3 | | | | | | | |
| 4 | | | | | | | |
| 5 | | | | | | | |

PARTITION NUMBER va1  210

FIG. 39

| | DISK MANAGEMENT TABLE | | | | | | |
|---|---|---|---|---|---|---|---|
| id NUMBER | 0 | 1 | 2 | 3 | 4 | 5 | 6 |
| NAME | hd0 | hd1 | hd2 | hd3 | hd4 | hd5 | hd6 |
| VIRTUAL ARRAY SUBSYSTEM | va2 | va2 | va2 | va2, va3 | va3 | va3 | va3 |
| 0 | | | | | | | |
| 1 | | | | | | | |
| 2 | | | | | | | |
| 3 | va230-p2 | va231-p2 | va232-p2 | va233-p2 | | | |
| 4 | | | | va340-b2 | va341-b2 | va342-b2 | va343-b2 |
| 5 | | | | | | | |

PARTITION NUMBER va23-p2 va34-b2 va2  210  va3

FIG. 41

| | DISK MANAGEMENT TABLE | | | | | | |
|---|---|---|---|---|---|---|---|
| id NUMBER | 0 | 1 | 2 | 3 | 4 | 5 | 6 |
| NAME | ad0 | ad1 | ad2 | ad3 | hd0 | hd1 | hd2 |
| VIRTUAL ARRAY SUBSYSTEM | va0 | va0 | va0 | va0 | va2 | va2 | |
| 0 | va000 | va001 | va002 | va003 | | | |
| 1 | va010 -p0 | va011 -p0 | va012 -p0 | va013 -p0 | va210 -p1 | va211 -p1 | |
| 2 | va020 -p0 | va021 -p0 | va022 -p0 | va023 -p0 | va220 -b1 | va221 -b1 | |
| 3 | | | | | | | |
| 4 | | | | | | | |
| 5 | | | | | | | |

PARTITION NUMBER va00
va01-p0
va21-p1
va22-b1
va02-b0
210
va0
va2

FIG. 42

| | DISK MANAGEMENT TABLE 210 | | | | |
|---|---|---|---|---|---|
| id NUMBER | 0 | 1 | 2 | 3 | 4 |
| NAME | hd0 | hd1 | hd2 | hd3 | hd4 |
| VIRTUAL ARRAY SUBSYSTEM | va0, va1 | va0, va1 | va0, va1 | va0, va1 | va1 |
| PARTITION NUMBER 0 | va000 | va001 | va002 | va003 | va00 |
| 1 | va110 | va111 | va112 | va113 | va114 va11 |
| 2 | | | | | |
| 3 | | | | | |
| 4 | | | | | |
| 5 | | | va0 | | va1 |

FIG. 54

| | | DISK MANAGEMENT TABLE | | | | | | |
|---|---|---|---|---|---|---|---|---|
| | id NUMBER | 0 | 1 | 2 | 3 | 4 | 5 | 6 |
| | NAME | hd0 | hd1 | hd2 | hd3 | hd4 | hd5 | hd6 |
| | VIRTUAL ARRAY SUBSYSTEM | va0 | va0 | va0 | va0 | va0 | | |
| PARTITION NUMBER | 0 | hd00= va000 | hd10= va001 | hd20= va002 | hd30= va003 | hd40= va004 | | |
| | 1 | | | | | | | |
| | 2 | | | | | | | |
| | 3 | | | | | | | |
| | 4 | | | | | | | |
| | 5 | | | | | | | |

HIGH SPEED FILE ACCESS CONTROL METHOD AND COMPUTER SYSTEM INCLUDING A PLURALITY OF STORAGE SUBSYSTEMS CONNECTED ON A BUS

BACKGROUND OF THE INVENTION

The present invention relates to a computer system having a workstation or a server and, more particularly, to high speed accessing of files stored in a magnetic disk subsystem.

CPU performance has drastically improved in recent years with the resultant prominent improvement in the workstations or servers. As compared with the improvement in the CPU performance, however, the improvement in the I/O performance, especially, in the access speed of files stored in a magnetic disk subsystem cannot be said to be sufficient. This insufficiency is caused mainly by the bottlenecks in (1) the access speed in a secondary memory subsystem such as the magnetic disk subsystem and (2) the speed of an I/O bus interface.

For high speed file access by eliminating the secondary memory bottleneck, an array disk system has a plurality of magnetic disk subsystems "disk drives" or merely "disks", so that high speed file access may be realized by operating the individual disks in parallel. The other speed bottleneck of the I/O bus interface is to be eliminated by using a high speed interface for connection with the I/O bus.

FIG. 46 shows a construction of an array disk system, and FIG. 47 shows a synchronized time chart of the array disk system file for reading. FIGS. 46 and 47 show an example, in which each stack of stacks O-n is constructed of four disks hd0–hd3, but this disk number may be more or less. The operations of the array disk system will be described with reference to FIGS. 46 and 47.

When an array disk system 300 receives a read instruction from a host CPU system 400, its internal controller starts disks hd0 to hd3 of a stack 0 substantially simultaneously for reading data blocks. Each disk of the stack 0 reads the corresponding data block from a magnetic disk media after seek and rotational delay. The data blocks 0 to 3 read from the disks are individually stored in different FIFOs (310 to 313) respectively. These reading operations are executed independently and in parallel for the disks hd0 to hd3 of the stack 0 so that the total reading procedure is speeded up as compared to reading from only one disk. Next, data blocks 0 to 3 are individually transferred in a time sharing manner consecutively to a buffer 330 through a high speed bus i-Bus (internal bus) 320 in the system. This buffer 330 arrays the data blocks 0 to 3 and transfers them to the host CPU system 400 through SCSI bus interface I/F 340 and a high speed SCSI bus 160. After this, if a next read instruction is issued, the internal controller in the array disk system starts the read of the disk of a stack, from which the data block is to be read. The array disk system realizes high speed file access by repeating a series of such operations.

The array disk system is exemplified by Japanese Patent Laid-Open No. 41044/1989 entitled "Data Transfer System" or Japanese Patent Laid-Open No. 21525/1989 entitled "Magnetic Disk Control System".

SUMMARY OF THE INVENTION

It is an object of the present invention to analyze data transfer within computer systems, determine problems and their causes, and provide solutions for such problems.

If the array disk system is used, as described above, high speed file access can be realized. However, complicated expensive hardware is required as an internal controller for controlling the operations of a plurality of disks composing the stack. As a result, there arises a problem that the cost performance of the computer system drops. In case the number of disks is increased, on the other hand, the increase has to be accomplished at a stack unit. Thus, there arises another problem that the flexibility of the total capacity is insufficient.

It is, therefore, an object of the present invention to provide both high speed file access and compatible with an array disk system without dropping the cost performance of the computer system. Another object of the present invention is enhancing the flexibility of the total capacity of a disk system and a computer system.

The present invention solves the above-specified problems by high speed access to a plurality of magnetic disk subsystems multiplexly with software and without using any complicated expensive hardware.

FIG. 48 is a diagram showing a principle of the present invention, and FIG. 49 is a synchronized file reading time chart for the system of FIG. 48. FIGS. 48 and 49 show a case in which four disks are used, but this disk number may be increased or decreased. With reference to these Figures, the principle of the present invention will be described in the following.

The present invention computer system is equipped with an I/O bus 160 such as a SCSI bus having disconnect/reconnect functions with a host CPU system 400. Moreover, this I/O bus 160 is connected with a plurality of magnetic disk subsystems 170-0 to 170-3 having internal cache memories 20-0 to 20-3 to accomplish the following access controls.

In case a file is to be written, the host CPU system 400 divides a corresponding file into subfiles. Starting at t0 the host system writes these subfiles 0, 1, 2, 3 consecutively in times Ts in the internal cache memories 20-0 to 20-3 of the individual magnetic disk subsystems 170-0 to 170-3, starting at t0. After the host CPU system 400 has written the data blocks composing the subfiles 0, 1, 2, 3 in the internal cache memories 20-0 to 20-3 of the individual magnetic disk subsystems 170-0 to 170-3, that is after each Ts these subsystems inform the host CPU system 400 of their write ends. Then, the data written in the internal cache memories of the individual magnetic disk subsystems are written in the magnetic disk media, hd0 to hd3, after their individual seeks and rotational delays Tw; during this time, the host CPU system 400 can write other subfiles in the internal cache memories of other magnetic disk subsystems.

In case a file is to be read, the host CPU system 400 issues instruction, for reading the subfiles of the file, consecutively to the corresponding individual magnetic disk subsystems 170-0 to 170-3. After these instructions issue and are held in cache memories 20-0 to 20-3, the host CPU system 400 and the individual magnetic disk subsystems 170-0 to 170-3 are disconnected from the I/O bus 160. When it receives the read instruction, each magnetic disk subsystem 170-0 to 170-3 reads the data from the magnetic disk media into it's internal cache memory according to seek and rotational delay and then issues a reconnect request to the host CPU system 400. Then, host CPU system 400 starts the read of the data into the SCSI Bus 160 from the internal cache of the magnetic disk subsystem which issued the reconnect request at the earliest time, at the corresponding one of times t1–t4. In the meanwhile, the other magnetic disk subsystems also read data from their magnetic disk media into their caches according to read instructions issued from the host CPU system 400 and then issue the reconnect requests to the host CPU system 400 at the end of their read. The subfiles 0–3 thus read in t1–t4 are synthesized in the host CPU system 400 to reproduce a master file.

In the file access operations described above, the accesses to the internal cache memories 20-0 to 20-3 of the magnetic disk subsystems 170-0 to 170-3 through the I/O bus 160 can be accomplished at the high speed of the I/O bus 160 in a time period, one of t1–t4, that is far shorter than the time period tw for the seek, rotaional delay and data transfer between the magnetic disk media and the internal cache memories. As a result, the reading operations and the writing operations are accomplished substantially independently by the individual magnetic disk subsystems so that a high speed access can be realized in the entire system.

As has been described, in either the file reading or writing case, the parallel operations of the magnetic disk subsystems and the efficient use of the I/O bus, through connect/disconnect, can be realized by making use of internal cache memories of the magnetic disk subsystems and the high speed I/O bus. As a result, it is possible to provide a computer system capable of having a high speed file access.

In order to realize the aforementioned individual functions in a computer system, according to the present invention, there is: at least one input/output bus having disconnect/reconnect functions individually through interface units and connected with a main memory unit; a plurality of external memory units capable of being recognized as different units having internal cache memories connected with the input/output bus; and high speed file access control, comprising:

(1) reference is made to disk management information, which is stored with the external memory unit group, for selecting an arbitrary number of external memory units from a plurality of external memory units connected with the input/output bus, and to determine the names of the external memory units composing an assigned external memory unit group, (2) for a subfile descriptor, reference is to file descriptor management information, which is stored with the master file descriptor of a master file to be accessed and the subfile descriptors of subfiles divided to construct the master file descriptor, to determine the subfile descriptors;

(3) file position information is determined by referring to file management information, which is stored with subfile position information of the subfiles constructing the master file on the individual corresponding external memory units in the external memory unit group; and (4) file access control is determined, on the basis of the names of the external memory units for storing the individual subfiles and the file position information by:

(A) repeating, at the file writing time, the steps of:
connecting a magnetic disk subsystem to be written and the bus interface unit to transfer the corresponding subfile from the main memory unit to an internal cache memory in the corresponding magnetic disk subsystem;
disconnecting the magnetic disk subsystem from the bus interface unit at the end of the transfer and without awaiting the end of writing the subfile on a magnetic disk media from the internal cache memory;
connecting a next magnetic disk subsystem to be written to transfer the next subfile to the internal cache of the next magnetic disk subsystem; and
disconnecting the next magnetic disk subsystem immediately after the end of the transfer.

(B) repeating, at the file reading time, the steps of:
connecting the magnetic disk subsystem stored with a subfile to be read and the bus interface unit to issue a read request to the magnetic disk subsystem;
disconnecting the magnetic disk subsystem without waiting for reading of the subfile on the magnetic disk subsystem;
instantly connecting a next magnetic disk subsystem to issue a read request for a next subfile; and
reconnecting the first magnetic disk subsystem that has transferred its subfile onto its internal cache memory, to read the subfile on the corresponding cache memory to a main memory unit.

A virtual disk unit constructed of a plurality of the aforementioned magnetic disk subsystems of the present invention will be called a "virtual array disk" or merely the "virtual array".

Now will be explained how the individual processing steps described operate in the present invention.

First of all, at the processing step (1), the virtual array is assigned a directory of a file system. At this time, the disk management information is referred to recognize the magnetic disk subsystems constructing the virtual array, thereby to make the magnetic disk subsystems usable as the virtual array.

The disk management information defines what magnetic disk subsystems construct the virtual array. Generally speaking, each magnetic disk subsystem is divided for use into a plurality of partitions so that the area to be used can be defined by assigning the individual magnetic disk subsystems and their partitions. The disk management information manages the magnetic disk subsystem to be used by the virtual array and the partitions of the same.

Next, at the processing step (2), the file descriptor management information, which is registered with translations between the file descriptor of a master file and the file descriptors of the subfiles divided from the master file, is referred to for attaining the file descriptors of the subfiles for accessing the magnetic disk subsystems having the subfiles. As a result, the plurality of magnetic disk subsystems having the subfiles can be accessed.

In reading or writing, the file descriptor of the master file given from an application program is translated into the file descriptors of the subfiles with reference to the file descriptor management information. In case a file is to be newly prepared and written, the file descriptors of a master file and subfiles are newly assigned, and their translations are registered in the file descriptor management information. After this, access to the subfiles can be accomplished by the file descriptor of the master file.

Next, at the processing step (3), file management information of the subfiles is obtained by using the file descriptors of the subfiles obtained at the processing step (2). The file management information is used to access the magnetic disk subsystems having the subfiles.

The file management information includes the magnetic disk subsystems, the striping block number, and the position information indicating positions where the data blocks constructing the subfiles are stored. With reference to the file management information of each subfile, the next magnetic disk subsystems to be accessed is determined. The master file is accessed by consecutive accesses to the subfiles according to the determination.

Finally, at the processing step (4), the files stored in the virtual array are accessed. In the practical procedure, this is an access to obtain the master file. The file access uses the file management information of the subfiles obtained at the processing step (3), no matter whether reading or writing.

The file management information manages the storage positions of the subfiles on the magnetic disk subsystems. Thus, the storage position of the data block to be accessed is attained from the file management information of each subfile, and access requests are consecutively issued to the magnetic disk subsystems storing the individual subfiles. At this time, the order of accessing the individual subfiles is obtained from the file descriptor management information. Moreover, the number of blocks to be continuously accessed in the individual magnetic disk subsystems storing the subfiles is registered as the striping blocks in the file management information.

In file reading, the magnetic disk subsystem storing a subfile to be read and the I/O bus interface unit are connected to issue a read request. In response to this issued request, the magnetic disk subsystems position the heads to transfer the data from the magnetic disk media to the internal cache memories. This establishes a latency. As a result, the magnetic disk subsystems and the I/O bus interface unit are at once disconnected. Meanwhile, other magnetic disk subsystems and the I/O bus interface unit can be connected to issue read requests. In this case, there arises at time TW for the head positioning latencies and for the data transfer to the internal cache memories, so that during TW the read requests can be issued to the other magnetic disk subsystems. The data blocks are read from the magnetic disk subsystems which are readable after the end of the head positioning. Immediately after this, the read request for a data block to be read next is issued to reconnect the magnetic disk subsystem and the I/O bus interface unit. Thus, the master file is read by issuing the read requests consecutively to the individual magnetic disk subsystems and by consecutively reading the subfiles into the main memory.

In file writing, the magnetic disk subsystems and the I/O bus interface unit are connected to issue the write requests. After these issues, the data blocks are transferred to the magnetic disk subsystems. These transferred data blocks are written in the internal cache memories of the magnetic disk subsystems, and after disconnect then written in the magnetic disk media after the end of the head positioning. At the end of writing the data blocks in the internal cache memories, the magnetic disk subsystems and the I/O bus interface unit are disconnected to end the writing operation in the magnetic disk subsystems from the point of view of the host. Thus, without awaiting the end of the writing operation from the internal cache memories to the magnetic disk media, a next magnetic disk subsystem and the I/O bus interface unit can be connected to issue the next write request to make a transfer of data blocks. Thus, the master file is written by issuing the write requests consecutively to the individual magnetic disk subsystems, dividing the master file into the subfiles, and writing the subfiles from the main memory.

In the file reading, a read request for a second magnetic disk subsystem can be issued for the time period of the data transfer from the magnetic disk media of a first magnetic disk subsystem to its internal cache memory, so that the reading procedure can be multiplexly controlled over the plurality of magnetic disk subsystems. As a result, the seek and latency of each magnetic disk subsystem and the data transfer to the internal cache memory are executed in parallel with issuing requests on the bus. Thus, after the subfile read request has been issued to each magnetic disk subsystem, the data blocks of the subfiles to be read to the main memory are always present in the internal cache memory when they are to be read from the individual magnetic disk subsystems in response to the reconnect request. A high speed file reading operation having a high I/O bus using efficiency can be realized by issuing a next read request while reading those data blocks consecutively into cache memory and by a control to transfer the operation to a procedure of a next readable magnetic disk subsystem.

In file writing, a second write request can be issued to a second magnetic disk subsystem during and not after data transfer from the internal cache memories of first magnetic disk subsystems to the magnetic disk media, so that the writing operation can be multiplexly controlled over the plurality of magnetic disk subsystems. As a result, the seek and latency at the individual magnetic disk subsystems and the data transfer from the internal cache memories to the magnetic disk media are executed in parallel with issuing requests. As a result, a high speed file writing operation can be realized by issuing the write requests of the subfiles consecutively to the individual magnetic disk subsystems.

In the file accesses thus far described, moreover, the application program may be conscious of only the file descriptor of the master file, but not of the fact that divided subfiles stored. Thus, it is possible to make an access with an application interface similar to that of the files stored in a single magnetic disk subsystem.

In the present invention, as has been described, a high speed file access can be realized by accessing to the plurality of magnetic disk subsystems consecutively for the parallel operations at the aforementioned individual processing steps.

BRIEF DESCRIPTION OF THE DRAWING

Further objects, features and advantages of the present invention will become more clear from the following detailed description of the embodiments of the present invention as shown in the drawing, wherein:

FIG. 7 is a diagram showing a disk management table of FIG. 6;

FIG. 9 is a diagram showing a file descriptor translation table of FIG. 6;

FIG. 23 is a diagram showing an example of setting a disk management table;

FIG. 25 is a diagram showing an example of setting a disk management table;

FIG. 27 is a diagram showing an example of setting a disk management table;

FIG. 29 is a diagram showing an example of setting a disk management table;

FIG. 31 is a diagram showing an example of setting a disk management table;

FIG. 33 is a diagram showing an example of setting a disk management table;

FIG. 35 is a diagram showing an example of setting a disk management table in a mirror mode;

FIG. 37 is a diagram showing an example of setting a disk management table in a mirror mode;

FIG. 39 is a diagram showing an example of setting a disk management table in a mirror mode;

FIG. 41 is a diagram showing an example of setting a disk management table including an array disk;

FIG. 42 is a diagram showing an example of setting a disk management table of a file copy at the time of increasing the number of disks;

FIG. 54 shows an example of a disk management table;

FIG. 56 is a diagram showing a file management table corresponding table;

FIG. 59 is a diagram showing a file management table corresponding table.

DETAILED DESCRIPTION OF PREFERRED EMBODIMENTS

Figure 1:
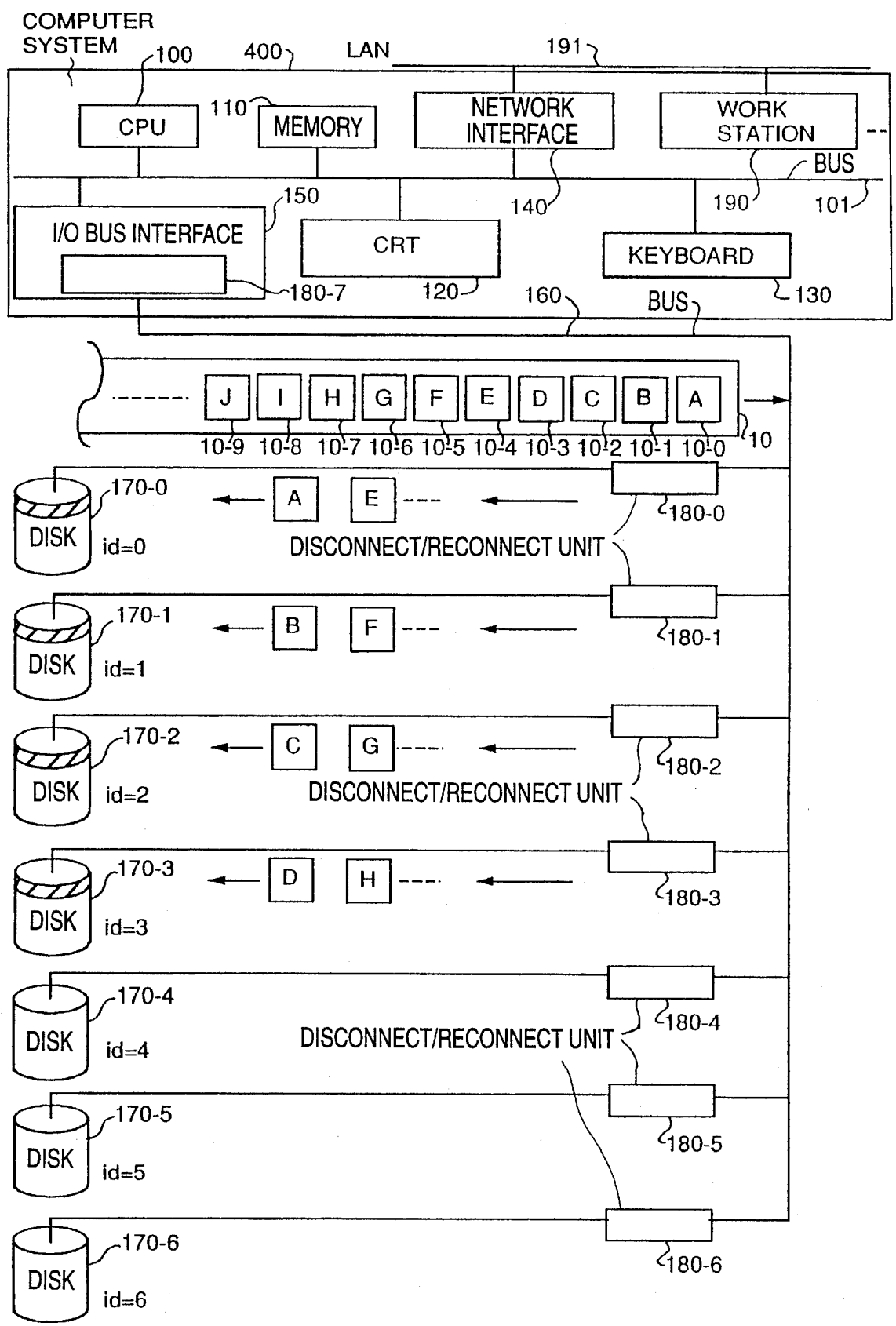
FIG. 1 is a diagram of a preferred embodiment.

FIG. 1 shows a first embodiment of the present invention. In the present embodiment, a computer system 400 is constructed of a CPU 100, a memory M 110, a work station 190, a CRT display 120, a keyboard 130 as an example of an input, a network interface I/F 140 and an I/O bus interface 150, all of which are connected by a common data bus 101 to each other and a LAN 191.

The I/O bus interface 150 is connected with an I/O bus 160 which is connected with seven magnetic disk subsystems 170-0 to 170-6; the number of magnetic disk subsystems may be other than seven. Between the individual magnetic disk subsystems 170-0 to 170-6 and the I/O bus 160 leading to the I/O bus interface 150, there are disconnect/reconnect units 180-0 to 180-6 which can electrically disconnect the 1/10 bus 160 from the magnetic disk subsystems 170-0 to 170-6 that do not perform the data transfer with the I/O bus interface 150. When the electric connections become necessary again, the disconnect/reconnect units 180-0 to 180-7 can reconnect. These controls are accomplished by cooperation between the CPU 100 and the magnetic disk subsystems 170-0 to 170-6. The disconnect/reconnect units can be built together with a disk controller (although not shown) in each of the magnetic disk subsystems 170-0 to 170-6.

The network interface 140 is connected with a network, LAN 191 for access from a remote workstation or the like, which is connected with the LAN 191.

Next, the operation of the present embodiment will be described in case a file is to be written in a disk.

In the computer system of the present embodiment, a file 10 is managed as a set of data blocks of a fixed length by the OS (Operating System). Specifically, the file 10 is constructed, as shown in FIG. 1, of a series of blocks A 10-0, B 10-1, C 10-2, D 10-3, E 10-4, F 10-5, G 10-6, H 10-7, I 10-8, J 10-9, and so on.

In a file writing case according to the prior art, one magnetic disk subsystem is selected and written. Specifically, the data blocks A 10-0, B 10-1, C 10-2 and so on are written in a common magnetic disk subsystem 170-0 for example. At this time, the data blocks are written at first in the internal cache memories of the magnetic disk subsystems, followed by seek and rotational delay. The CPU 100 advances, after it writes the data in the internal cache memory for block A 10-0, not into a next writing step but into a wait state until the end of the write from the internal cache to the magnetic disk media. In this case, therefore, the write of the next block B 10-1 cannot be executed before the write of the block A 10-0 to the magnetic disk media is completely ended. In other words, the write of the block B 10-1 cannot be effected, if intended, in the magnetic disk subsystem 170-0 because the write of the data of the block A 10-0 on the internal caches to the magnetic disk media is not ended.

In the present embodiment, on the other hand, the file is divided and stored in a plurality of the magnetic disk subsystems. For example, the file 10 constructed of data blocks 10-0 to 10-n, each of a fixed length and stored in the memory 110 is divided and stored as units of one data block of I/O in the four magnetic disk subsystems 170-0 to 170-3 of id (identifying number)=0 to 3. At this time, the data block A10-0 is written at first in the internal cache of the magnetic disk subsystem 170-0 and then from the internal cache to a predetermined position on the magnetic disk media after the seek and rotational delay. Thus, the writing step is ended for magnetic disk subsystem 170-0. In the present embodiment, before the end of the writing operation from the internal cache to the magnetic disk media and at the time of the end of the writing operation to the internal cache, a next data block or the block B 10-1 is written in the internal cache of magnetic disk subsystem 170-1 of id=1. Like before, without awaiting the end of the writing operation of the data block B 10-1 from the internal cache to the magnetic disk media, the next data block C 10-2 is written in the internal cache of magnetic disk subsystem 170-2 of id=2. Likewise, without awaiting the end of the writing operation of the data block C 10-2 from the internal cache to the magnetic disk media, the data block D 10-3 is written in the internal cache of magnetic disk subsystem 170-3 of id=3. At the end of the writing operation of the data block in the internal cache of the magnetic disk subsystem 170-3, the writing operation returns to the magnetic disk subsystem 170-0 of id=0. After confirming the end of the writing operation of the data block A 10-0 from its internal cache and the end of the writing operation of the block D 10-3 to its internal cache, the block E 10-4 is written in the internal cache of the magnetic disk subsystem 170-0. In case a sufficient time is not taken in writing the internal cache of disk subsystems 170-0 to 170-3 until the end of the cache to media writing operation in the magnetic disk subsystem of id=0, the total number of the magnetic disk subsystems may be increased with id being 5 or more, so that the file writing performance can be further improved. Next, the data blocks F 10-5, G 10-6, H 10-7, I 10-8, J 10-9 and so on are consecutively written similarly in the different magnetic disk subsystems 170-1, 170-2, 170-3, 170-0, 170-1 and so on. After all data blocks of the file 10 have been written, the four subfiles divided from the content of the master file are stored respectively in the different magnetic disk subsystems 170-0 to 170-3.

The function of thus issuing a write request of a data block to a next magnetic disk subsystem without awaiting the end of the writing operation of a previous data block from the internal cache of a previous magnetic disk subsystem to a magnetic disk media will be called the "asynchronous write".

Thus, for writing only while the data blocks are written to the internal caches of the magnetic disk subsystems, is it necessary to connect the individual magnetic disk subsystems 170-0 to 170-6 and the I/O bus interface 150 through the I/O bus 160, according to the asynchronous write. Specifically, when a write request is issued from the host CPU system 100, the magnetic disk subsystems are electrically connected with the I/O bus interface 150 so that the data blocks can be transferred to internal caches. At the end of the writing operation of the data blocks in the internal caches of the magnetic disk subsystems, the electric connections between the magnetic disk subsystems and the I/O bus interface 150 are disconnected or released by disconnect/reconnect units 180-0 to 180-6. Later, the writing operation of the data from the internal caches to the magnetic disk media is accomplished in the magnetic disk subsystems independently of such connections, so that during this later time, the host CPU system 100 can access a next different magnetic disk subsystem. Thus, immediately after the end of the writing operation of a data block to an internal cache of a magnetic disk subsystems, a write request is issued to a next magnetic disk subsystem. After the electric connection between that next magnetic disk subsystem and the I/O bus interface 150 has been established, the next data block can be transferred.

The file reading case of the present embodiment operates like the file writing case of FIG. 1. Specifically, the data blocks are read consecutively beginning with the magnetic disk subsystem 170-0 of id=0. The host CPU system 100 issues the read instructions consecutively beginning with the magnetic disk subsystem 170-0 and proceeding to the magnetic disk subsystems 170-1, 170-2 and so on. In response to the instruction, the magnetic disk subsystem releases the electric connection with the I/O bus interface 150 without waiting for the seek and latency, except for the case in which the data block can be immediately read from the magnetic disk media. After the seek and latency time, a sequence of reading the data from a predetermined position of the magnetic disk media to the internal cache is then commenced. As a result, the host CPU system 100 can issue the read instruction to the magnetic disk subsystem 170-1, immediately after it has issued the read instruction to the magnetic disk subsystem 170-0, without waiting for the read to be completed in the disk subsystem 170-0.

The function of thus issuing a read request of a data block to a next magnetic disk subsystem without awaiting the end of the reading operation of the data block from the previous magnetic disk subsystem will be called the "asynchronous read".

Thereafter, the host CPU system 100 likewise issues the read instructions consecutively to the magnetic disk subsystems 170-2 and 170-3. In the individual magnetic disk subsystems 170-0 to 170-3, on the other hand, after the data are read from the magnetic disk media to the internal cache, a reconnect request is issued to the host CPU system 100, and the data transfer to the host CPU system 100 is accomplished after the electric connection with the I/O bus interface 150 has been established to transfer the data at high speed from the internal caches. These data reading operations from the magnetic disk media to the internal caches can be accomplished independently of each other and in parallel with the issue of read requests to other individual magnetic disk subsystems. Specifically, in the file reading case, the divided files are read in the present embodiment from the plurality of different magnetic disk subsystems so that the parallel operations of the individual magnetic disk subsystems can be accomplished by the effective actions of their internal caches and the disconnect/reconnect units.

The disconnect/reconnect functions through the I/O bus 160 thus far described are supported, for example, by the SCSI interface (i.e. Small Computer Interface conforming to ANSIx3.131-1986 standards), and the I/O bus of the present embodiment can use the SCSI interface system for data, control and address.

Figure 2:
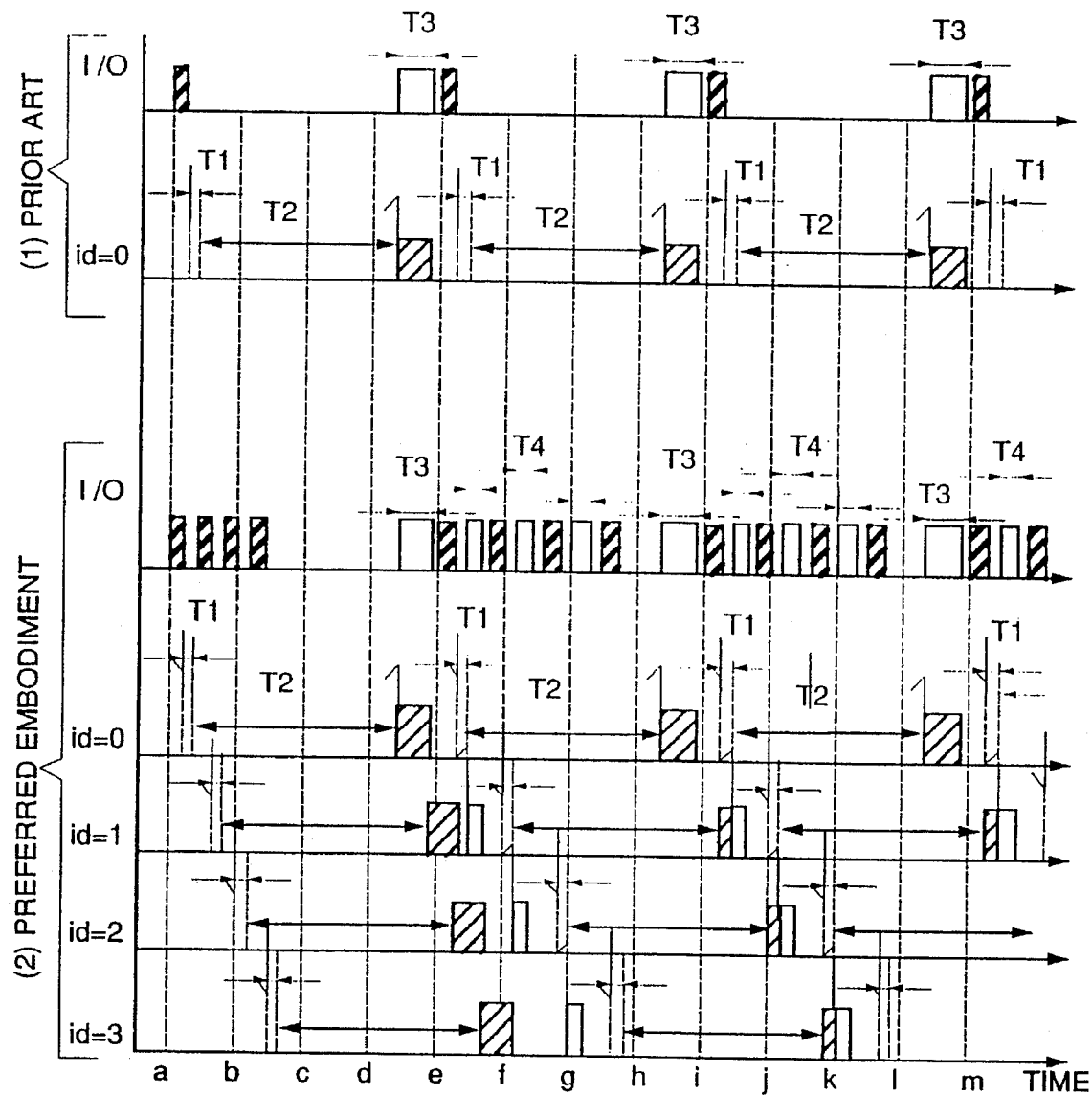
FIG. 2 is a file reading time chart of the operation of the first embodiment.

FIG. 2 is a synchronized time chart of the file reading for comparing the present invention with the prior art. The time blocks that are cross hatched with heavy cross hatching refer to a read request; the time blocks without any cross hatching refer to a data transfer the CPU and internal cache, and the time blocks with light cross hatching refer to magnetic disk medium access to/from internal cache. Time T1 refers to the software overhead of the magnetic disk subsystem; time T2 refers to the seek and latency time; time T3 refers to the time for data transfer from a magnetic disk media of subsystem to a host CPU when reading the magnetic disk medium; and time T4 refers to the time for data transfer from the magnetic disk subsystem to the host CPU, reading the internal cache memory. The synchronized timing chart is divided into two portions: (1) and (2). The first line of each portion, labeled I/O, refers to the I/O bus. The read operation to be described will start at time a, e, i and m. The portion (1) shows the case in which one magnetic disk subsystem is used according to the prior art, and the portion (2) shows the case of the present embodiment in which the virtual array of the present invention is constructed of four magnetic disk subsystems of id=0 to 3. In FIG. 2, the line labeled I/O presents the time line of the I/O bus 160, and the lines labeled id present the time lines of the magnetic disk subsystems. On the I/O bus axis, there are indicated the read requests (heavy cross-hatching), and the data transfer timings (no cross hatching) between the host CPU system 100 and the magnetic disk subsystems 170-0 to 170-3. On each id axes, there are indicated the timings of the data transfer from the magnetic disk media to the internal caches and the timings of the data transfer from the internal caches to the I/O bus 160.

First of all, the operations of the case (1) of one magnetic disk subsystem constructed according to the prior art will be described in the following. When a read request is issued from the host CPU system 100 to a magnetic disk subsystem to start the same, at time a, the command analysis is accomplished in the controller in the magnetic disk subsystem to establish a software overhead T1 of the magnetic disk subsystem. After this, the head for reading the data blocks from the magnetic disk media is positioned to establish a (seek & rotational delay) time T2. Meanwhile, the magnetic disk subsystem is in the disconnected state. After the end of the head positioning, the magnetic disk subsystem is reconnected to read the data block from the internal cache to the I/O bus 160 while reading the same data from the magnetic disk media to the internal cache. As a result, a data transfer time T3 is established. The read is repeated starting at time e.

In the case (2) of the virtual array constructed of the four magnetic disk subsystems, the four read instructions are consecutively issued onto the I/O bus 160 from the host CPU system 100 starting at time a to start the four magnetic disk subsystems of id=0 to 3.

First of all, when the read instruction is issued to the magnetic disk subsystem 170-0 of id=0, this magnetic disk subsystem 170-0 comes into the seek and rotational delay time T2, after the command analysis of T1, and is simultaneously disconnected at T1. As a result, the host CPU system 100 can issue the next read instruction of the next magnetic disk subsystem 170-1 of id=1. Like the magnetic disk subsystem of id=0, the magnetic disk subsystem 170-1 of id=1 comes into the seek and rotational delay, after the command analysis, and is simultaneously disconnected. At this time period a to e, the magnetic disk subsystem 170-0 of id=0 and the magnetic disk subsystem 170-1 of id=1 are individually operated in parallel. Moreover, the host CPU system 100 issues the subsequent read instructions consecutively by similar procedures to the subsequent magnetic disk subsystem 170-2 of id=2 and the magnetic disk subsystem 170-3 of id=3. Likewise, these magnetic disk subsystems 170-2, 170-3 come into the seek and latency, after the command analysis, and are simultaneously disconnected. At this time period a to e, the four magnetic disk subsystems are individually operated completely independently and in parallel.

If the magnetic disk subsystem 170-0 of id=0 has its head positioned to read the data after the magnetic disk subsystem 170-3 of id=3 has been disconnected or if the data are read from the magnetic disk media and stored in the internal cache of subsystem 170-0, a reconnect request is issued to the host CPU system 100 from the magnetic disk subsystem 170-0. In response to the reconnect request, the host CPU system 100 reads the data from the magnetic disk subsystem 170-0 of id=0 in time period d to e. If, at this time, the data are stored in advance in the internal cache, the data can be read at a high speed for a shorter time T4 than the reading time T3 shown in the drawing (i.e. T3>T4) from the magnetic disk media. When this read is ended at time e, a next read instruction is issued to the magnetic disk subsystem 170-0 of id=0. Like before, the magnetic disk subsystem 170-0 of id=0 comes into the seek and rotational delay, after the command analysis, and is simultaneously disconnected.

If, at this time, the magnetic disk subsystem 170-1 of id=1 is readable, the host CPU system 100 reads the data like the case of the magnetic disk subsystem 170-0 of id=0 in response to the reconnect request from the magnetic disk subsystem 170-1. When the reading operation is ended, a next read instruction is issued to the magnetic disk subsystem 170-1 of id=1. Then at time f, the present magnetic disk subsystem 170-1 also comes into the seek and rotational delay, after the command analysis, and is simultaneously disconnected.

Moreover, the host CPU system 100 receives the reconnect requests from next magnetic disk subsystems 170-2 of id=2 and 170-3 of id=3 by a similar procedure, reads the data, and issues next read instructions. From now on, this sequence is repeated, as shown in FIG. 2.

Here, in this FIG. 2, the (seek and rotational delay) time T2 is assumed to be a constant. As a matter of fact, however, that time is frequently different for each read instruction issued, and the data can then be read consecutively from the magnetic disk subsystem which has issued the reconnect request the earliest. The order of selecting the magnetic disk subsystems, from which the data are to be read, may be inverted, but the remaining order of the aforementioned procedure are unchanged. The host CPU system would assemble the read data blocks in correct order of the file request.

In FIG. 2, only the magnetic disk subsystem 170-0 of id=0 accomplishes the data transfer to the I/O bus directly from the magnetic disk media, and the remaining magnetic disk subsystem 170-1 to 170-3 of other id numbers accomplish the data transfer to the I/O bus from the internal caches. This raises a difference in the data transfer time. This is because the data transfer time is shortened in case the data have been read in the internal caches when the host CPU system 100 reads the data, but the data are read from the magnetic disk media so that the data transfer time is not shortened in case the data are not in the internal caches when the host CPU system 100 reads the data.

As is apparent from FIG. 2, the present invention can achieve an advantage that the amount of data read by the host CPU system 100 for a unit time is effectively multiplied to an extent corresponding to the number of the magnetic disk subsystems because the four magnetic disk subsystems are always operating in parallel. In other words, the file reading rate is increased substantially to an extent corresponding to the number of the magnetic disk subsystems in accordance with the present invention.

Figure 3:
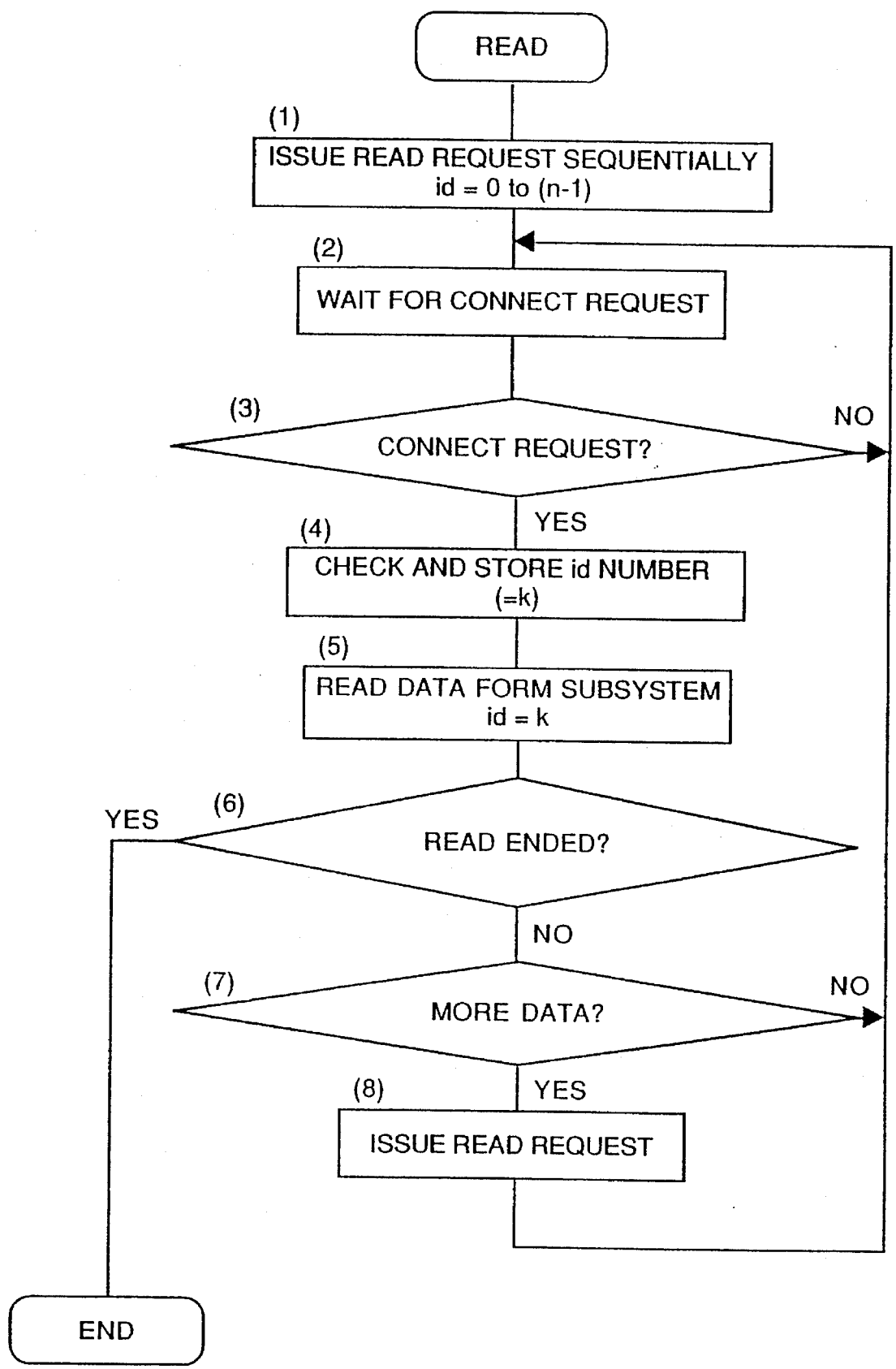
FIG. 3 is a file reading flow chart of the first embodiment.

A more generalized control flow, steps (1) to (8), of the file reading operation shown in FIG. 2, is shown in FIG. 3. It is assumed that the number n of the magnetic disk subsystems to be used is designated in advance, and that the file is divided and stored in the magnetic disk subsystems. It is also assumed that the information necessary for the file reading is given from an application program, for example. Moreover, the control of the sequence of the file access and the asynchronous reading operation are accomplished by the host CPU system 100.

The individual steps of the control flow will be described in the following.

(1) The read requests are sequentially issued to the magnetic disk subsystems of id=0 to (n-1).

(2) The CPU system 100 waits until any magnetic disk subsystem becomes readable, i.e., until a connect request.

(3) The flow advances to step (4) if there is a readable magnetic disk subsystem as indicated by a connect request and otherwise returns to the step (2).

(4) The id number k of the readable magnetic disk subsystem associated with the connect request is checked and stored.

(5) The data are read from the magnetic disk subsystem of id=k which has been checked at the step (4).

(6) The flow is ended if the reading operation is ended and otherwise control is to a next step (7).

(7) The flow advances to next step (8) if more data to be obtained by already issued read requests are to be read from the magnetic disk subsystem of id=k and otherwise returns to the step (2).

(8) The read request is issued to the magnetic disk subsystem of id=k, and the flow returns to the step (2).

A high speed operation of reading files from the virtual array disk can be accomplished by the control flow described above.

Figure 4:
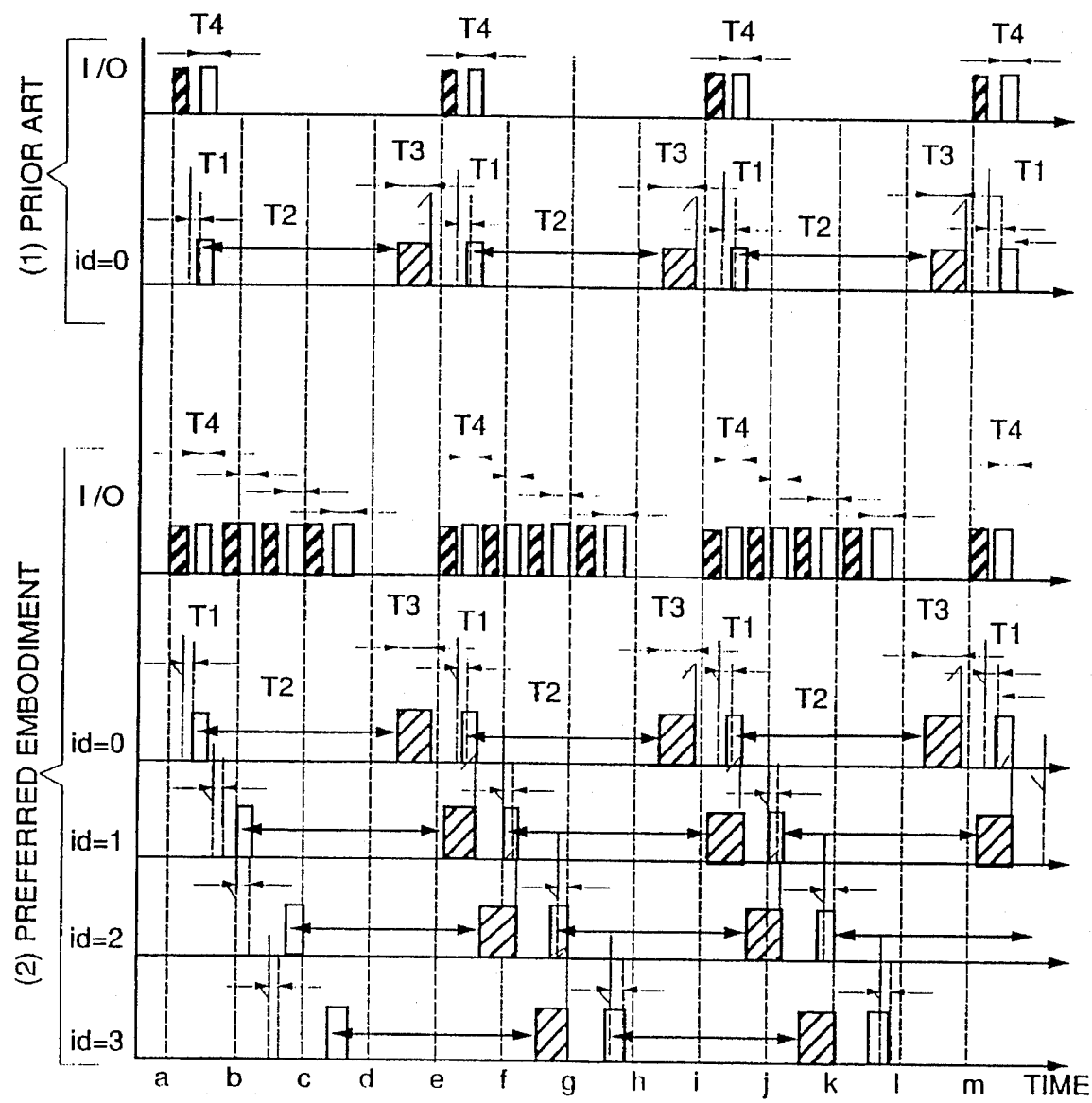
FIG. 4 is a file writing time chart of the first embodiment.

FIG. 4 shows a time chart of the file write case. The portion (1) shows the case in which one magnetic disk subsystem is used according to the prior art, and the portion (2) shows the case in which the virtual array of the present invention is constructed of four magnetic disk subsystems. The lines of the I/O bus and the lines of the id number in the FIG. 4 are individually similar to those of FIG. 2.

First of all, the operation of the case (1) of one magnetic disk subsystem will be described in the following. When a write request is issued from the host CPU system 100 to a magnetic disk subsystem to start the magnetic disk subsystem at time a, the command analysis is accomplished in the controller in the magnetic disk subsystem to establish a software overhead T1 of the magnetic disk subsystem. At this time, the host CPU system 100 transfers the data to be written to the magnetic disk subsystems so that the data are instantly stored in the internal cache. Then, it is deemed that the data writing procedure by the host CPU system 100 is ended. After this, in the magnetic disk subsystem, the head for writing the data blocks in the magnetic disk media is positioned to establish a (seek+rotational delay) time T2. Meanwhile, the magnetic disk subsystem is in the busy state. After the head positioning, the magnetic disk subsystem writes the data blocks from the internal cache to the magnetic disk media. As a result, a data transfer time T3 is established. Thereafter the read cycle of time period a to e for one read request is repeated in time period e to i and i to m for the next two read requests.

In case (2) of the virtual array constructed of the four magnetic disk subsystems, on the other hand, the write instructions are consecutively issued from the host CPU system 100 to start the four magnetic disk subsystems 170-0 to 170-3 of id=0 to 3.

First of all, the write instruction is issued to the magnetic disk subsystem 170-0 of id=0, and subsequently the data to be written are transferred to and stored in the internal cache of the magnetic disk subsystem 170-0. As a result, it is then deemed that the step of writing the data from the host CPU system 100 is ended and there is disconnect. After the command analysis, the magnetic disk subsystem 170-0 comes into the seek and rotational delay. At the end of the head positioning, the data of the internal caches are written in the magnetic disk media. On the other hand, the host CPU system 100 can issue the write instruction to the next magnetic disk subsystem 170-1 of id=1 and can transfer the next data to be subsequently written immediately after the above-mentioned disconnect of disk subsystem 170-0. Like the magnetic disk subsystem 170-0 of id=0, the magnetic disk subsystem 170-1 of id=1 also comes into the seek and rotational delay, after the command analysis, to write the data from the internal cache to the magnetic disk media. At this time, both the magnetic disk subsystem 170-0 of id =0 and the magnetic disk subsystem 170-1 of id=1 are operating independently of and in parallel with each other. Moreover, the host CPU system 100 causes the next magnetic disk subsystem 170-2 of id=2 and the magnetic disk subsystem 170-3 of id=3 by a similar procedure to execute the write instruction and the subsequent data transfer consecutively. These magnetic disk subsystems also come into the seek and rotational delay, after the command analysis, and write the data of the internal caches in the magnetic disk media at the end of the head positioning. At this time period a to e, the four magnetic disk subsystems 170-0 to 170-3 are operating independently of and in parallel with one another.

If the data writing operation of the magnetic disk subsystem 170-0 of id=0 is ended after the issue of the write instruction to the magnetic disk subsystem 170-3 of id=3 and after the transfer of the write data to the internal cache of the magnetic disk subsystem 170-3, the next data can be written to disk subsystem 170-0 at time e. Thus, the issue of the next write instruction and the next data transfer are executed to subsystem 170-0. The magnetic disk subsystem 170-0 of id=0 comes into the seek and rotational delay like before after the command analysis. If, at this time, the data writing operation of the magnetic disk subsystem 170-1 of id=1 is ended, the next data can be written. Like the case of the magnetic disk subsystem 170-0 of id=0, therefore, the host CPU system 100 executes the issue of the next write instruction and the data transfer to the magnetic disk subsystem 170-1. Then, the magnetic disk subsystem 170-1 comes into the seek and rotational delay after the command analysis. Moreover, the host CPU system 100 issues of the subsequent write instructions by similar procedures upon the end of the data write instruction issued before for magnetic disk subsystem 170-2 of id=2 and the magnetic disk subsystem 170-3 of id=3 during time period e to i. This sequence is repeated, as shown in FIG. 4 for time period i to m, etc.

Incidentally, the (seek+rotational delay) time T2 is assumed to be a constant in the present Figure. As a matter of fact, however, the time T2 is frequently different for each issue of the write instruction. In this case, the data can be written to the magnetic disk subsystem which has become readable earliest after it was released from the busy state. The order of selecting the magnetic disk subsystems to be written with the data is inverted, but the remaining order of the aforementioned steps is unchanged.

As is apparent from FIG. 4, the present invention can achieve an advantage that the amount of data written by the host CPU system 100 for a unit time, a to e, is effectively multiplied to an extend corresponding to the number of magnetic disk subsystems as compared to the prior art, because the magnetic disk subsystems are always operating in parallel. In other words, the file writing rate is increased substantially to an extent corresponding to the number of the magnetic disk subsystems in accordance with the present invention.

Figure 5:
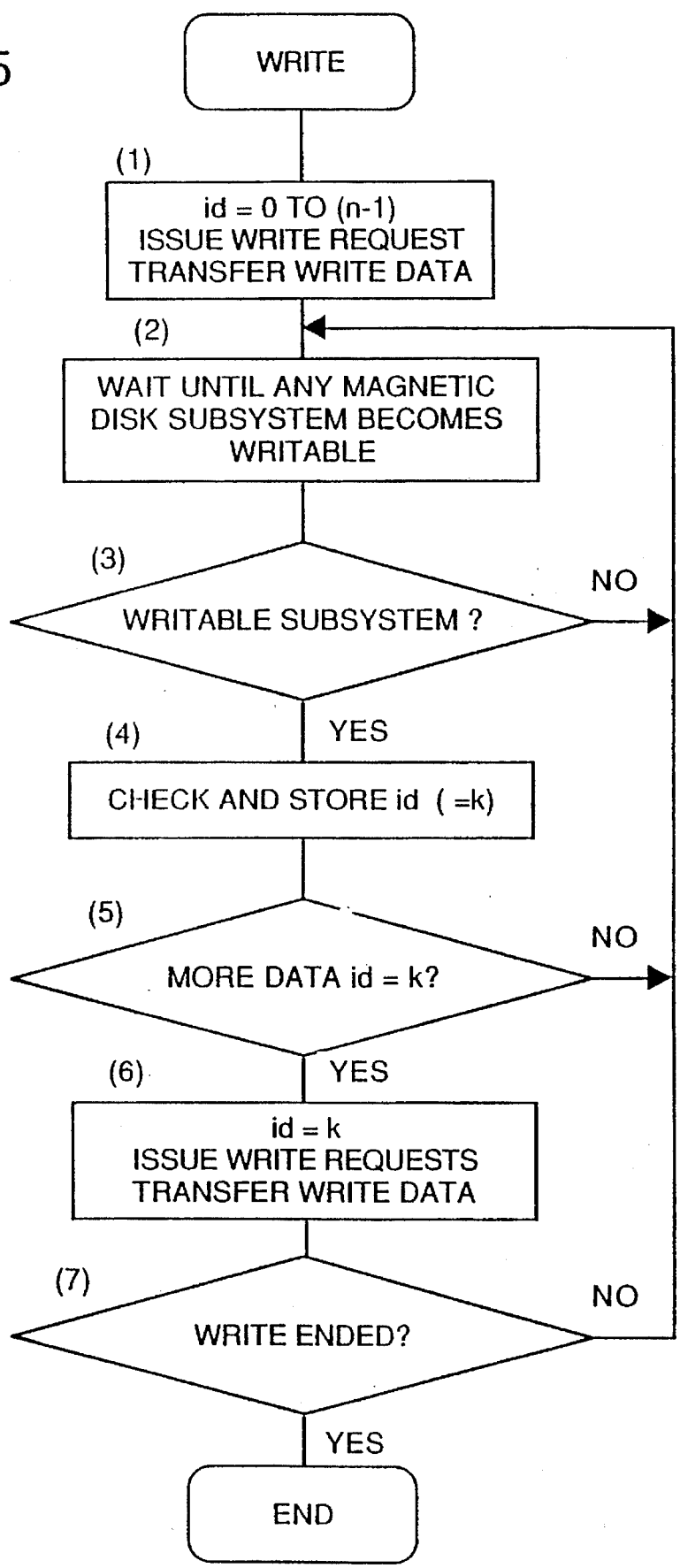
FIG. 5 is a file writing flow chart of the first embodiment.

A more generalized control flow of steps (1) to (7) of the file writing operation as shown in FIG. 4 is shown in FIG. 5. It is assumed that the number n of magnetic disk subsystems used is designated in advance, and that the file is divided and stored in the magnetic disk subsystems. It is also assumed that the information necessary for the file writing is given from an application program, for example. Moreover, the division of the files among the plurality of magnetic disk subsystems and the control of the sequence of the file access and the asynchronous writing operation are accomplished by the host CPU system 100.

The individual steps of the control flow will be described in the following.

(1) For the magnetic disk subsystems of id=0 to (n-1), the following steps will be consecutively executed:

1. Write requests are issued; and
2. Write data are transferred to the respective internal caches.

(2) Wait until any magnetic disk subsystem becomes writeable.

(3) The flow advances to next step (4) if there is a writeable magnetic disk subsystem and otherwise returns to the step (2).

(4) The id number k of the writeable magnetic disk subsystem is checked and stored.

(5) The flow advances to next step (6) if more data are to be written in the magnetic disk subsystem of id=k and otherwise returns to the step (2).

(6) The following steps are consecutively executed for the magnetic disk subsystem of id=k:

1. Write requests are issued; and
2. Write data are transferred to the internal cache.

(7) The flow is ended if the write is ended and otherwise returns to the step (2).

A high speed operation of writing files in the virtual array disk can be accomplished by the control flow described above.

By writing and reading the divided files in the plurality of different magnetic disk subsystems in the present embodiment, as has been described hereinbefore, the individual magnetic disk subsystems can be operated in parallel to realize the high speed file access. Moreover, by using the SCSI bus, for example, without any necessity for a specialized hardware such as in the conventional array disk system, as many as seven magnetic disk subsystems can be connected by a single adapter board. Thus, the high speed file access function can be realized at a remarkably low cost.

If the specifications of the SCSI interface are extended, moreover, it is apparent that seven or more magnetic disk subsystems could be connected. Moreover, the present embodiment has been described in connection with the case in which data blocks having a fixed length are distributed and stored in the individual magnetic disk subsystems, but a similar procedure can be executed for data blocks of different length.

Figure 6:
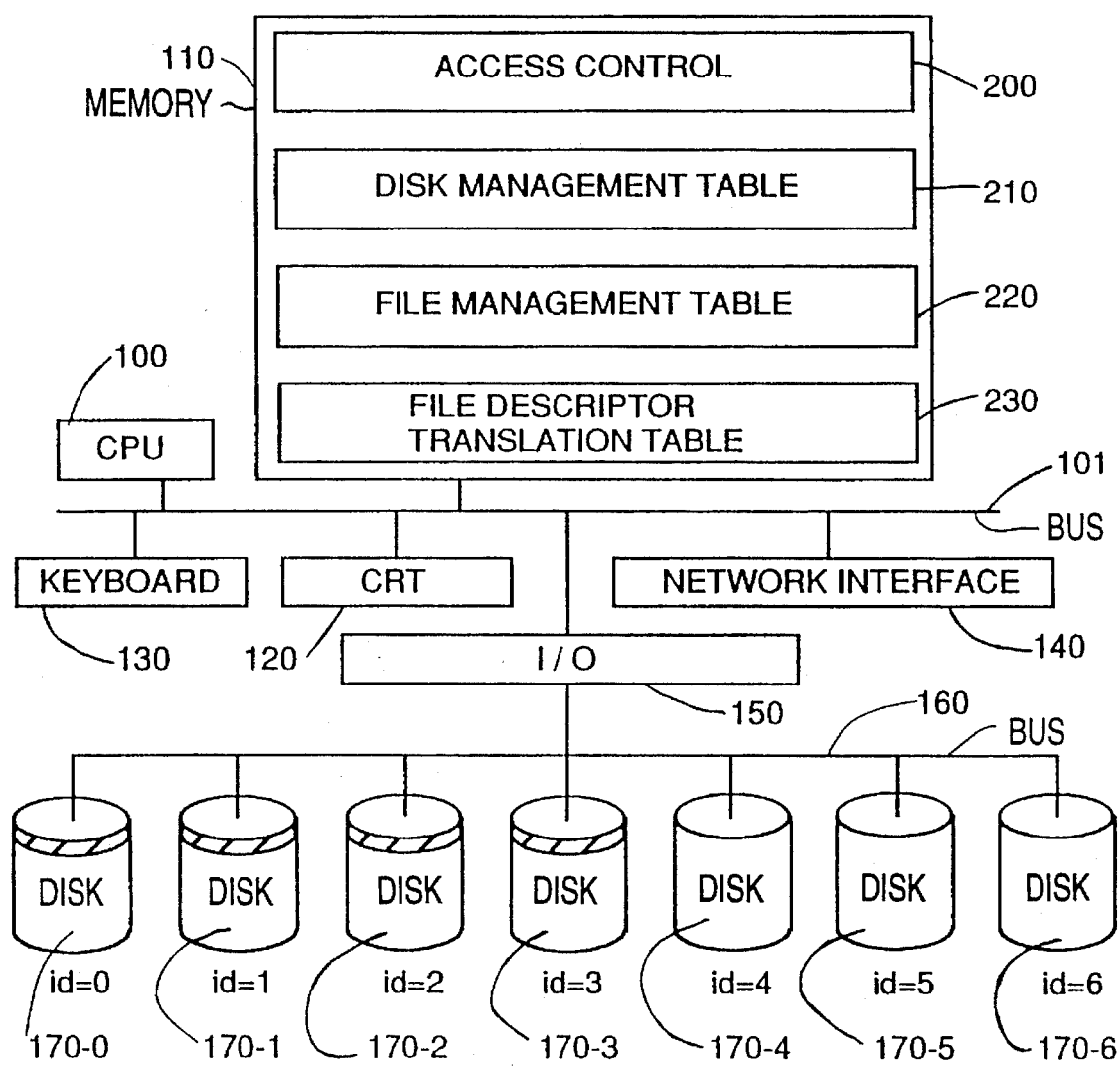
FIG. 6 is a diagram showing further details of FIG. 1.

FIG. 6 shows further details of FIG. 1 of the present invention. In FIG. 6, access to a file can be accomplished without an application program being conscious that the file is divided into a plurality of subfiles and that these subfiles are stored in different magnetic disk subsystems, more generally known as storage subsystems.

The following individual tables and programs are used to assign the magnetic disk subsystems to be used as the virtual array, to divide the file into the plurality of subfiles and translate them to the magnetic disk subsystems, to control the access so that the plurality of subfiles appear as a group of files, and to control the asynchronous reading and writing operations.

There are stored in a memory 110: a disk management table 210 for storing the disk management information; file management tables 220 for storing the file management information; and a file descriptor translation table 230 for storing the file descriptor translation information. An access control program 200 performs the access controls with reference to the aforementioned individual tables at the time of writing and reading the file for the virtual array. The aforementioned individual tables and program are stored in the memory 110 of the computer system 400 of FIG. 1.

The aforementioned individual tables can be either given from an application program or managed as a management table in the OS. The specific constructions of the individual tables will be described in the following.

FIG. 7 is an explanatory diagram of the disk management table 210. This disk management table stores information relating to what partition (i.e., divided area) of what magnetic disk subsystem is used to construct the virtual array.

To each magnetic disk subsystem, there is assigned the id number used for discriminating the magnetic disk subsystem in the SCSI interface and the magnetic disk subsystem name used for discriminating the magnetic disk subsystem by the application software. Since the magnetic disk subsystem is usually distributed and used for a plurality of partitions, these partitions are individually given partition numbers. As a result, the unit area for utilizing the magnetic disk subsystems in the system can be assigned by combining the id number or the magnetic disk subsystem name and the partition number. This will be called the "logical disk subsystem". In the example as shown in FIG. 7, the individual partitions of the disk subsystem name hd6 are defined as the logical disk subsystem such that the sixth partition (numbered 5) is the logical disk subsystem having a name hd65. A plurality of these logical disk subsystems are combined and used as the "logical virtual array subsystem".

The disk management table 210 is a matrix of the id number or name of a magnetic disk subsystem and a partition number, and indicates what combination of the logical disk subsystems is defined as the logical virtual array subsystem name VA.

The four magnetic disk subsystems having names hd0 to hd3 will be defined as a virtual array subsystem va0, and discriminators va000 to va003 are written, as shown in FIG. 7, in case each 0th partition is used as a logical virtual array subsystem va00, as shown in FIGS. 1 or 6. As a result, the 0th partitions of the magnetic disk subsystems hd0 to hd3 are defined as the logical virtual array subsystem va00.

If the logical virtual array disk subsystem va00 is mounted by setting the disk management table 210 thus far described, the 0-th partition of the four magnetic disk subsystems hd0 to hd3 can be used as the storage subsystem of the divided storage file system.

Here, a discriminator vaXYZ (wherein letters X, Y and Z designate numerals of one digit) indicates that the logical disk subsystem is a component of the virtual array subsystem vaX, a component of the logical virtual array disk subsystem vaXY composed of the Y-th partition of the virtual array subsystem vaX and a Z-th component of the logical virtual array subsystem vaXY.

The disk management table 210 is set by the system manager at the instant when the system construction of the present computer system is defined. This is because the set content of the disk management table 210 has to be registered with the used state of each logical disk subsystem, i.e., whether or not it is used for the ordinary file storage and whether or not it is used for storing the subfiles.

If a later-described mounting step is carried out for the logical virtual array subsystem va00 by setting the aforementioned disk management table 210, the four magnetic disk subsystems hd0 to hd3 can have 0th partitions used as the logical virtual array subsystem va00.

Figure 8:
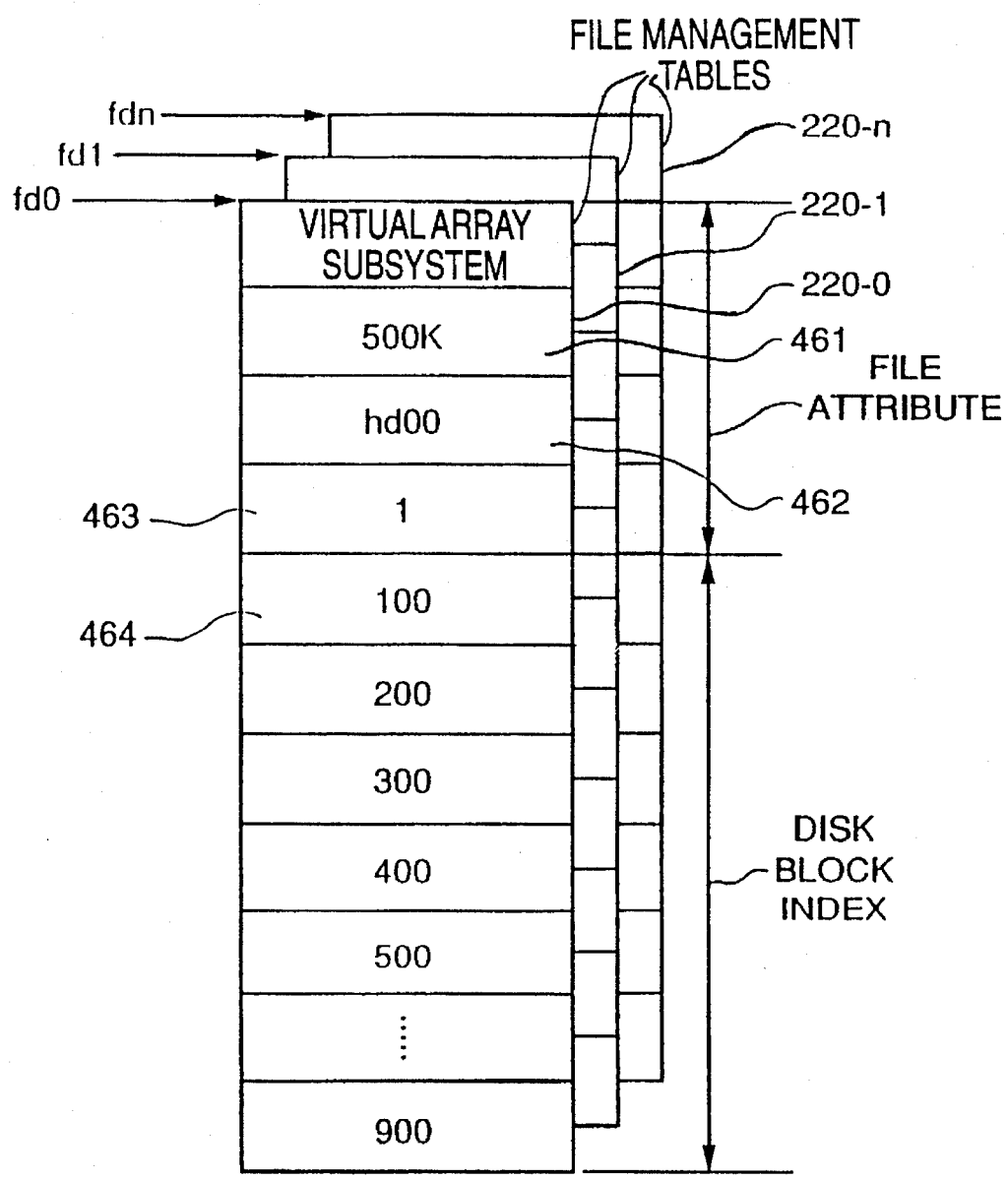
FIG. 8 is a diagram showing a file management table of FIG. 6.

FIG. 8 is an explanatory diagram of the file management table 220. This file management table 220 is assigned to each subfile and is divided into a file attribute area and a disk block index area. The file management table 220 is related to the file descriptor of each subfile that indicates the head of the file management tables 220-0 to 220-n.

The file attribute area is constructed of entries to be stored with a file type, a file size, a storage device and a striping block. The file type, VA of FIG. 8, stores discriminators indicating whether the file to be managed by this table is stored in the virtual array subsystem or a file to be stored in an ordinary magnetic disk subsystem. The file size 461 stores the capacities of subfiles. The storage device 462 indicates the magnetic disk subsystems to be stored with the subfiles. The striping block 463 stores the number of unit data blocks of the division size when the file is divided into subfiles or striped. Specifically, the individual subfiles are prepared by dividing the files from their heads for the striping number of those data blocks.

The disk block index area 464 stores the logical block number on the disk as the index information of the data block. In the present FIG. 8, the individual data blocks constructing a file are stored in the logical block numbers 100, 200, 300, - - - , and 900.

The file management table, one of 220-0 to 220-n, is prepared for each subfile by an access control program when making the file to be stored in the virtual array disk. From now on, the file management table continues until the file is erased and it is referred to by the access control program when the individual subfiles constructing the file are to be accessed. When the file stored in the virtual array is erased, the individual subfiles are also erased. Simultaneously with this, the file management table is erased.

A table pointer entry 464 stores a pointer in the file management table. The disk block index is stored with the block number indicating the position on the magnetic disk subsystem indicating the stored device entry in which the data blocks composing the subfile are present.

FIG. 9 is an explanatory diagram showing the file descriptor translation table 230. There are shown translations between file descriptors vfd of a master file stored in the virtual array and file descriptors fd of the divided subfiles.

In the example of FIG. 9, the master file of vfd=4 is composed of four subfiles individually having file descriptors fd0=5, fd1=6, fd2=7 and fd3=8. The master file of vfd=20 is also composed of subfiles having file descriptors of fd0=21, fd1=22, fd2=23 and fd3=24.

When a file stored in the virtual array is to be accessed, it has to be opened first. At this time, the file descriptor vfd of the master file is assigned to the access control program. Next, the names of the subfiles are generated from the name of the master file and are used to open the subfiles, and the file descriptors fd0 to fd3 are assigned to the individual subfiles. From now on, the file descriptor vfd is used in case those files are to be accessed. The access control program accesses the individual subfiles by translating with the file descriptor translation table 230 into the file descriptors fd0 to fd3 of the subfiles. The entry of the file descriptor translation table is released to have its content invalidated when the file is closed.

The schematic procedures of controlling the virtual array disk by using the disk management table 210, the file management table 220 and the file descriptor translation table 230 described above will be described in the following.

Figure 10:
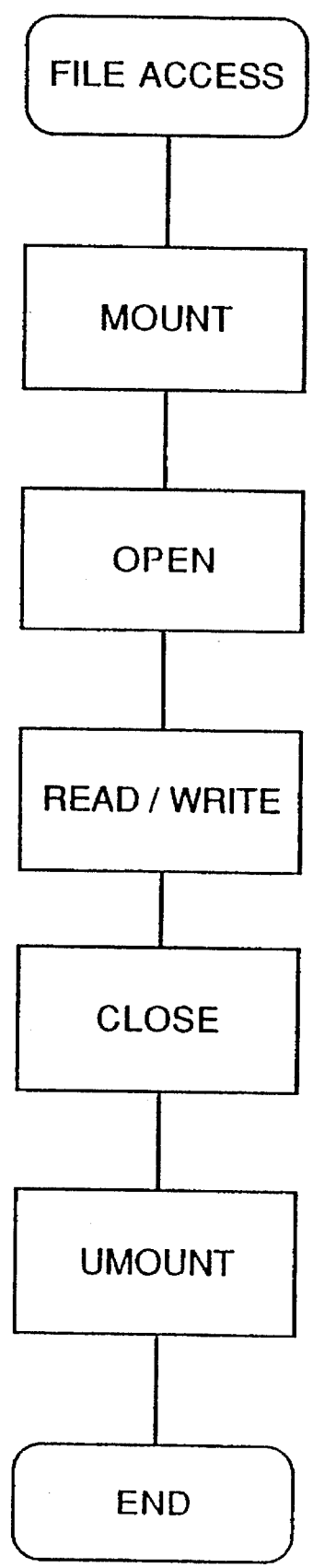
FIG. 10 is a flow chart of the file access.

FIG. 10 shows an entire flow of the access control. The individual steps are started by either commands of the user or function calls of the program. The individual steps are executed by the access control program stored in the memory. The content will be described in the following in accordance with the control flow of FIG. 10.

At the mount step, the virtual array disk is assigned to the place designated by the directory managed by the OS, so that it can be used as a device under the designated directory name from the software. In other words, the logical disk subsystems constructing the logical virtual array subsystem are assigned to the designated places of the directory with reference to the disk management table 210.

At the open step, the file descriptors are assigned to the master file and the subfiles, and they are so registered in the file descriptor translation table 230 that they can be translated.

At the read/write step, the file is read from the virtual array, when the read step is designated, and is written in the virtual array when the write step is designated. In either case, the file descriptors of the subfiles are attained from the file descriptor of the master file by means of the file descriptor translation table 230. Moreover, the file management table 220 is achieved by the file descriptors and accessed to the logical disk subsystem stored with the subfiles.

At the close step, the master file and the subfiles are closed. Specifically, the file descriptor assigned to the master file and the file descriptors assigned to the subfiles are released.

At the unmount step, the individual logical disk subsystems assigned as the virtual array subsystems to the designated directory are eliminated from the designated directory. As a result, the logical disk subsystems again become usable from the software for another request.

The detailed control flows of the individual steps of FIG. 10 will be described in the following with reference to FIG. 11, FIG. 12, FIG. 13, FIG. 14, FIG. 15 FIG. 16 and FIG. 17.

The control flow (1) to (3) of the mount step will be described with reference to FIG. 11. The device name started from "/dev" is the full-pass name used in the mount step and the unmount step.

(1) The names of the magnetic disk subsystems corresponding to va, the logical virtual array subsystem to be mounted and the partition numbers, i.e., the names of the logical disk subsystems are obtained from the disk management table 210.

(2) Mounting directories are made in the directory for mounting the logical virtual array disk subsystem. In case the logical virtual array disk subsystem has a name /dev/va00, as shown in FIG. 12, a directory having a name ".va00" is made at first under the mount directory /data, and directors having names ".va000", ".va001", ".va002" and ".va003" are further made under the directory /data/.va00.

(3) The logical disk subsystems /dev/hd00 to /dev/hd03 corresponding to the individual virtual directories ".va000", ".va001", ".va002" and ".va003" are mounted with reference to the disk management table 210.

Figure 12:
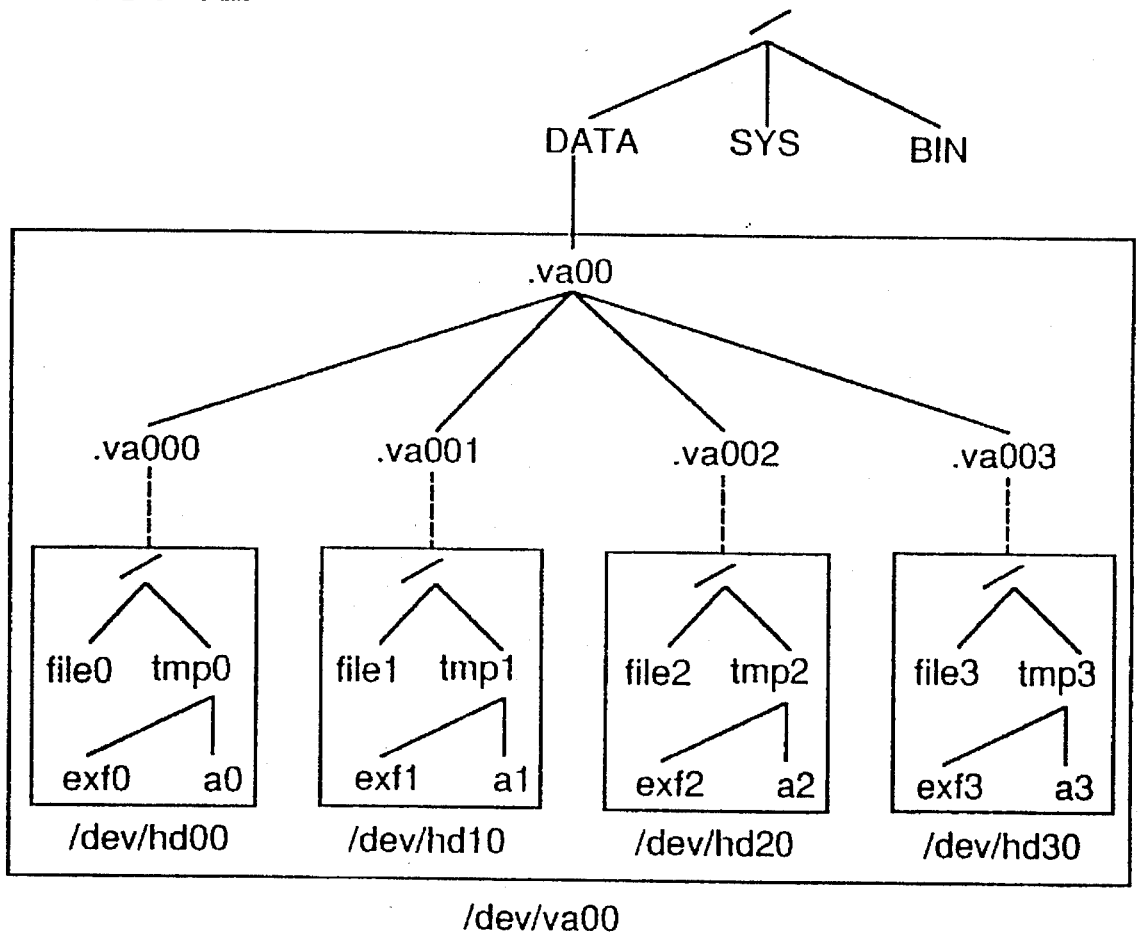
FIG. 12 is a diagram showing a directory structure.

FIG. 12 shows a tree directory structure constructed as a result of the mount step.

Figure 11:
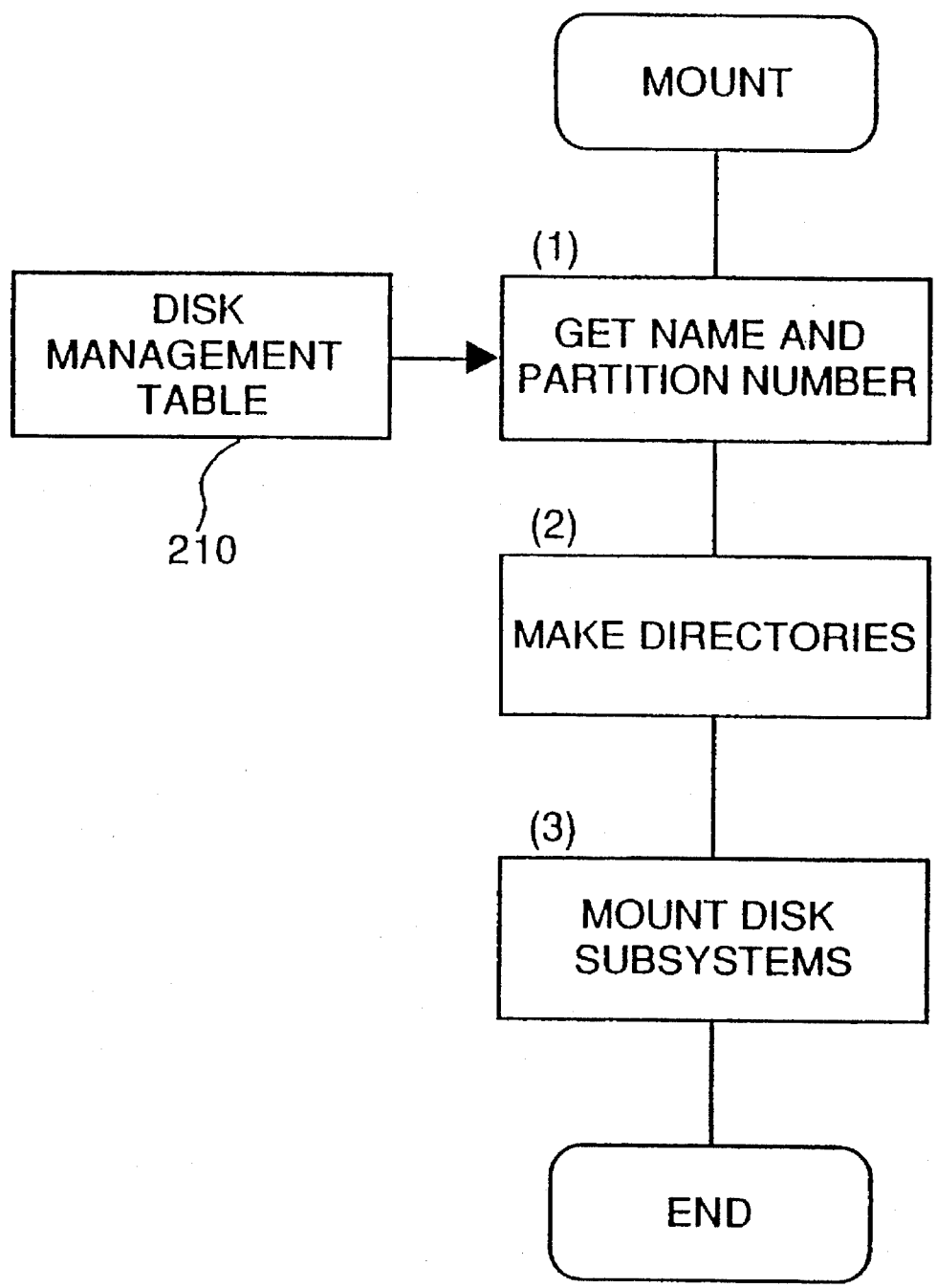
FIG. 11 is a control flow chart of a mount step.

Thus, at the mount step of FIG. 11, the virtual array is mounted under the logical directory having the tree structure of FIG. 12 so that the files in the virtual array are managed by the logical directory having the tree structure. In this example, the logical virtual array subsystem "/dev/va00" is mounted in the "/data" logical directory. The individual magnetic disk subsystems are constructed of the directories of the same structure, under which the individual subfiles are stored. Here, the individual subfile names and directory names are suffixed for discrimination.

Figure 13:
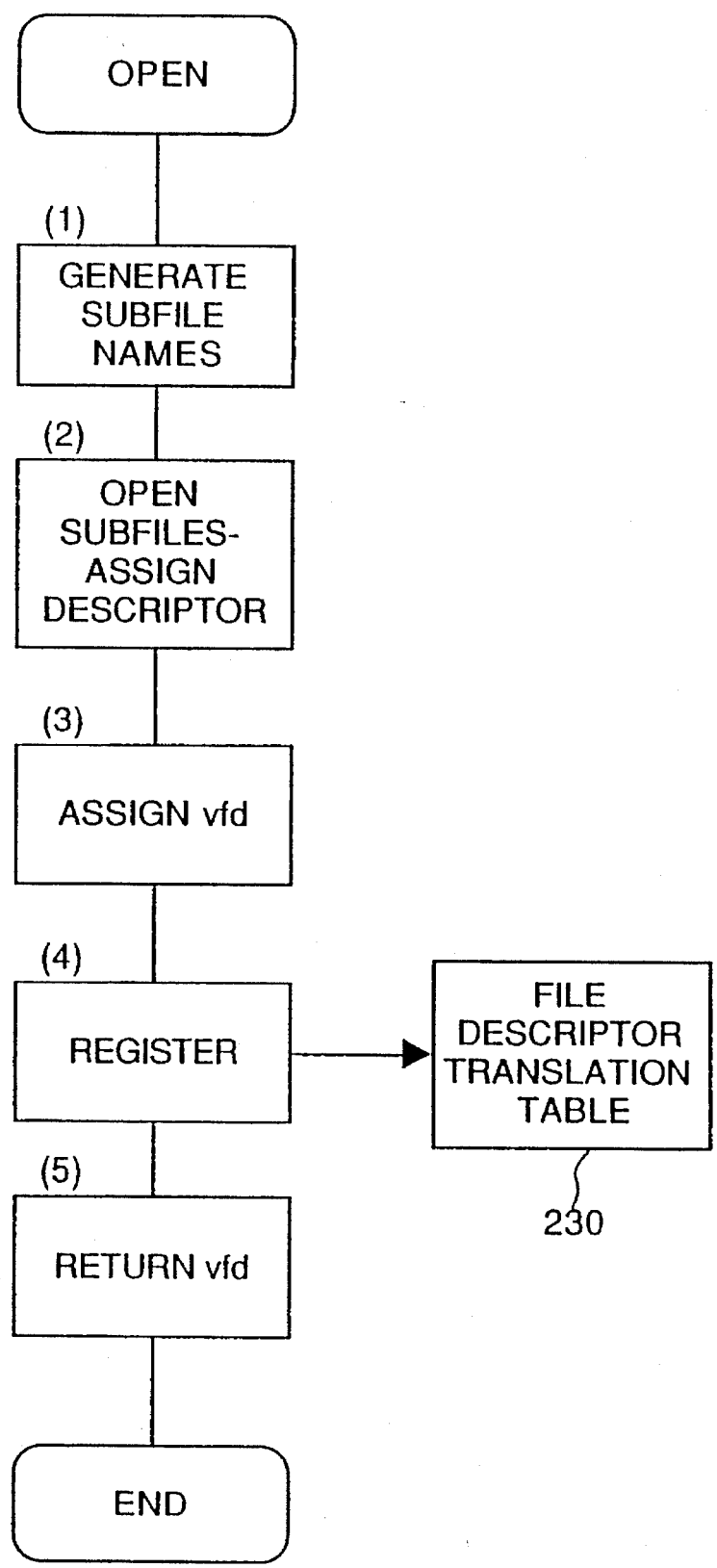
FIG. 13 is a control flow chart of an open step.

The control flow (1) to (5) of the open step will be described with reference to FIG. 13.

(1) The names of subfiles are generated by suffixing the name of a designated master file to be opened.

If a name "/data/file" is designated for the master file in the logical directory structure of FIG. 12, for example, the following logical virtual file names of the subfiles are generated:

/data/.va00/.va000/file0;
/data/.va00/.va001/file1;
/data/.va00/.va002/file2;
and
/data/.va00/.va003/file3.

(2) The individual subfiles are opened by using their logical virtual file names, and the file descriptors fd0 to fd3 are assigned. As a result, the file descriptors fd0 to fd3 of the individual subfiles can be translated to the file management table 220 to perform the access using the logical file descriptors from the application program.

(3) The file descriptor vfd is assigned to the master file.

(4) The file descriptor vfd of the master file and the file descriptors fd0 to fd3 of the subfiles are paired and registered in the file descriptor translation table 230.

(5) The file descriptor vfd of the master file is returned as a result of the present open step, i.e., as the return value of the open call to the application program.

Figure 14:
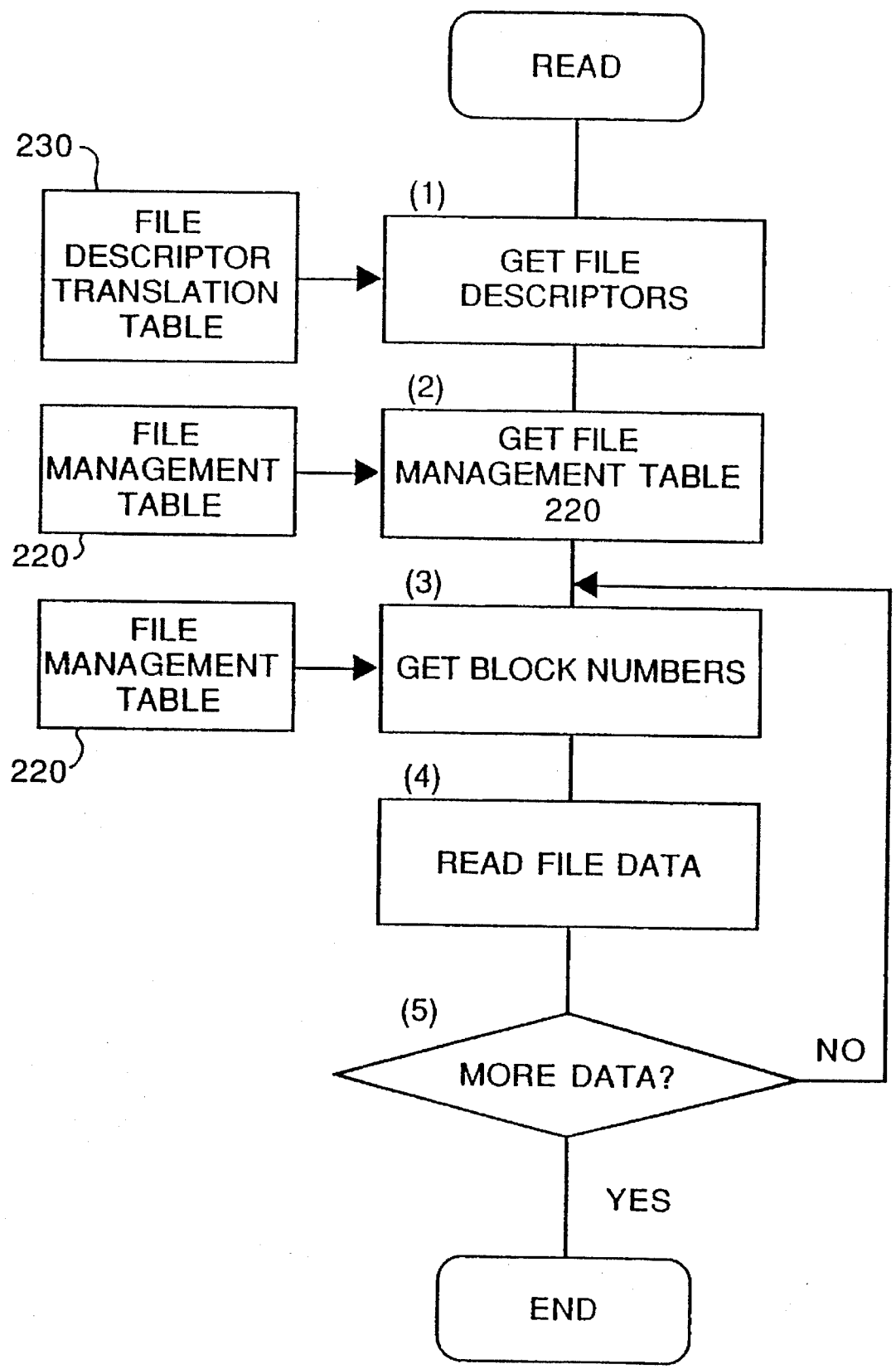
FIG. 14 is a control flow chart of a read step.

Next, the control flow (1) to (5) for executing the read step in the read/write step of FIG. 10 will be described with reference to FIG. 14.

(1) An access request is issued by using the file descriptor vfd of the master file as an argument from the application program. The file descriptor translation table 230 is sought by using the file descriptor vfd as the argument to get the file descriptors fd0 to fd3 of the subfiles corresponding to the file descriptor vfd. In case the file descriptor vfd of the master file is 4, as shown in FIG. 9, then numbers 5, 6, 7 and 8 are gotten as the file descriptors fd0 to fd3 of the subfiles.

(2) Next, the file management table 220 of the subfiles are gotten from their file descriptors fd0 to fd3.

(3) The order of accessing the subfiles follows that of the suffixes of the descriptors of the disk management table 220. The logical block numbers of the data blocks to be read are gotten by referring to the file management table 220 of the subfiles in that order. In the example of FIG. 7, the logical disk subsystems /dev/hd00, /dev/hd01, /dev/hd02 and/dev/hd03 are accessed in the recited order. When the data blocks are accessed in the number designated by the striping block written in the file management table 220, an access is made to a next subfile. With reference to the file management table of the next subfile, the data blocks are accessed by the number designated by the striping block. In accordance with this procedure, the logical block numbers of the data blocks to be read are sequentially gotten.

(4) The block data are read in accordance with both the logical block number of the data block to be read from the magnetic disk subsystem and the logical disk subsystem written in the storage device entry of the file management table 22 of the subfiles. The magnetic disk subsystem actually accessed can be gotten as the magnetic disk subsystem including the corresponding logical disk subsystem in its portion with reference to the disk management table 210.

(5) Finally, it is decided whether or not all the data blocks to be read are read in. If there is a data block left to be read, the flow is returned to the step (3).

Figure 15:
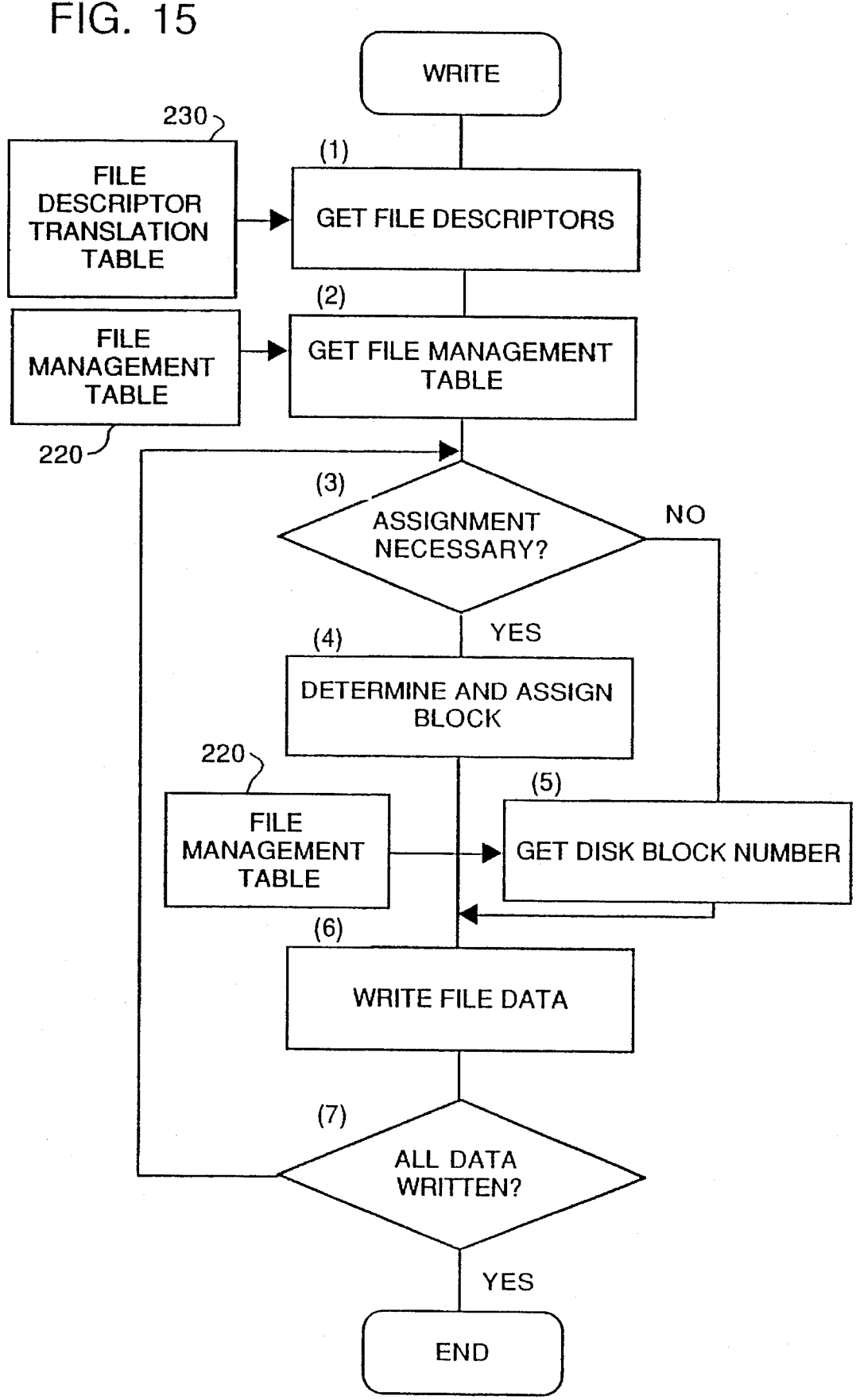
FIG. 15 is a control flow chart of a write step.

Next, the control flow (1) to (7) for executing the write step in the read/write step of FIG. 10 will be described in the following with reference to FIG. 15. The schematic procedure for accessing the data blocks of the subfiles is similar to that for executing the read step.

(1) An access request is issued using the file descriptor vfd of the master file as an argument from the application program. The file descriptor translation table 230 is sought by using the file descriptor vfd or the argument as a key to get the file descriptors fd0 to fd3 of the subfiles corresponding to the file descriptor vfd. In case the file descriptor vfd of the master file is 4, as shown in FIG. 9, the numbers 5, 6, 7 and 8 are gotten as the file descriptors fd0 to fd3 of the subfiles.

(2) Next, the file management table 220 of the subfiles is gotten from the file descriptors fd0 to fd3.

(3) In case the content of the existing file is to be updated, the content of the data block may be overwritten. In case, however, an additional write is to be performed over the file size, it is necessary to assign a new area for the write. Thus, it is decided whether or not the assignment to a new disk block is necessary. If YES, the flow advances to (4), and if NO the flow advances to (5).

(4) When the disk block is to be assigned, decide what logical disk subsystem is to store what subfile. In case the total data block number of the subfile or the last part of the file is an integer times as large as the number of the data blocks written in the striping block entry of the file management table, the assignment of the data block is executed from the logical disk subsystem stored with a next subfile. Otherwise, the assignment is started from the logical disk subsystem stored with the subfile of the last part of the file. After the data block has been assigned, its logical block number is attained. Then, the flow advances to (6).

(5) The master file has been divided into the subfiles, as has been described in the case of the read step, so that the order of access for synthesizing the subfiles into the master file is determined. As a result, the logical block number of the data block to be written with the file is gotten in accordance with the determined procedure from the file management table 220 of the subfiles corresponding to the write portions.

(6) The data blocks are written in accordance with both the logical block number of the data block to be written in the magnetic disk subsystem and the logical disk subsystem written in the storage device entry of the file management table 220 of the subfiles. The magnetic disk subsystem actually accessed can get the magnetic disk subsystem containing the corresponding logical disk system as its part with reference to the disk management table 210.

(7) Finally, it is decided whether or not all the data blocks to be written are actually written. If there is a data block left to be written, the flow is returned to (3).

Figure 16:
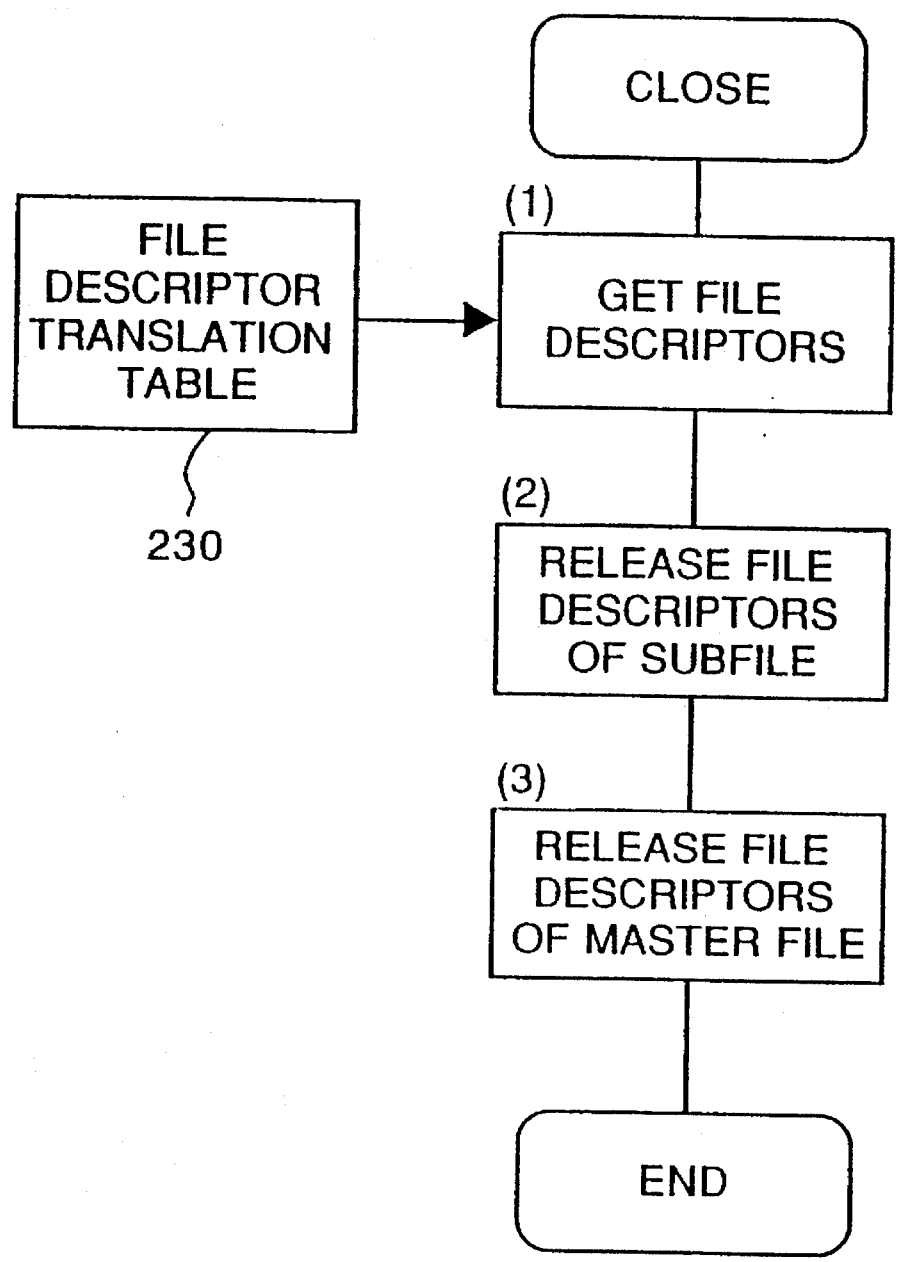
FIG. 16 is a control flow chart of an close step.

The control flow (1) to (3) of the close step of FIG. 10 will be described with reference to FIG. 16.

(1) A close request is issued by using the file descriptor vfd of the master file as an argument from the application program. The file descriptor translation table 230 is sought by using the file descriptor vfd as a key to get the file descriptors fd0 to fd3 of the subfiles corresponding to the file descriptor vfd.

(2) The file descriptors fd0 to fd3 corresponding to the subfiles are released.

(3) The file descriptor vfd corresponding to the master file is released.

Figure 17:
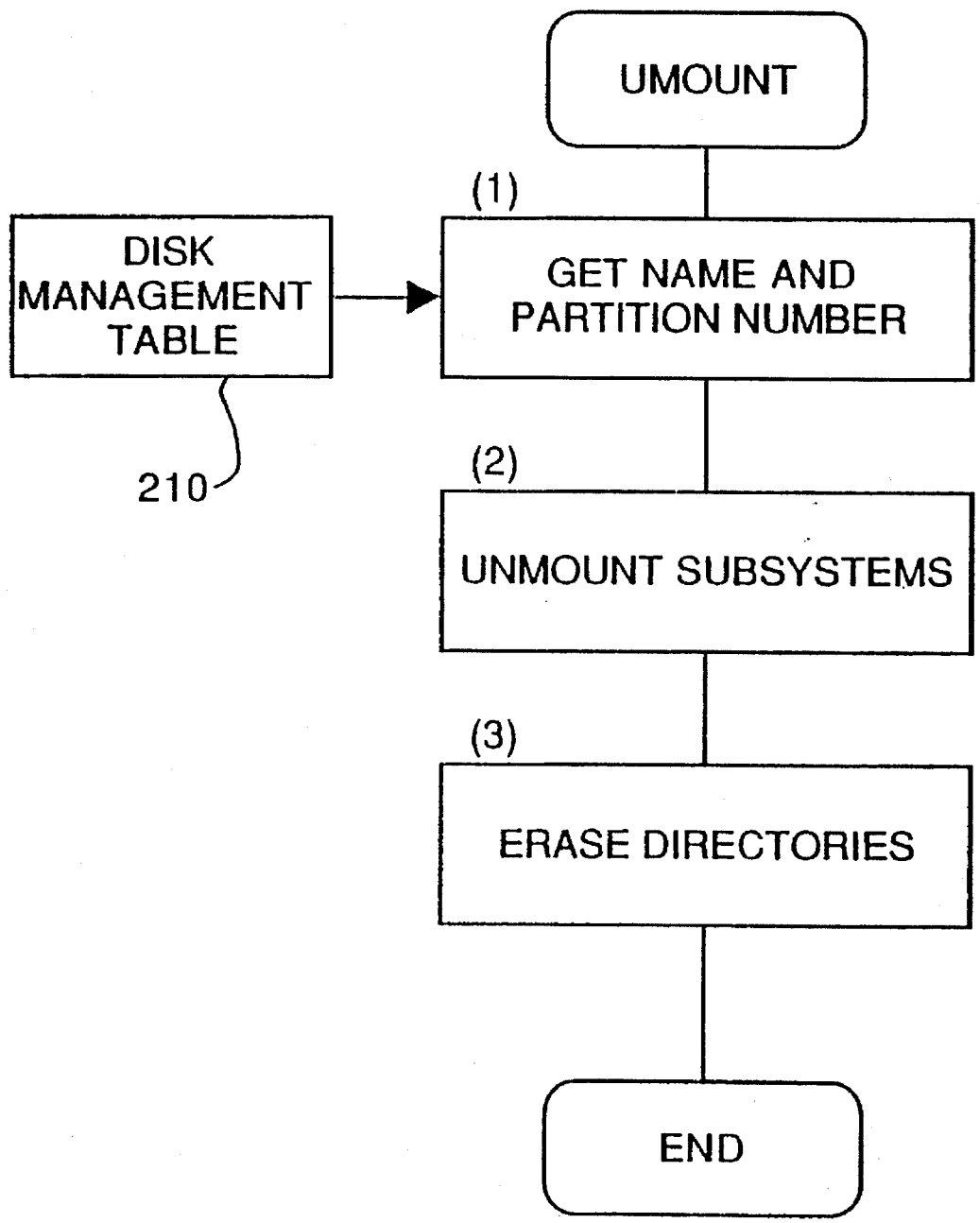
FIG. 17 is a control flow chart of an unmount step.

Finally, the control flow (1) to (3) of the unmount step of FIG. 10 will be described in the following with reference to FIG. 17.

(1) The names and partition numbers of the magnetic disk subsystems corresponding to the logical disk subsystems constructing the logical virtual array disk subsystem to be unmounted are gotten with reference to the disk management table 210.

(2) The aforementioned logical disk subsystems are unmounted. In the example of FIG. 12, the logical disk subsystems /dev/hd00 to /dev/hd30 are eliminated from the directories ".va000", ".va001", ".va002" and ".va003".

(3) The directories made for mounting the virtual array disk are eliminated. In the example of FIG. 12, the directories ".va00", ".va000", ".va001", ".va002" and ".va003" are eliminated.

As has been described hereinbefore, by defining the virtual array disk with reference to the disk management table 210, by translating the master file and the subfiles with reference to the file descriptor translation table 230, and by accessing the subfiles with reference to the file management table 220, there can be attained an advantage that the array of storage subsystems can be utilized over a bus without the request being aware of accessing the plurality of subfiles, as if the requestor accessed a single file. The requestor may be a person or an application.

Next, the file striping will be described in the following with reference to FIGS. 18 to 21.

In the embodiment shown in FIG. 1, striping is the division of the requested data file into the subfiles. In this case, the subfiles as data blocks A, B, C and D are stored in the recited order in the magnetic disk subsystems having id numbers 0, 1, 2 and 3. then, the data blocks E, F, G and H are also stored in the recited order in the magnetic disk subsystems having magnetic disk subsystems 0, 1, 2 and 3. The writing of the files in this case is shown in FIG. 18, and the file reading is shown in FIG. 19.

Figure 18:
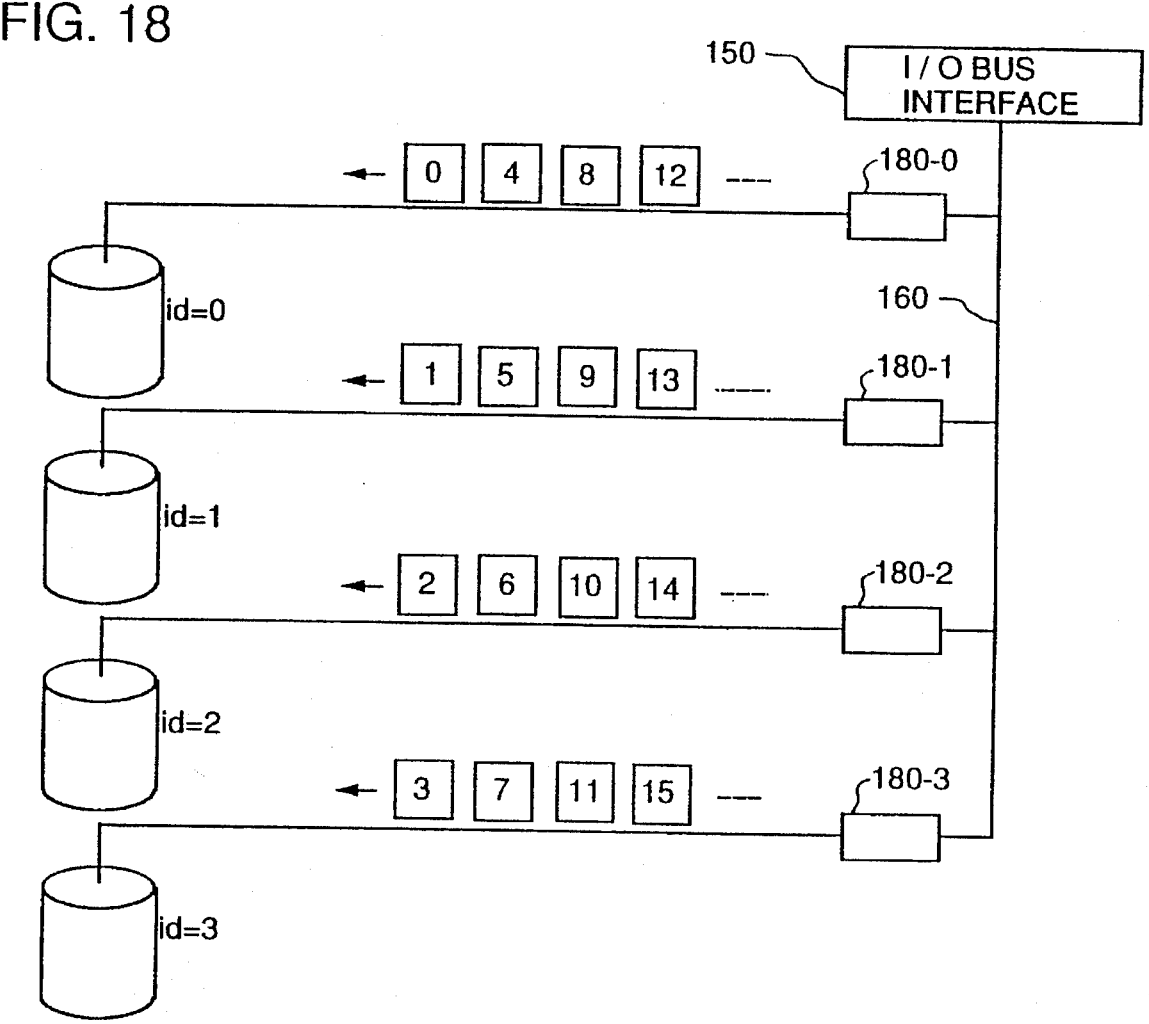
FIG. 18 is a diagram showing writing striping at the unit of one delta block.

FIG. 18 shows the case in which the data subfiles are written in order from the head of the data file. The data blocks are consecutively sent from the host CPU system 100 through the I/O bus interface 150. By the disconnect/reconnect functions, the individual magnetic disk subsystems are consecutively connected with the I/O bus interface 150 so that the data blocks 0, 1, 2, 3, 4 etc. are stored in the magnetic disk subsystems having id numbers 0, 1, 2, 3, 0 etc. The order of the storing in magnetic disk subsystems need not always follow the order of the id numbers, and the storage can be started from a magnetic disk subsystem having an id number other than 0. Moreover, the order of the id numbers may be other than the increasing or decreasing order. The order may change for other requests.

Figure 19:
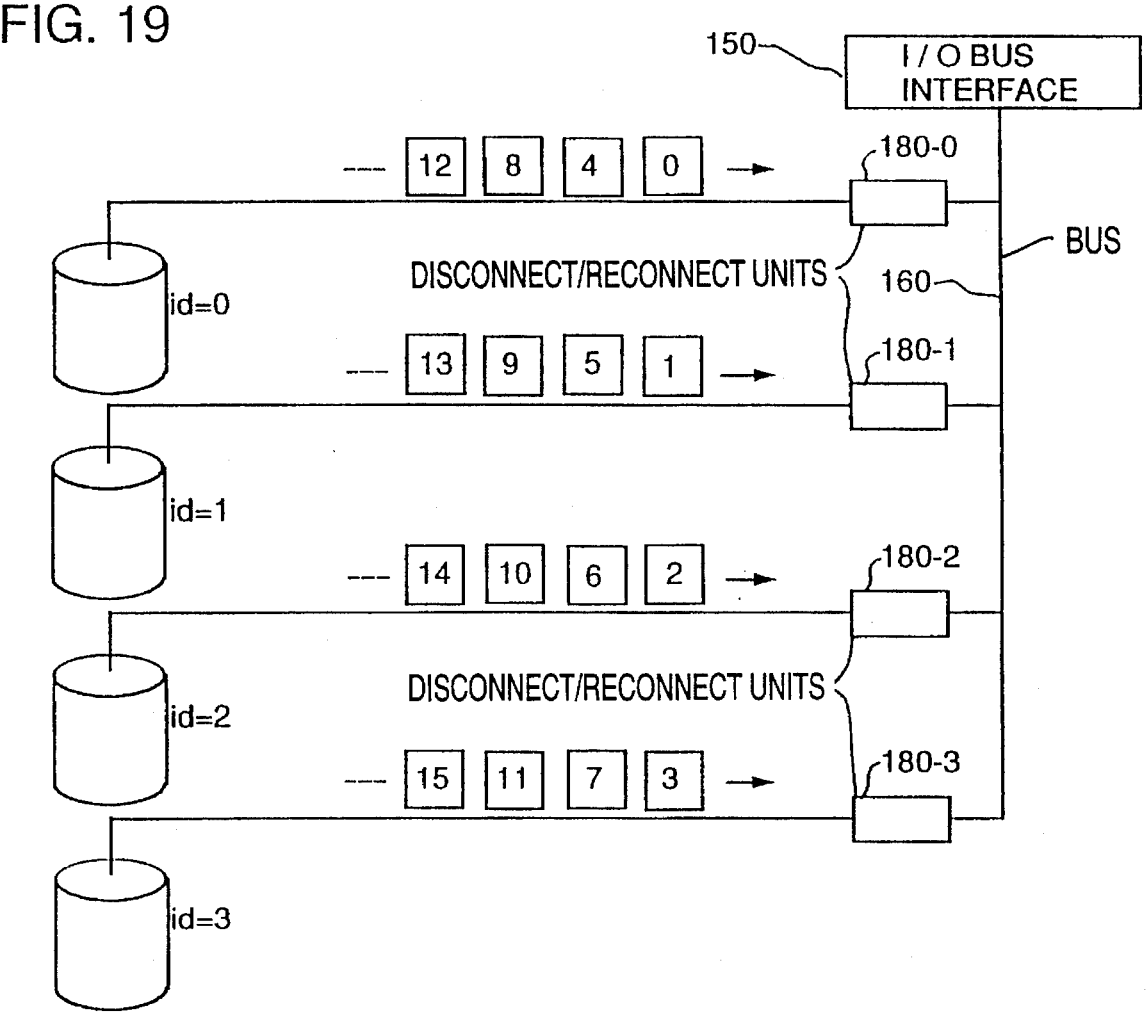
FIG. 19 is a diagram showing reading striping at the unit of one data block.

FIG. 19 shows the case in which the files are consecutively read from the head. The data blocks are consecutively sent to the host CPU system 100 through the I/O bus interface 150. The data blocks are stored, as shown in FIG. 18, and the individual magnetic disk subsystems are consecutively connected by the disconnect/reconnect functions with the I/O bus interface 150 so that the data blocks 0, 1, 2, 3, 4 etc. are read out from the magnetic disk subsystems having the id numbers 0, 1, 2, 3, 0 etc. The order of the storing magnetic disk subsystems need not always follow the order of the id numbers, but the storage can be started from a magnetic disk subsystem having an id number other than 0. Moreover, the order of the id numbers may be other than the increasing or decreasing order. This order may change from one request to the next request.

On the other hand, the number of data blocks can be used as the striping unit. For example, writing files using the four data blocks as a striping unit is shown in FIG. 20, and the file reading is shown in FIG. 21.

Figure 20:
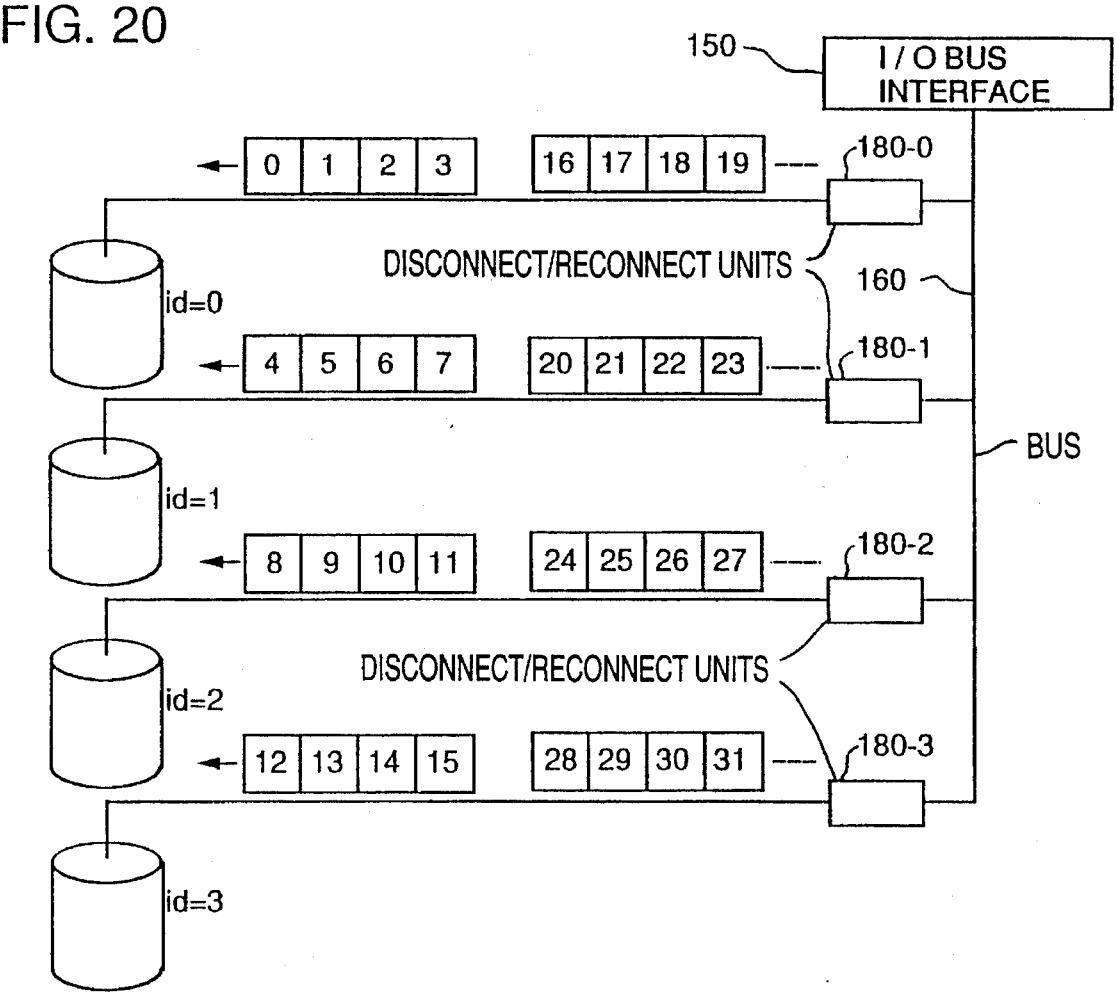
FIG. 20 is a diagram showing writing striping at the unit of four data blocks.

FIG. 20 shows the case in which the subfiles are consecutively written from the data file head by using the four data blocks as a striping unit. The data blocks are consecutively sent from the host CPU system 100 through the I/o bus interface 150. By the disconnect/reconnect functions, the individual magnetic disk subsystems are consecutively connected with the I/O bus interface 150 so that the data blocks 0, 1, 2 and 3 are stored in the magnetic disk subsystem having the id number 0, so that the data blocks 4, 5, 6 and 7 are stored in the magnetic disk subsystem having the id number 1, so that the data blocks 8, 9, 10 and 11 are stored in the magnetic disk subsystem having the id number 2, so that the data blocks 12, 13, 14 and 15 are stored in the magnetic disk subsystem having the id number 3, so that the data blocks 16, 17, 18 and 19 are stored in the magnetic disk subsystem having the id number 0, etc. The order of the storing magnetic disk subsystems need not always follow the order of the id numbers, but the storage can be started from a magnetic disk subsystem having an id number other than 0. Moreover, the order of the id numbers may be other than the increasing or decreasing order. The order may change from request to request.

Figure 21:
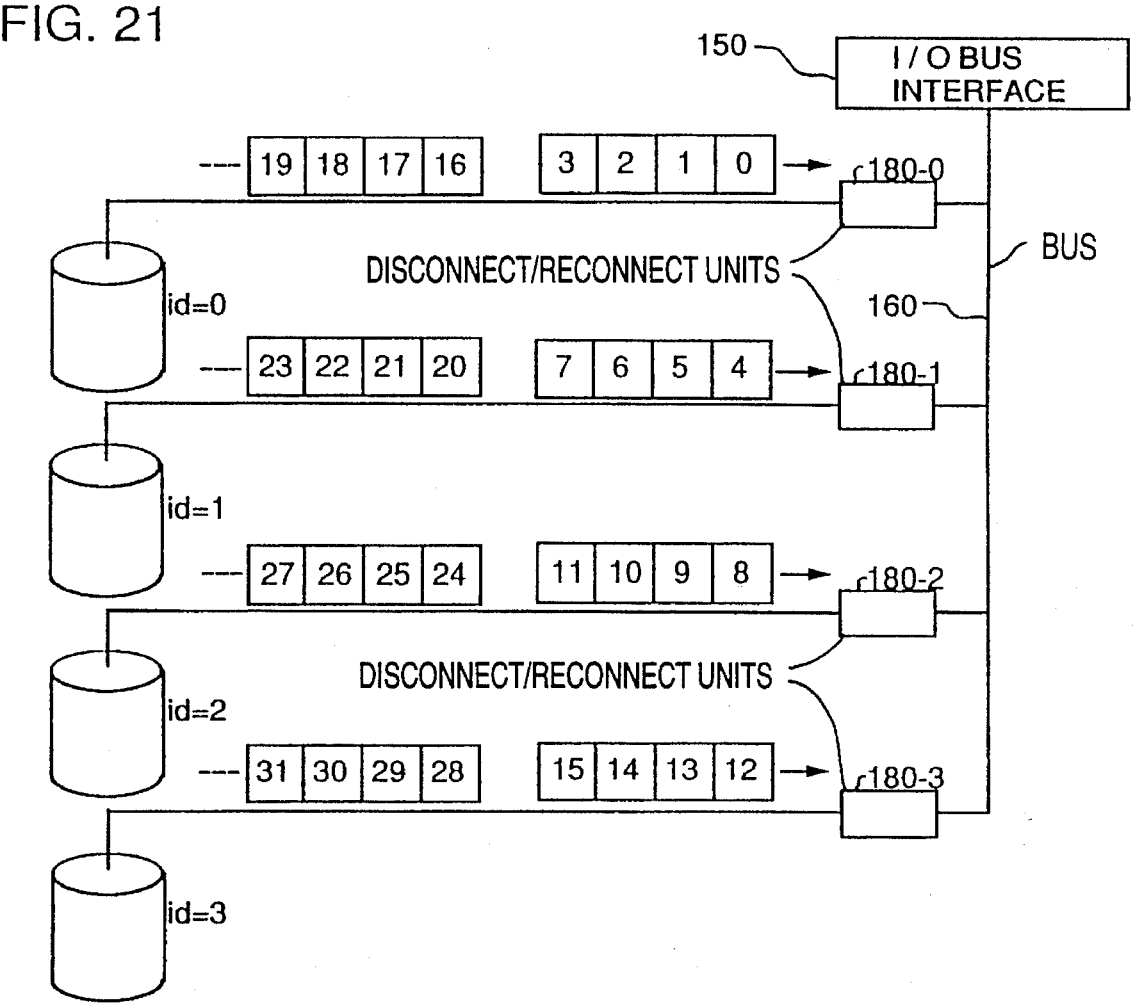
FIG. 21 is a diagram showing reading striping at the unit of four data blocks.

FIG. 21 shows the case in which the subfiles are consecutively read from the head by using the four data blocks as a striping unit. The data blocks are consecutively sent to the host CPU system 100 through the I/O bus interface 150. By the disconnect/reconnect functions, the individual magnetic disk subsystems are consecutively connected with the I/O bus interface 150 so that the data blocks 0, 1, 2 and 3 are read from the magnetic disk subsystem having the id number 0, so that the data blocks 4, 5, 6 and 7 are read from the magnetic disk subsystem having the id number 1, so that the data blocks 8, 9, 10 and 11 are read from the magnetic disk subsystem having the id number 3, so that the data blocks 16, 17, 18 and 19 are read from the magnetic disk subsystem having the id number 0, etc. The order of the storing magnetic disk subsystems need not always follow the order of the id numbers, but the storage can be started from a magnetic disk subsystem having an id number other than 0. Moreover, the order of the id numbers may be other than the increasing or decreasing order. The order may change from request to request.

The data block number to be used as the striping unit can naturally take an arbitrary value other than the above example of four.

The combination of the logical disk subsystems to be used as the logical virtual array disk subsystem will be described with reference to FIGS. 22 and 23.

In the present embodiment, there are defined the logical disk subsystems used in the disk management table 210 by designating the id numbers or names and the partition numbers of the magnetic disk subsystems. By suffixing a series of discriminators vaXY0, vaXY1 and so on to the plurality of magnetic disk subsystems, as has been described with reference to FIG. 7, the combination of the logical disk subsystems to be used as the logical virtual array disk subsystem are identified. The suffixes to the discriminators have the meanings which have been described in the description of the disk management table of FIG. 7. In the present embodiment, the degree of freedom of the physical arrangement of the subfiles is so high that the following construction can be made. The storage area, which is in the disk subsystems hd4 and hd5 of FIG. 7, for example, can be used as an ordinary logical disk subsystem, not as the logical virtual array disk subsystem unless specified.

Figure 22:
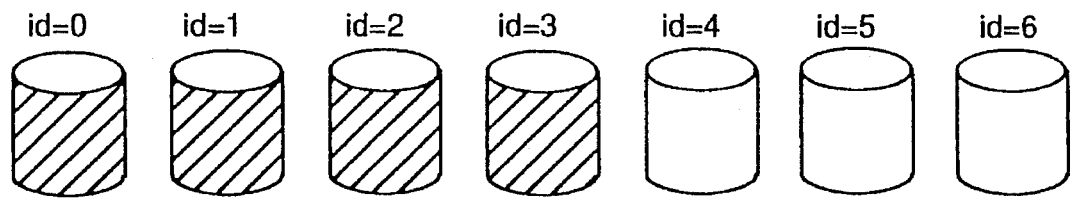
FIG. 22 is a diagram showing a using area of a virtual array.

FIG. 22 shows the case in which all the partitions of the four magnetic disk subsystems having the id numbers 0, 1, 2 and 3 are used as the logical virtual array disk subsystems.

An example of setting the disk management table 210 is shown in FIG. 23 corresponding to FIG. 22. This example corresponds the case in which the four magnetic disk subsystems are defined as the virtual array disk subsystem va0 so that the entirety of the storage area of hd0 to hd3 is used as one logical virtual array disk subsystem va00. The three magnetic disk subsystems having the id numbers 4, 5 and 6 are used as an ordinary logical magnetic disk subsystems.

Figure 24:
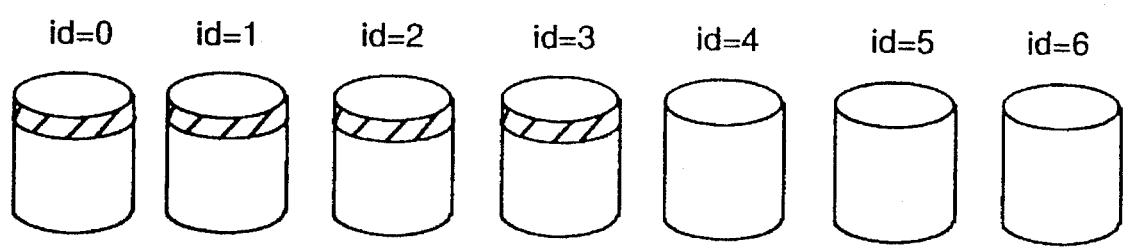
FIG. 24 is a diagram showing a using area of a virtual array.

FIG. 24 shows the case in which the specific partitions of the four magnetic disk subsystems having the id numbers 0, 1, 2 and 3 are used as the virtual array. An example of setting the corresponding disk management table is shown in FIG. 25. This example corresponds to the case in which the area of only the 0th partition of the id number 0–3 is used as the logical virtual array disk subsystem va00. The three magnetic disk subsystems having the id numbers 4, 5 and 6 are used as an ordinary logical magnetic disk subsystem.

Figure 26:
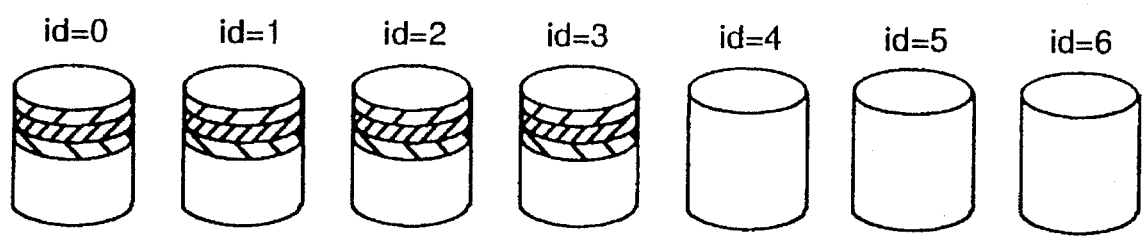
FIG. 26 is a diagram showing using areas of a virtual array.

FIG. 26 shows the case in which three sets of logical virtual array disk subsystems are defined by respectively using the three partitions 0, 1, 2 of the four magnetic disk subsystems having the id numbers 0, 1, 2 and 3. An example of setting the corresponding disk management table 210 is shown in FIG. 27. This example corresponds to the case in which the 0th, 1st and 2nd partitions of the virtual array subsystem va0 is used as the logical virtual array disk subsystems va00, va01 and va02, respectively. The three magnetic disk subsystems having the id numbers 4, 5 and 6 are used as an ordinary logical magnetic disk subsystem.

Figure 28:
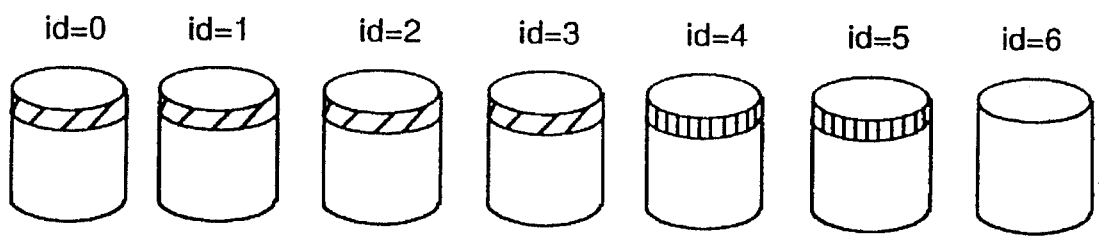
FIG. 28 is a diagram showing using areas of a virtual array.

FIG. 28 shows the case in which two sets of logical virtual array disk subsystems are defined by respectively using specific partitions of the four magnetic disk subsystems having the id numbers 0, 1, 2 and 3 the specific partitions of the two magnetic disk subsystems having the id numbers 4 and 5. An example of setting the corresponding disk management table 210 is shown in FIG. 29. This example corresponds to the case in which the four magnetic disk subsystems having the id numbers 0, 1, 2 and 3 and the two magnetic disk subsystems having the id numbers 4 and 5 are respectively defined as the virtual array va0 and the virtual array va1 so that their individual 0th partitions are used as the logical virtual array disk subsystems va00 and va10. The magnetic disk subsystem having the id number 6 is used as an ordinary logical magnetic disk subsystem.

Figure 30:
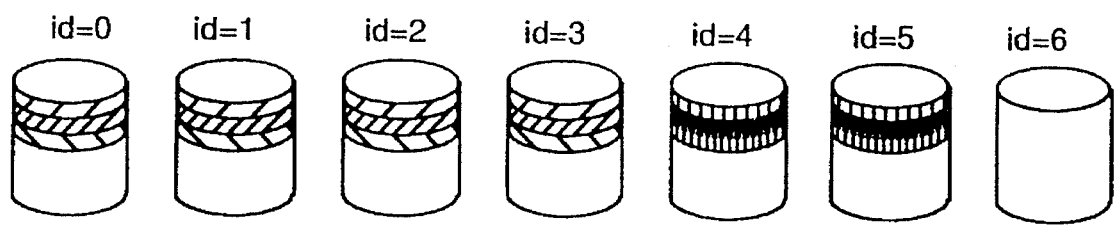
FIG. 30 is a diagram showing using areas of a virtual array.

FIG. 30 shows the case in which six sets of logical virtual array disk subsystems are defined by using both the individual three partitions of the four magnetic disk subsystems having the id numbers 0, 1, 2 and 3 and the individual three partitions of the two magnetic disk subsystems having the id numbers 4 and 5. An example of setting the corresponding disk management table 210 is shown in FIG. 31. This example corresponds to the case in which the 0th, 1st and 2nd partitions of the virtual array disk subsystems va0, va1 as in FIG. 30 are individually used as the logical virtual array disks va00, va01, va02, va10, va11 and va12. The magnetic disk subsystem having the id number 6 is used as an ordinary logical magnetic disk subsystem.

Figure 32:
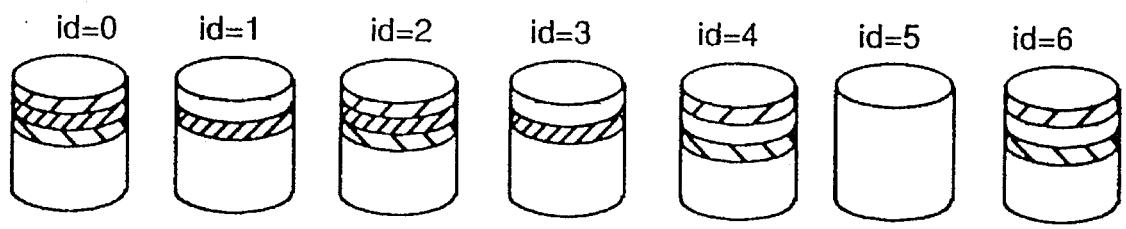
FIG. 32 is a diagram showing using areas of a virtual array.

FIG. 32 shows the case in which three sets of logical virtual array disk subsystems are defined by using partitions 0 and 2 of the magnetic disk subsystems having the id numbers 0, 2, 4, 6, as two sets and the partition 1 of the magnetic disk subsystems having the id numbers 1, 2, 3. An example of setting the corresponding disk management table 210 according to FIG. 32 is shown in FIG. 33. This example corresponds to the case in which the four magnetic disk subsystems having the id numbers 0, 2, 4 and 6 and the partition numbers of 0 and 2 respectively correspond to va00 and va02. The four magnetic disk subsystems having the id numbers 0, 1, 2 and 3 are the virtual array disk subsystems va01 with respect to partition 1. For example, the 0th and 2nd partitions of the subsystem va0 are individually used as the logical virtual array disk subsystems va00 and va02 whereas the 1st partition of the subsystem va1 is used as the logical virtual array subsystem va11. The two magnetic disk subsystems having the id numbers 0 and 2 are defined over the virtual subsystems va0 and va1, but no problem arises if the partitions used are prevented from overlapping. The magnetic disk subsystem having the id number 5 is used as the ordinary logical magnetic disk subsystem.

The partition number and the id number of the magnetic disk subsystems can be realized in a combination other than the aforementioned ones.

FIGS. 34 to 39 show examples in which a mirror mode is realized in the present embodiment. Specifically, this example corresponds to the case in which a set of primary (main) and backup (auxiliary) subsystem are defined as the logical virtual array disk subsystems so that an identical file is stored in the set. As a result, the reliability can be improved by using the backup in place of the primary, if the primary is troubled.

In the file writing case, the file is written in both the primary and backup. First of all, a data block is asynchronously written in the logical virtual array disk subsystem which is defined as the primary in accordance with the above description. Subsequently, a data block similar to that of the primary is also similarly asynchronously written in the logical virtual array disk subsystem which is defined as the backup. After the write instruction to the backup has been issued, the flow transfers to the write step of a next data block so that the data block is written in the primary and the backup in accordance with a procedure as described above. The disk subsystems constructing the individual logical virtual array disk subsystems can be written as hd0, hd2, and hd1, hd3 in the primary and the backup as in FIG. 34, or as hd0, hd3, and hd1, hd2. This write is performed by taking a correspondence of the value Z of the discriminator vaXYZ set in the disk management table as a key. Thus, the mirror mode can be realized while the user hardly realizes the write time to the backup.

In the file reading case, a file is read from only the primary. Specifically, the file is read from the primary by a method similar to that for asynchronous reading of the file stored in the logical virtual array disk subsystem which has not been designated in the mirror mode. If the primary is troubled, however, the file stored in the backup is alternatively used.

Thus, the reliability of the magnetic disk subsystems can be improved. On the other hand, the file is read from only the primary in the ordinary mode described as asynchronous read so that the file can be read at a high speed without any time penalty that might otherwise take place in the presence of the backup.

The combination of the logical disk subsystems to be used as the logical virtual array disk subsystems in the mirror mode will be described in the following with reference to the accompanying drawings. Like the case of defining the logical virtual array disk subsystems not in the mirror mode, the logical disk subsystems to be used with reference to the disk management table 210 are defined by attaching a series of discriminators thereto. Moreover, the primary or the back up and their combination are indicated by an extender. For example, as shown in FIG. 37 letters vaXYZ_p0 indicate that the logical disk subsystem of the discriminator vaXYZ is defined in the system as the component of the primary logical virtual array disk subsystem and makes a pair with the logical disk subsystem of va XYZ-b0 defined as the component of the backup logical virtual array disk subsystem. Incidentally, the area which is not defined as the logical virtual array disk subsystem can be used as an ordinary logical disk subsystem unless specified.

Figure 34:
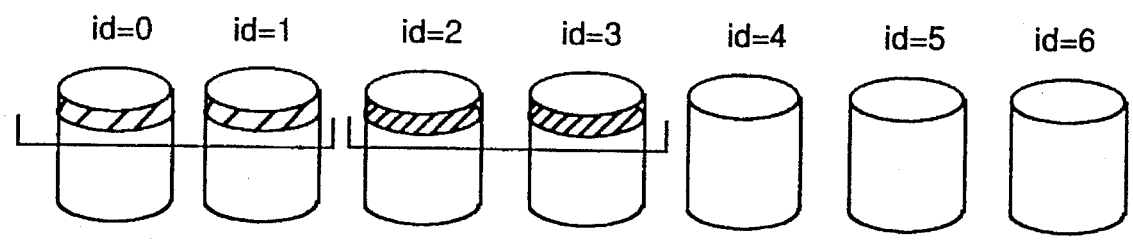
FIG. 34 is a diagram showing using areas in a mirror mode.

FIG. 34 shows the case in which one set of logical virtual array disk subsystems in the mirror mode is defined by using the 0th partition of the two magnetic disk subsystems having the id numbers 0 and 1 as the primary and by using the 0th partition of the two magnetic disk subsystems having the id numbers 2 and 3 as the backup.

Figure 36:
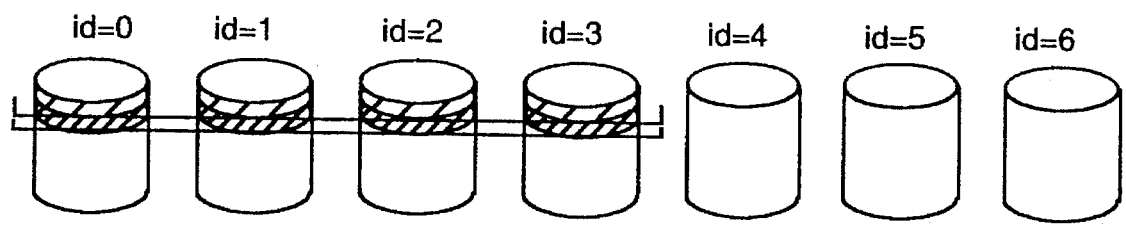
FIG. 36 is a diagram showing using areas in a mirror mode.

An example of setting the corresponding disk management table 210 is shown in FIG. 35. This example corresponds to the case in which the two magnetic disk subsystems having the id numbers 0 and 1 and the two magnetic disk subsystems having the id numbers 2 and 3 are defined as the virtual array disk subsystem va0 and the virtual array disk subsystem va1, respectively, so as to provide the logical virtual array disk subsystems va00_p0 (primary) and va10_b0 (backup). In the example of FIG. 36, the logical disk subsystems va100-b0 and va101-b0 constructing the backup respectively correspond to the logical disk subsystems va000-p0 and va001-p0 constructing the primary. The magnetic disk subsystems having the id numbers 4, 5 and 6 are used as the ordinary logical magnetic disk subsystems.

FIG. 36 shows the case in which one set of logical virtual array disk subsystems in the mirror made is defined by using the four magnetic disk subsystems having the id numbers 0, 1, 2 and 3 and by using the 1st partitions as the primary and the second partitions as the backup.

An example of setting the disk management table 210 corresponding to FIG. 36 is shown in FIG. 37. The four magnetic disk subsystem having the id numbers 0, 1, 2 and 3 are defined as the virtual array disk subsystem va1 so that the 1st and 2nd partitions are respectively the logical virtual array disk subsystems va11_p1 (primary) and va12_b1 (backup). The magnetic disk subsystems having the id numbers 4, 5 and 6 are used as ordinary logical magnetic disk subsystems.

Figure 38:
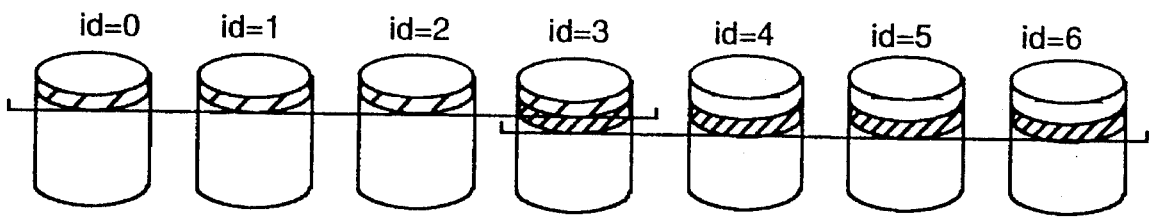
FIG. 38 is a diagram showing using areas in a mirror mode.

FIG. 38 shows the case in which one set of logical virtual array disk subsystems in the mirror mode is defined by using one partition of the four magnetic disk subsystems having the id numbers 0, 1, 2 and 3 as the primary and by using another partition of the four magnetic disk subsystems having the id numbers 3, 4 5 and 6 as the backup.

An example of setting the disk management table 210 corresponding to FIG. 38 is shown in FIG. 39 the four magnetic disk subsystems having the id numbers 0, 1, 2 and 3 and the four magnetic disk subsystems having the id numbers 3, 4, 5 and 6 are defined as the virtual array disk subsystems va2 and va3, respectively, so that their individual third and fourth partitions are used as the logical virtual array disk subsystems va23_p2 (primary) and va34_b2 (backup), respectively.

Figure 40:
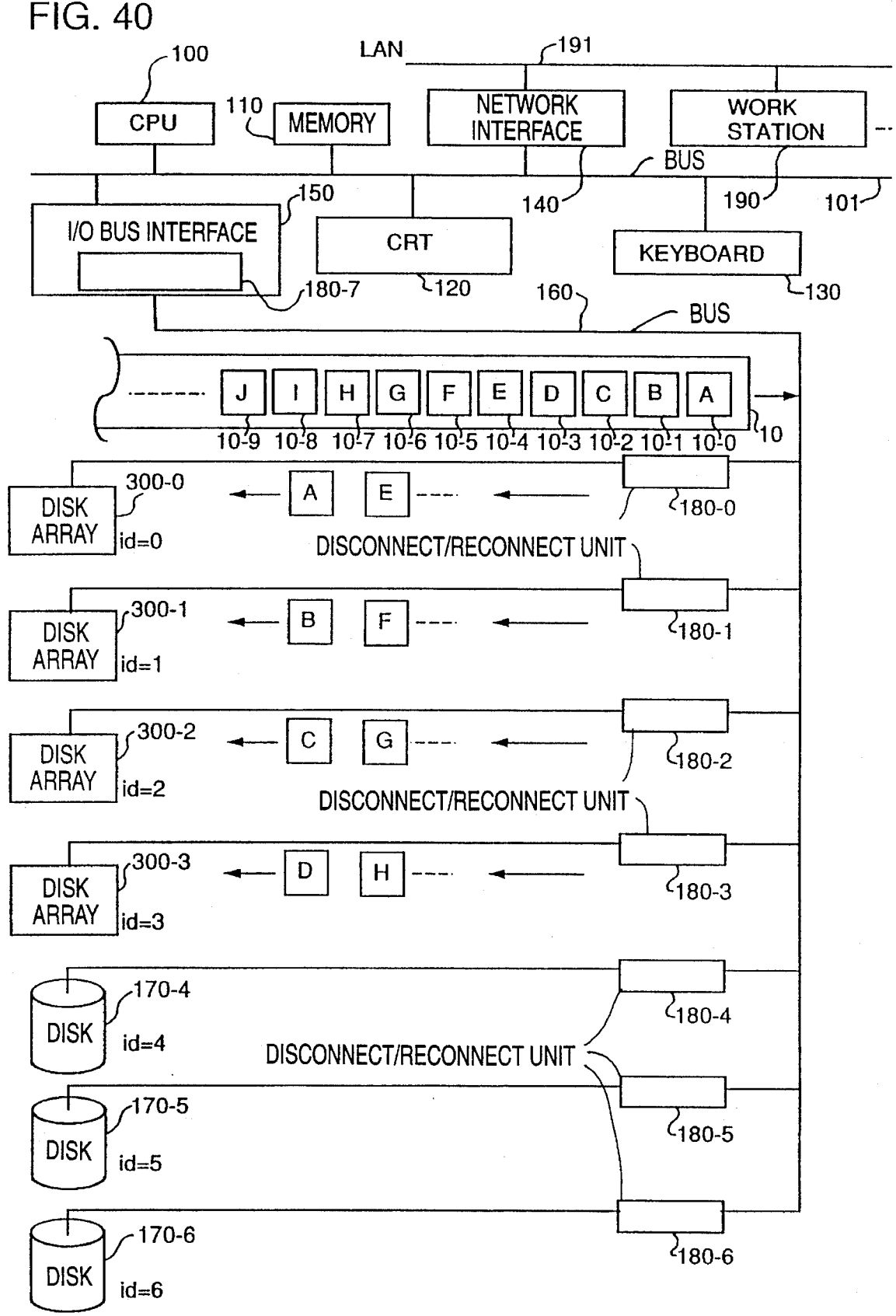
FIG. 40 is a diagram of a system including an array disk.

In FIG. 40 the magnetic disk subsystems 170-0 to 170-3 having the id numbers 0, 1, 2 and 3 in FIG. 1 are more specifically array disk subsystems 300-0 to 300-3. Since the array disk subsystems have a higher file transfer performance as a single unit than the magnetic single disk subsystems, there can be attained an advantage that the file access of the present embodiment can be faster. The operations and control method are absolutely similar to those of FIG. 1.

An example of setting the corresponding disk management table of the virtual array including the array disk subsystems 300-0 to 300-3 is shown in FIG. 41. The four magnetic disk subsystems having the id numbers 0, 1, 2 and 3 constitute the array disk subsystems. Here, the four array disk subsystems ad0, ad1, ad2 and ad3 constitute the virtual array disk subsystem va0. The logical virtual array disk subsystems va01_p0, va02_b0, and va21_p1, va22_b1 correspond to the mirror mode.

The foregoing have been described in case the seven magnetic disk subsystems are connected, but the number of the magnetic disk subsystems can be sequentially increased to 2, 3, 4 and so on. Here, in case the magnetic disk subsystems are increased from 4 to 5, the files stored in the four disks have to be rearranged to the five magnetic disk subsystems.

According to the present invention, the file striping number can be automatically increased by copying the files to new partitions after the number of the magnetic disk subsystems is increased. Specifically, in case the files stored in the virtual array disk subsystems are to be read or written, the requestor can process the files without any awareness of their physical division. As a result, the striping number can be changed, without the requestor knowing, merely by copying the files from the master to the copy, as will be described in the following.

Figure 43:
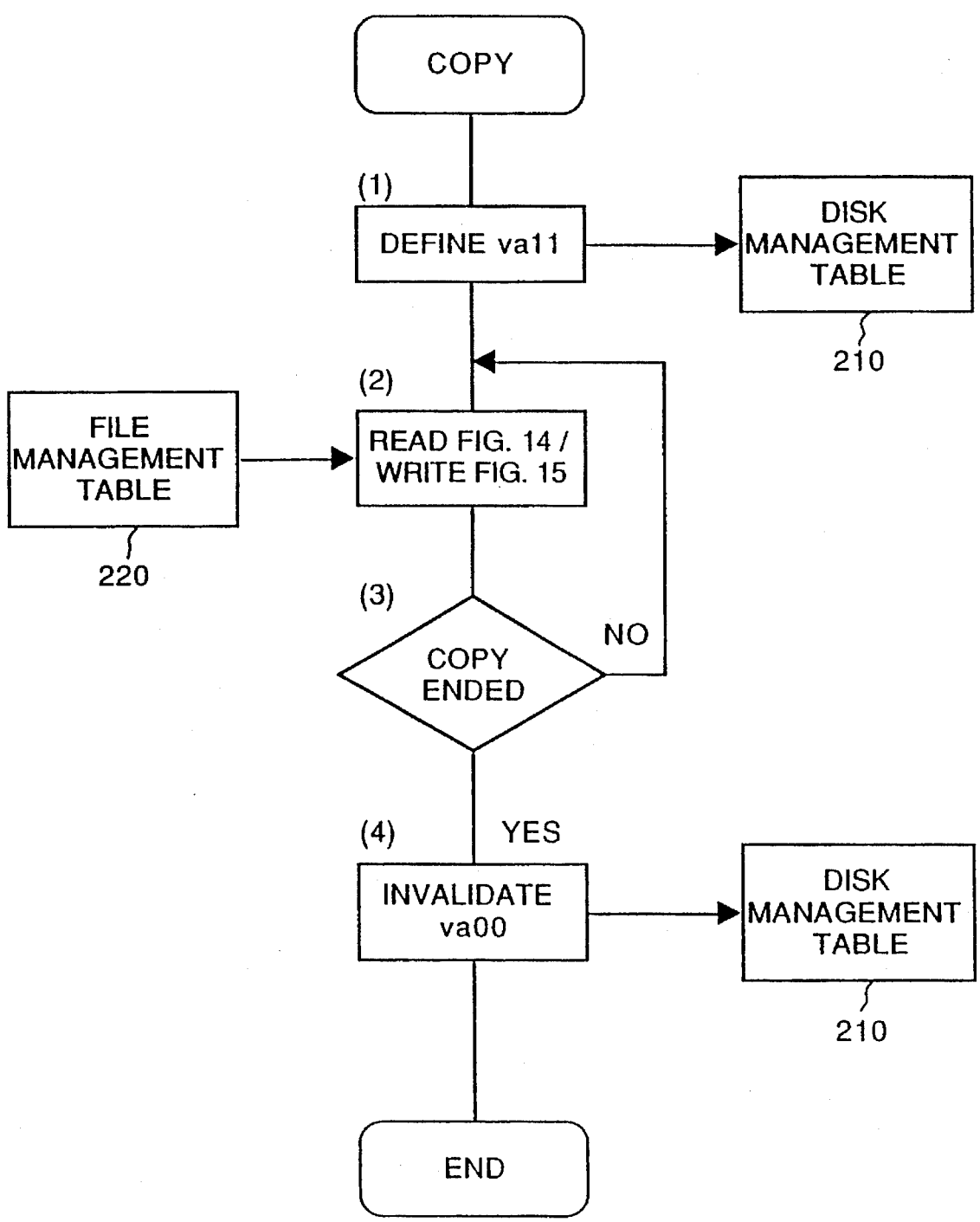
FIG. 43 is a control flow chart of a file copy at the time of increasing the number of disks.

FIG. 42 shows an example of setting the disk management table 210, and FIG. 43 shows a control flow of the file copy in case the number of disks is increased. In FIG. 42, the logical virtual array disk subsystem va00 constructed of the 0th partitions of the magnetic disk subsystems having the id numbers 0, 1, 2 and 3 is the master, whereas the logical virtual array disk subsystem va11 constructed of the 1st partitions of the magnetic disk subsystems having the id numbers 0, 1, 2, 3 and 4 is the copy.

In accordance with the control flow shown in FIG. 43, the file is divided from va00 to va11 into data of subfiles having a fixed length, and the divided subfiles are copied.
(1) The logical virtual array disk subsystem va11 at the copy destination is redefined in the disk management table 210.
(2) the data of the fixed length divided from the file are read according to the file reading control flow of FIG. 14 from the logical virtual array disk sub system va00 at the master, and then this data is written according to the file writing control flow of FIG. 15 to the logical virtual array disk subsystem va11 as the copy.
(3) It is decided whether or not the copy is ended, if NO, the flow returns to (2). If YES, the flow advances to (4).
(4) The logical virtual array disk subsystem va00 at the master on the disk management table 210 is invalidated. In the mirror mode, the back-up is similarly rewritten.

Thus, the striping number accompanying the increase in the number of the magnetic disk subsystems can be easily changed. At this time, an arbitrary block number can be defined as the data of the fixed length to be used as the reading and writing unit.

Figure 44:
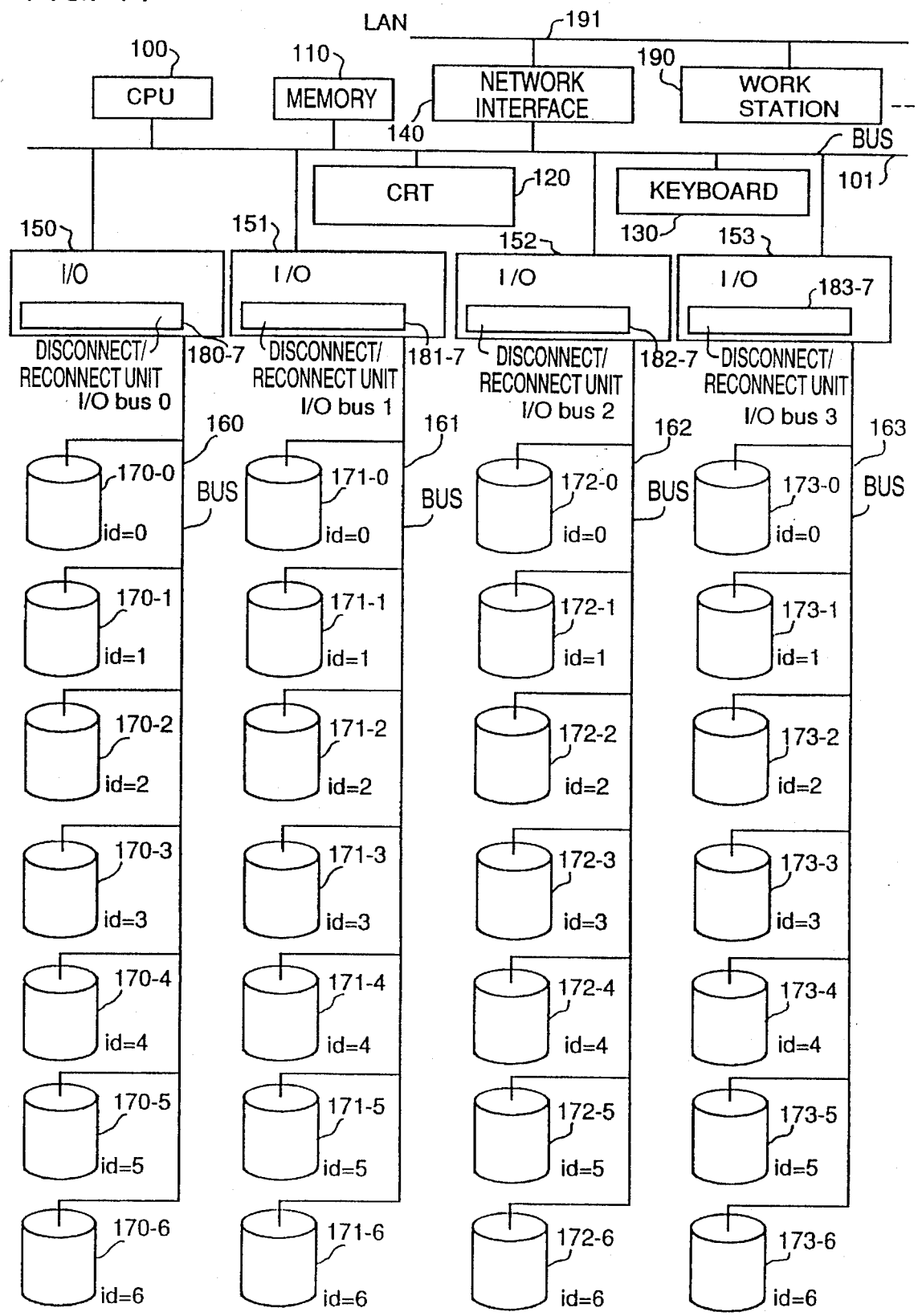
FIG. 44 is a diagram of a system having a plurality of I/O buses.

FIG. 44 corresponds to FIG. 1 having a plurality of I/O buses. The construction of FIG. 1 has one I/O bus 150, but the construction of FIG. 44 has four I/O buses 150–153. As a result, there are four sets of disk subsystems constructed on I/O bus interfaces 150, 151, 152 and 153, I/O buses 160, 161, 162 and 163, and seven magnetic disk subsystems 170-0 to 170-6, 171-0 to 171-6, 172-0 to 172-6 and 173-0 to 173-6 for each I/O bus. Except that the access control program schedules the plurality of I/O buses, the control method of each disk subsystem can be exemplified by those already described. For example, it is possible to accomplish the multiplex access control as that of FIG. 1 for each I/O bus and the multiplex access control one hierarchy over between the I/O buses. It is also possible to accomplish the multiplex access controls for each I/O bus in parallel.

The system of FIG. 44 can achieve the highest data transfer speed in case the speed of the common data bus 101 is four or more times as high as that of the data transfer between the individual I/O buses 160, 161, 162 and 163. The data transfer speed of FIG. 44 is four times as high as that having one I/O bus as in FIG. 1. As a result, the speed of the virtual array disk can be further increased. The present FIG. 44 shows the case of four I/O buses, but the construction can be modified to have the number of I/O buses other than four.

In case the number of magnetic disk subsystems is increased to extend the system, it is possible to increase the number of the magnetic disk subsystems in each I/O bus and at the unit of the I/O bus. As a result, the present embodiment is advantageous in that the system can be more flexibly extended than the array disk subsystem which has to increase the number of the magnetic disk subsystems for each stack.

Thus, according to the present embodiment, there can be attained an advantage to speed up the file access using the virtual array disk subsystems and to realize a flexible extension of the system.

Figure 45:
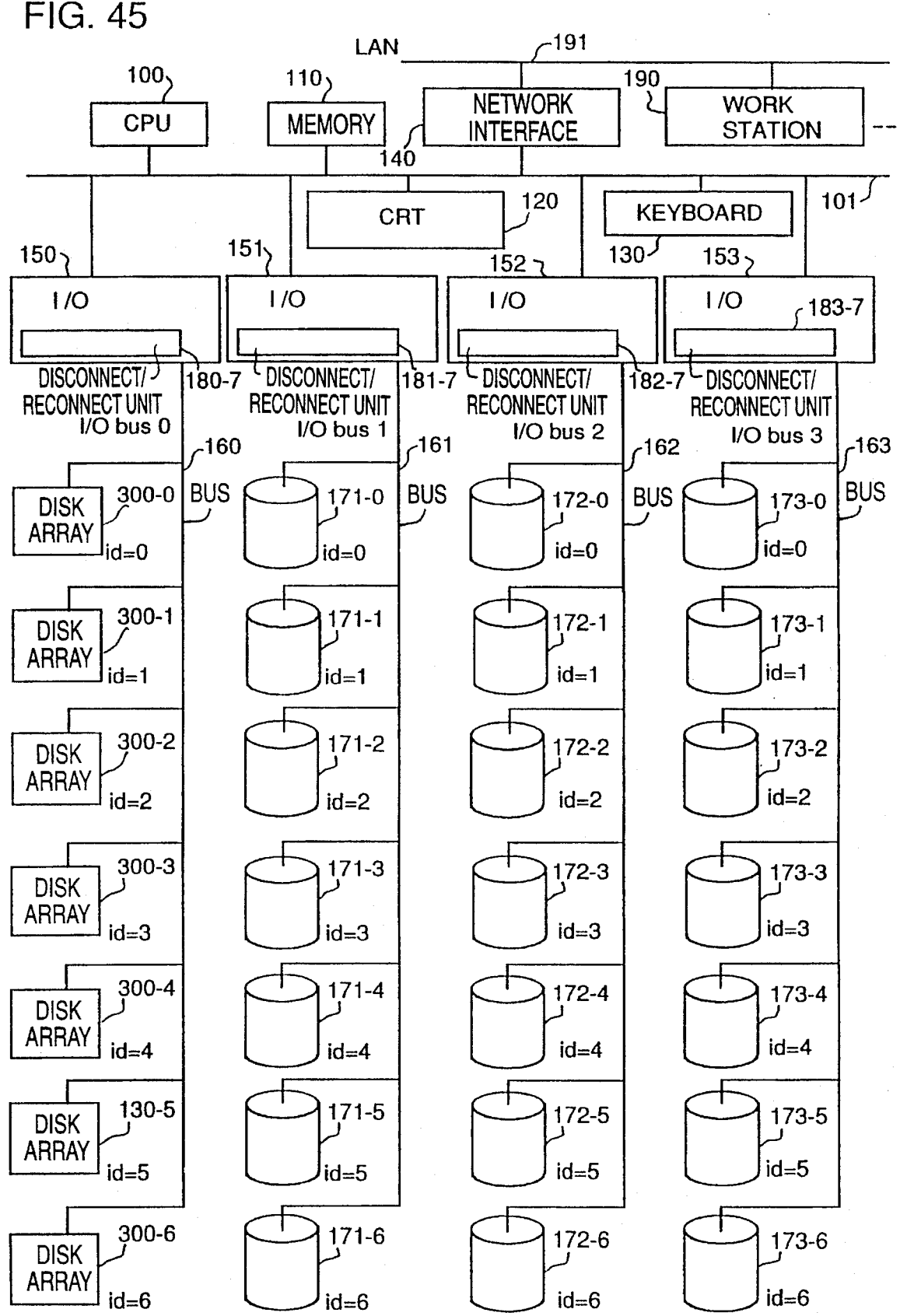
FIG. 45 is a diagram of a system having a plurality of I/O buses and including an array disk.

As shown in FIG. 40, the construction of FIG. 44 can be modified such that the single magnetic disk subsystems are replaced by the array disk subsystems. This modification is shown in FIG. 45. In FIG. 45, the magnetic disk subsystems of the I/O bus 0 are the array disk subsystems 300-0 to 300-6. As a result, the file access speed can be further raised. At this time, the array disk subsystems can be replaced on principle by arbitrary magnetic disk subsystems so that a construction other than that shown in FIG. 45 can be realized.

In the aforementioned embodiments having the plurality of I/O buses shown in FIGS. 44 and 45, the various functions of the present invention having been described in the embodiment having one I/O bus can be realized.

All of the I/O buses are equipped with the disconnect/reconnect functions, according to the present embodiment, so that a file access as quick as the array disk subsystem can be attained without using any expensive hardware merely by dividing and storing a file in the plurality of disk subsystems connected with the I/O bus to control the divided subfiles in a multiplex and parallel control by software. Moreover, the requestor can access the files distributed among the plurality of disks as if one disk subsystem were used. As a result, the computer system is capable of accessing the file at a high speed at a remarkably lower cost that the prior art. The number of disk subsystems can be increased one by one to extend the system flexibly because no special hardware is used.

A directory structure, as shown in FIG. 12, permits an application to function as if a file were stored in a single disk, without requiring the application to be aware that the file is divided and stored in a plurality of disks. FIG. 12 is a diagram showing the case in which file systems divided and stored in four disks are mounted in a directory /data. The file storage subsystems are mounted after directories .va00 and .va000 to .va003 necessary for mounting the four disks have been generated. If a file /data/file is accessed so that it may be opened, a corresponding relation between the file descriptors fd0 to fd3 of the individual subfiles file0 to file3 and the file descriptor vfd of a master file are written in file descriptor corresponding table 220. This file descriptor corresponding table is shown in FIG. 9. The file descriptor vfd of the master file is returned to the application. After this, the access can be achieved by using that file descriptor vfd without the application being aware of the divided storage of the file.

Figure 46:
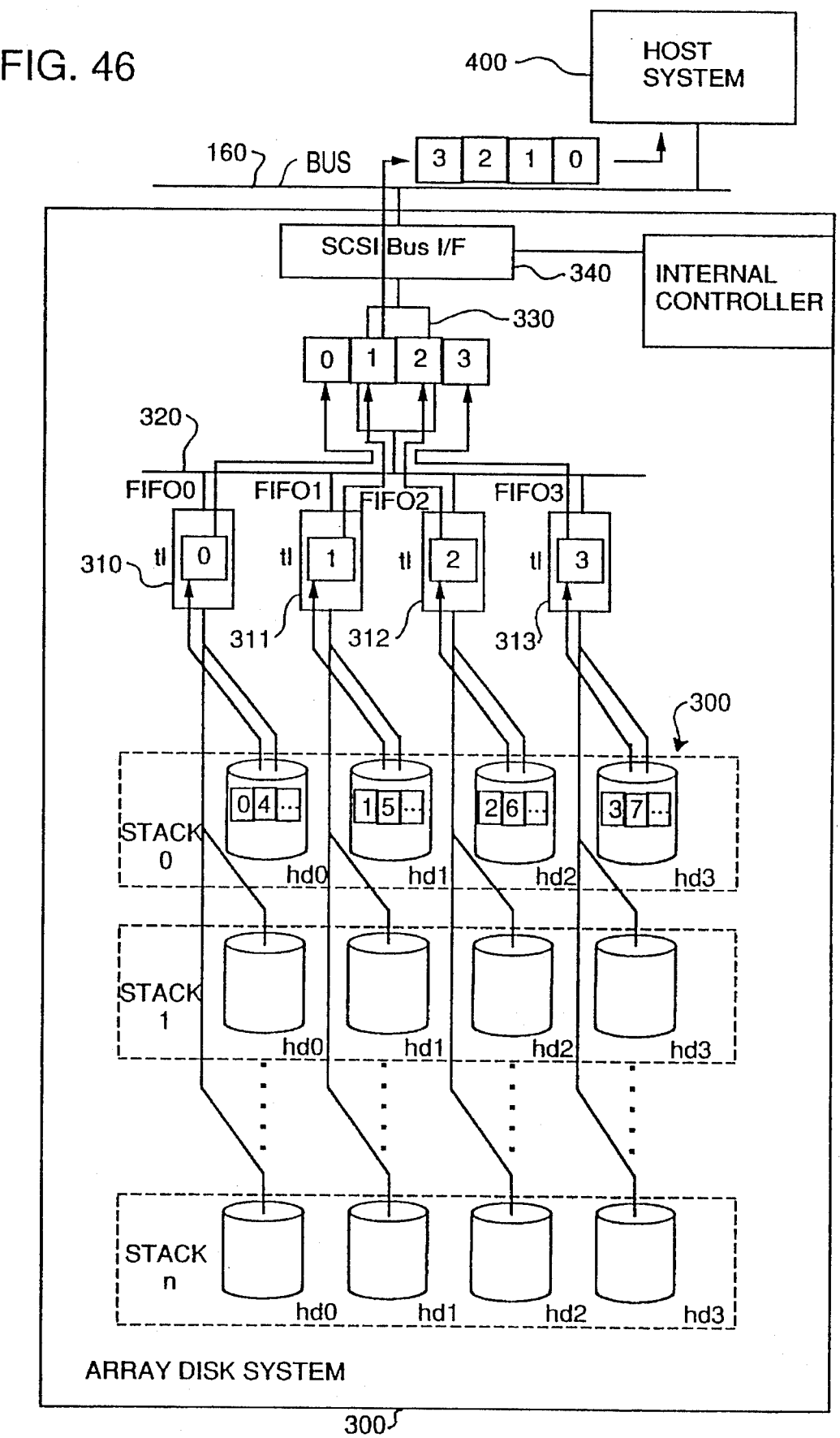
FIG. 46 is a diagram showing an array disk system useful in the analysis part of the present invention.

However, the correspondence between the master file and the subfiles is made by the descriptor so that the files are preferably opened first. File operation conducted without opening the file causes a problem. In case of a movement to a directory lower than /data in the directory structure of FIG. 12, there is a problem without an additional feature of the present invention that the movement is difficult without the application being aware of the divided storage of the file. The present invention also provides a directory structure of FIG. 51 without requiring the application to be aware of the divided storage in the file operation, by comprising a virtualized director acting as an interface for an application, and file management to provide correspondence between the files in the virtual directory and the subfiles in the subfile system of FIG. 46, which shows an example corresponding to the case of n magnetic disks subsystem, in which a file is divided into four. The number of divisions may be increased or decreased. Each file subsystem has 0 to n stacks of disk media.

Figure 47:
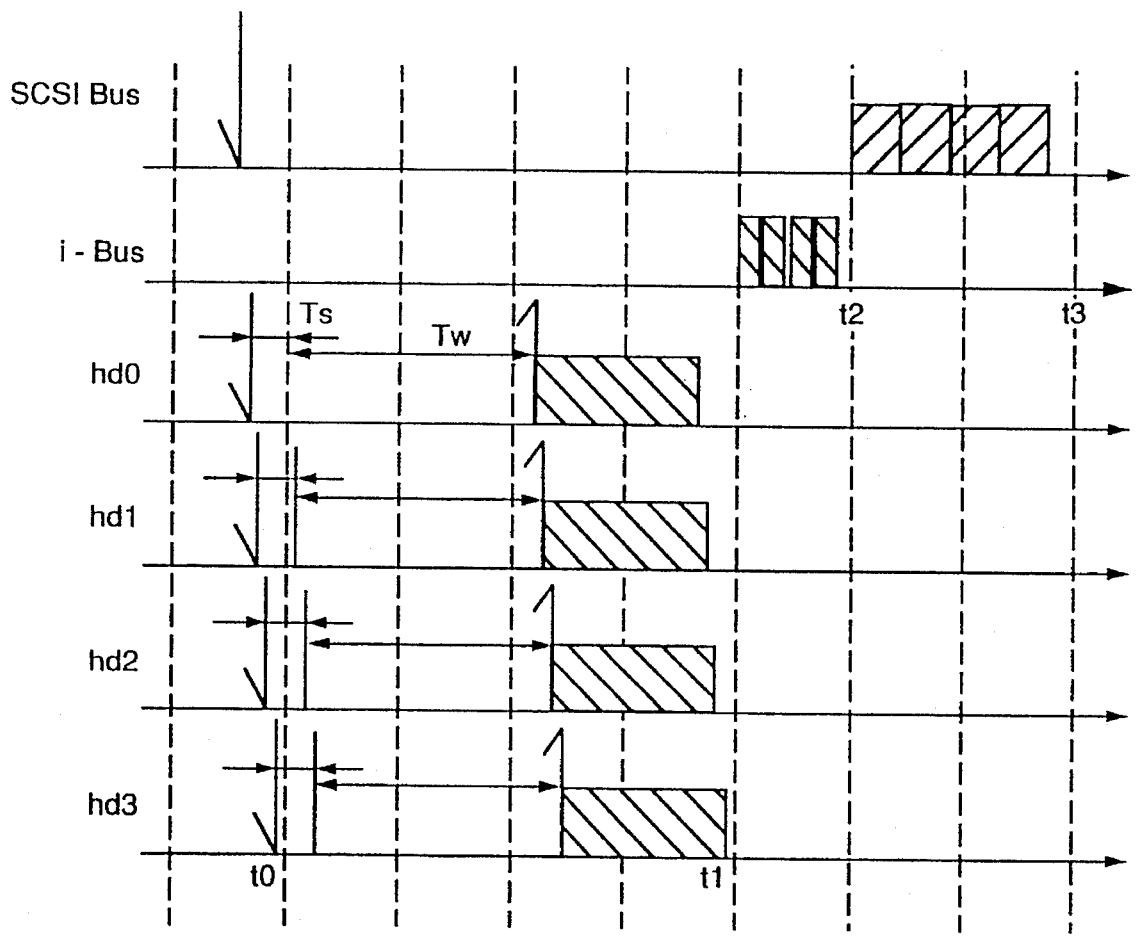
FIG. 47 Is a synchronized time chart of file reading for an array disk system useful in the analysis part of the present invention.
Figure 48:
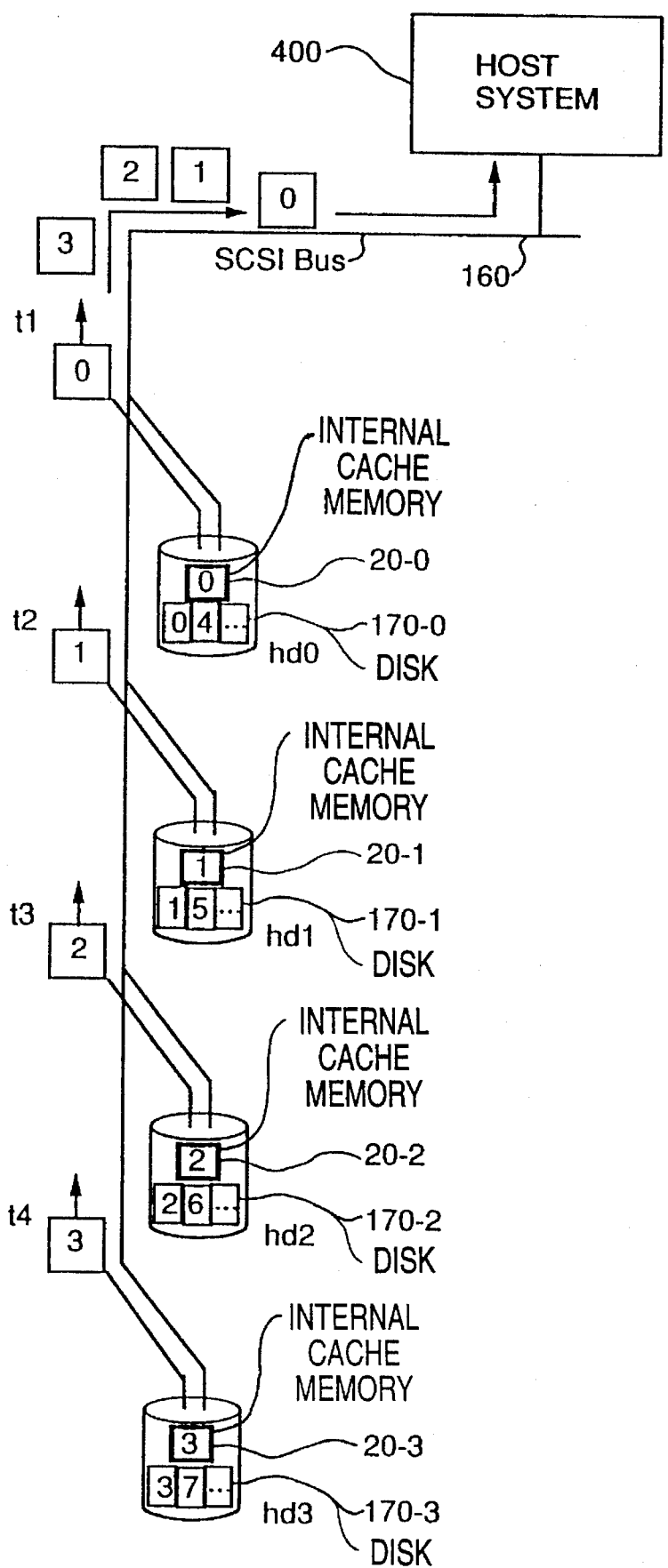
FIG. 48 is a diagram showing a principle of the present invention.
Figure 49:
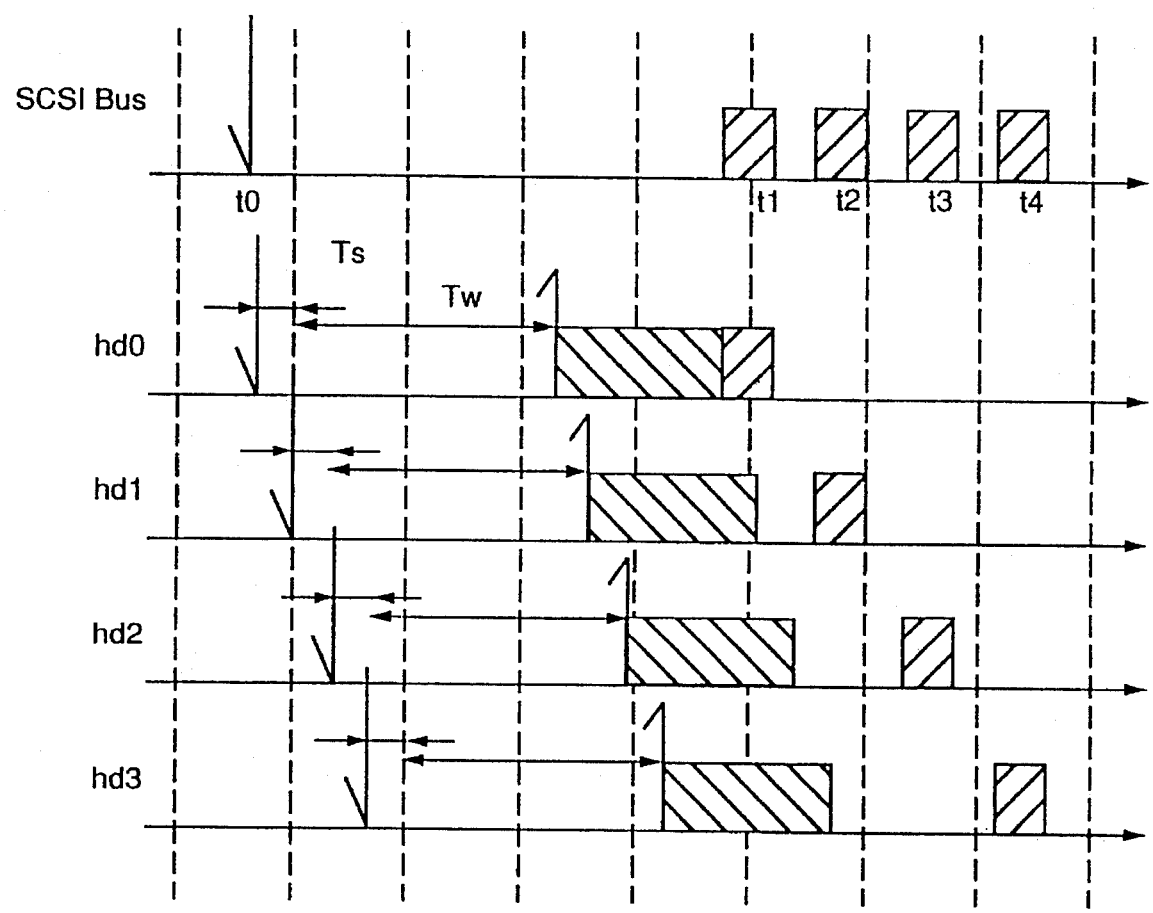
FIG. 49 is a file reading time chart for the present invention.
Figure 50:
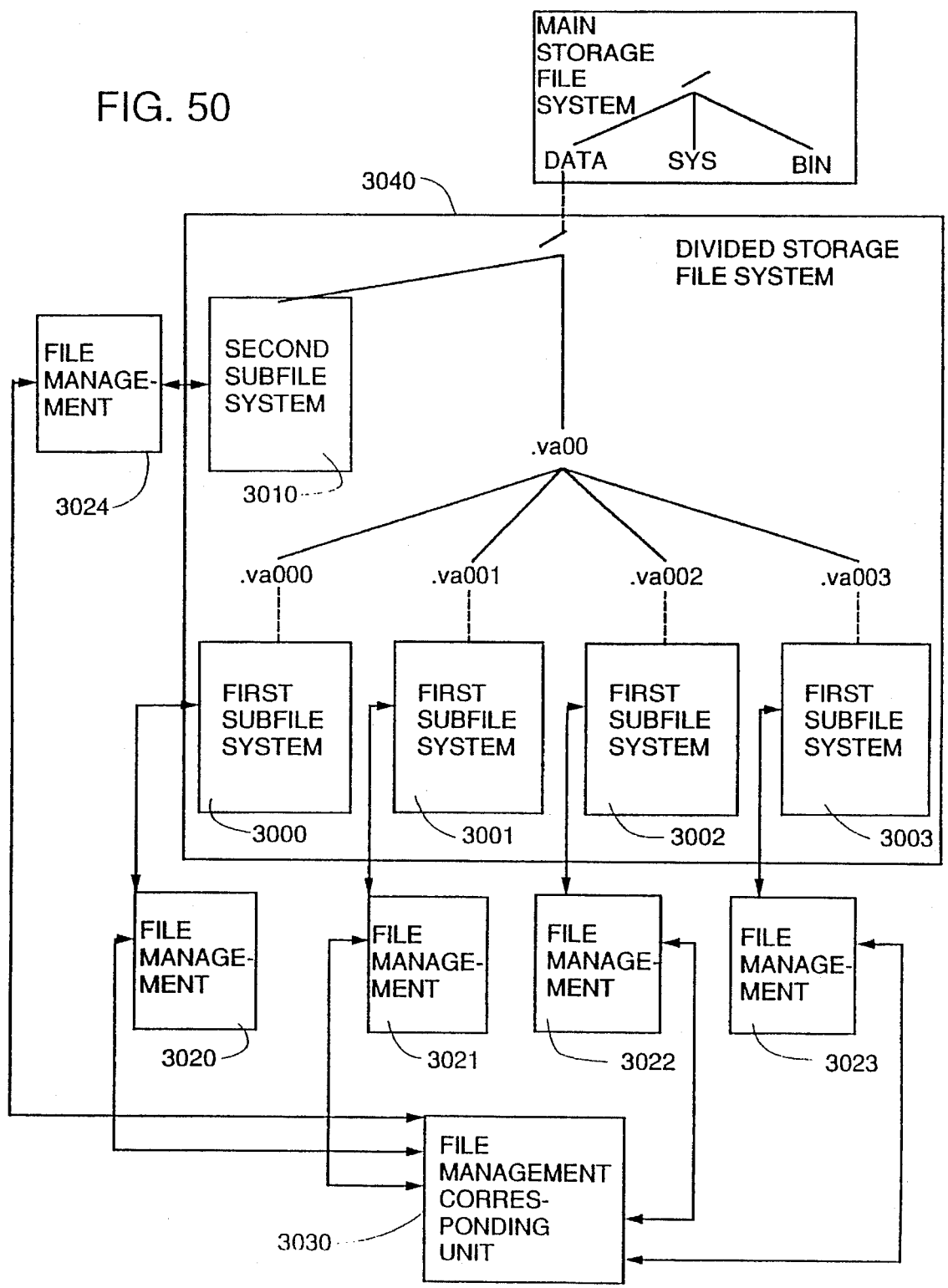
FIG. 50 is a principle diagram of the system of the present invention.
Figure 51:
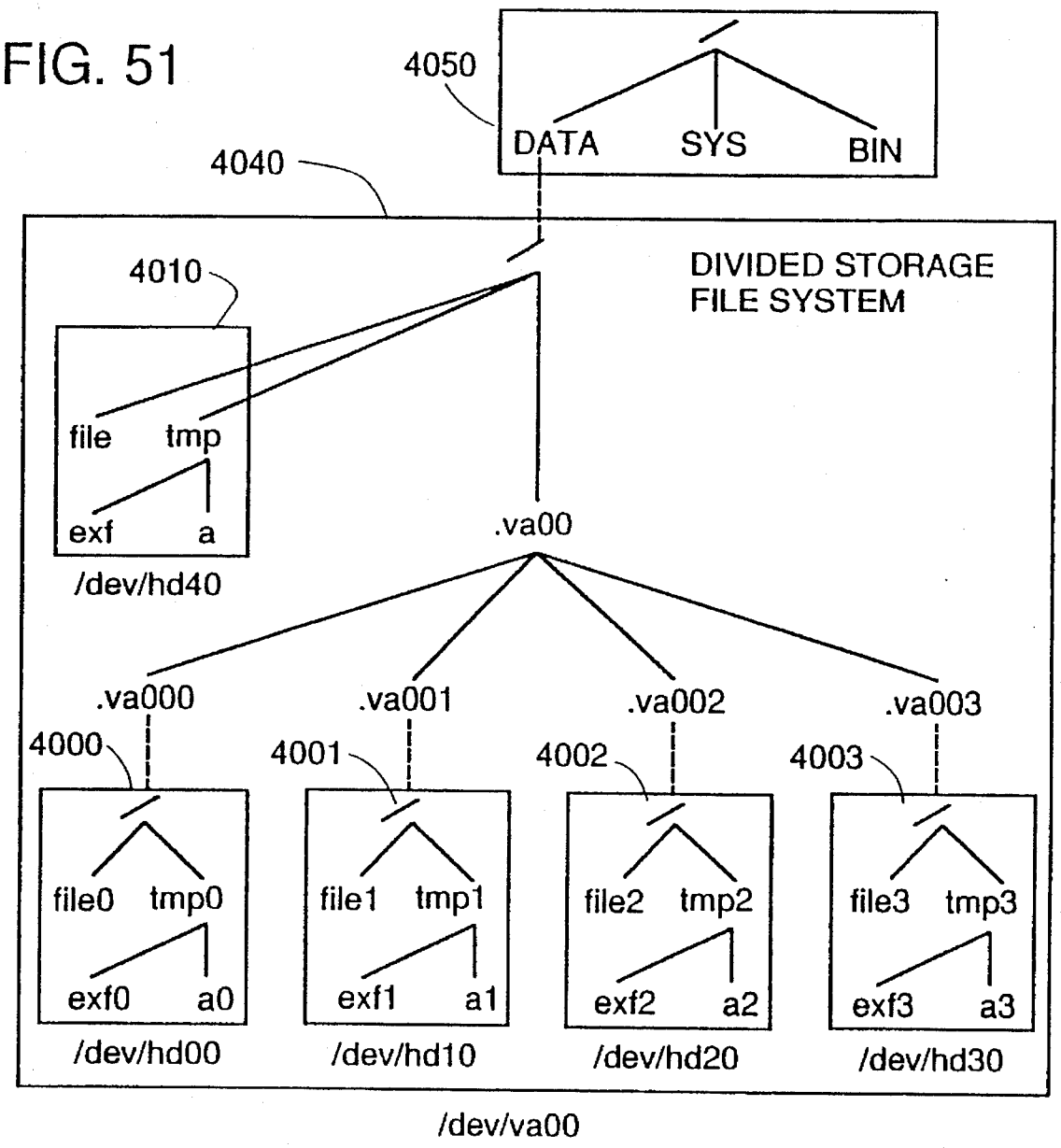
FIG. 51 is diagram showing a directory structure.
Figure 52:
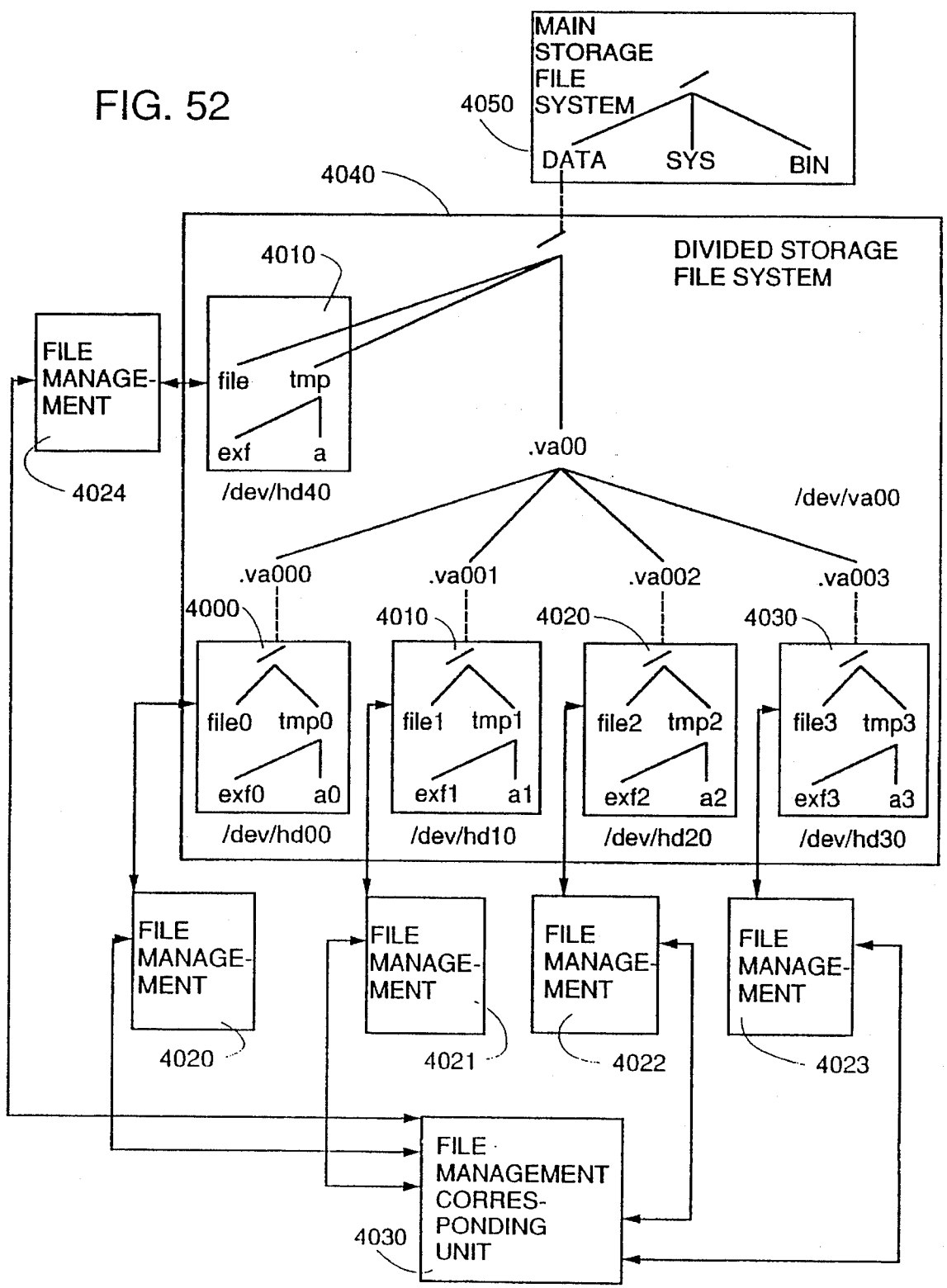
FIG. 52 is a diagram showing the directory structure of FIG. 51 including subfile corresponding management.

The present invention shown in FIG. 50 is constructed to comprise: first subfile systems 3000, 3001, 3002 and 3003 are units for dividing and storing a file for storage/retrieval with respect to a plurality of magnetic disks, which subfile systems are constructed as shown for system 3000 in FIG. 50 to have a directory structure of subfiles as shown in FIGS. 51 and 52, produced by dividing a master file; a second subfile system 3010 for providing a virtualized directory structure without requiring an application to be aware of the divided storage of the file; file management means 3020, 3021, 3022 3023 and 3024 for managing the individual subfiles of the second subfile system; and file management means corresponding means 3030 for managing the corresponding relation of the file management means of each subfile to a corresponding relation between the plurality of subfiles produced by dividing a single file. The system of FIG. 50 is similar to that shown in FIG. 46, where elements 300 and 3000 are different, for example and the second subfile system includes subfiles in registers tl FIF00 to FIF03 having data subfiles 0 to 3. The data is transferred on the internal bus i bus and the SCSI bus 160 as shown for read in FIG. 47.

The directory structure to be presented to the application is that of the second subfile system 3010, and its correspondence to the first subfile systems 3000 to 3003 or the substance of the divided and stored file is accomplished by the file management means 3020, 3021, 3022 3023 and 3024 and the file management means corresponding means 3030. The file management means 3020 to 3024 are always present at a file unit if a file is present in the divided storage file system 3040, no matter whether the file might be opened or not. At the same time, the file management means corresponding means 3030 for correspondence of the file management means of each subfile is assigned to each file. As a result, the corresponding relations between all the subfiles can be taken to accomplish the desired file operation at all times. By using the second subfile system 3010, moreover, movement in the directory structure can be accomplished absolutely like a conventional file system.

First, in the second subfile system 3010 for providing the virtual directory structure, a file to be accessed is designated by using a path name describing the hierarchy structure of a directory to reach the subject file. At this time, the directory in the second subfile system may be moved, if necessary.

Next, the file management means 3024 executes from the path name of the designated file to be operated. Moreover, the file management means corresponding means 3030 executes from the file management means 3024. As a result, there are obtained the file management means 3020 to 3023 of the subfiles or the subjects of the files stored in the first subfile systems 3000 to 3003. The file management means manages the attribute information of the files and the information of their storage positions on the disks for the subfiles.

As has been described hereinbefore, in the file system for dividing and storing a single file in a plurality of magnetic disk subsystems so as to realize a high speed file access, the directory structure which is virtualized making it unnecessary for the application to be aware that the file is divided.

Further details of the directory structure are shown in FIG. 51. A combination of FIGS. 50 and 51 is shown in FIG. 52.

In FIG. 52 a divided storage file system 440 is composed of four subfile systems 4000, 4001, 4002 and 4003 for storing subfiles and a single subfile system 410 for constructing a virtual directory. A route file system 4050 is for mounting the divided storage file system. File management tables 4020, 4021, 4022, 4023 and 4024 act as file management means and exist for each subfile of the divided storage file system. A file management table corresponding table 430 act as the file management means corresponding means is present for each file of the divided storage file system 4040.

The individual subfile systems 4000 to 4003 and 4010 of the divided storage file system 4040 are assigned to the individual disks. In the present embodiment, the route directory of the subfile system 4010 or the virtual directory is also used as the route directory of the divided storage file system. Directories .va00 and .va000 to .va003 for mounting the subfile systems 4000 to 4003 for storing the subfiles are generated on the basis of the route directory to mount the individual subfile systems. The divided storage file system 4040 is mounted in the /data directory of the route file system 4050. The broken lines appearing in the drawing indicate the mounting of the directory.

Figure 53:
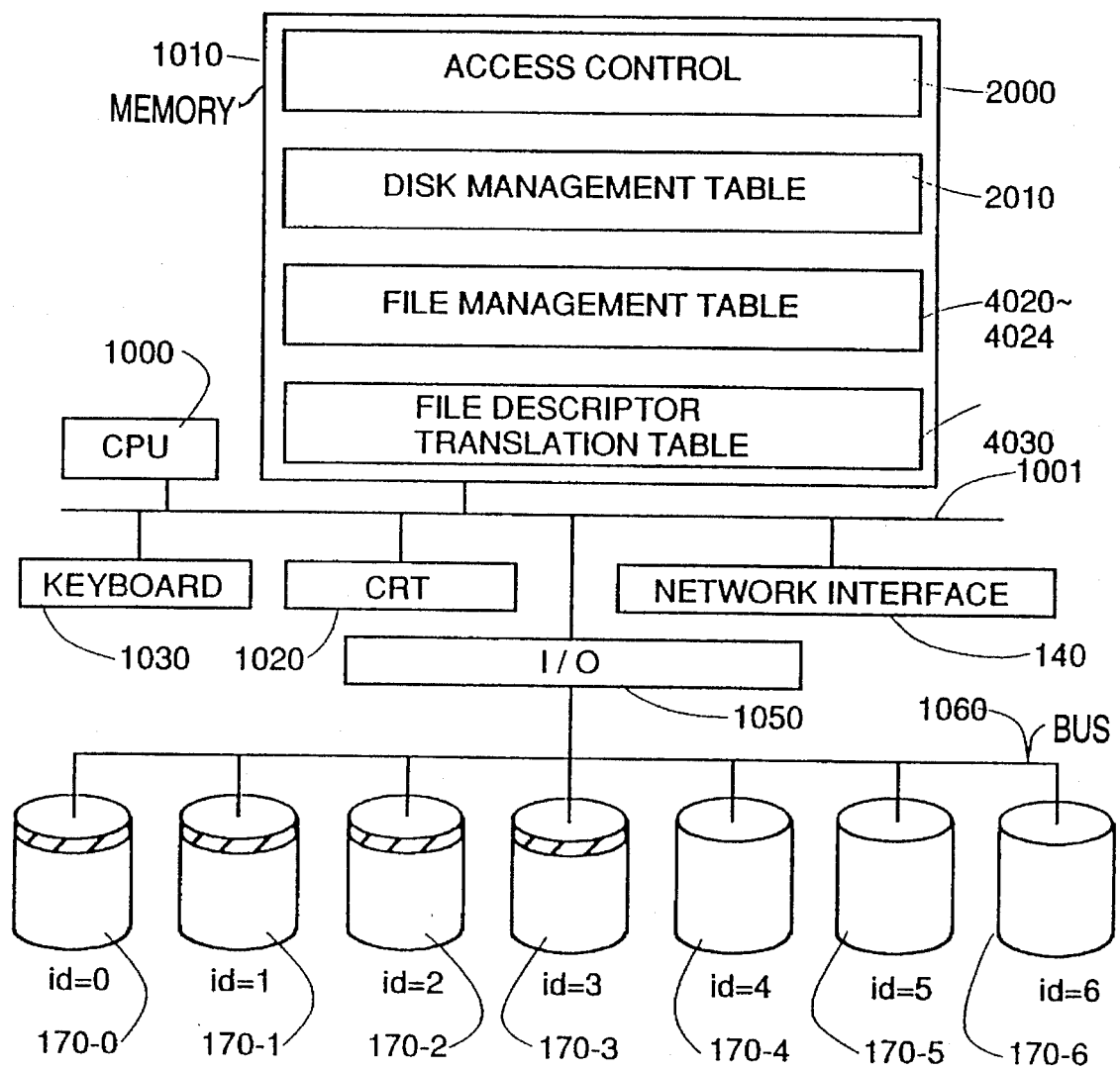
FIG. 53 is a diagram showing a construction of a computer system.

The construction of the computer system for managing and operating the file stored in that divided storage file system is further shown in FIG. 53. This computer system is constructed to include: CPU 1000, memory 1010, CRT display 1020, keyboard 1030, network interface 1040, and I/O bus interface 1050, all of which are connected with processor bus 1001; I/O bus 1060 connected with I/O bus interface 1050; and magnetic disk subsystems 1070-0 to 1070-6 connected with the I/O bus 1060. The memory stores means for managing and operating with access control program 200, disk management table 2010, the file management tables 4020 to 4024, and the file management table corresponding table 4030. The file management and operation of the divided storage file system are accomplished by the access control program 2000 with reference to the individual tables as previously described.

One example of the construction of the disk management table 2010 is shown in FIG. 54. This disk management table is stored with information concerning what partition of what magnetic disk subsystem is used to construct the magnetic virtual array subsystem, also referred to as the "VA system".

Specifically, the matrix between the id number of name of the magnetic disk subsystem and the partition number indicates what logical disk subsystem is combined to define the "logical virtual array disk subsystem".

In case five magnetic disk subsystems named hd0 to hd4 are defined as a virtual array disk subsystem va0 so that their 0-th partition is used as the logical virtual array disk subsystem va00, as shown in FIGS. 51 or 52, the subsystems va000 to va004 are used as discriminators and written, as shown in FIG. 54. The 0-th partition of the magnetic disk subsystems hd0 to hd4 is defined as the logical virtual array disk subsystem va00.

If the logical virtual array disk subsystem va00 is mounted by setting the disk management table 2010 thus far described, the 0-th partition of the four magnetic disk subsystems hd0 to hd3 can be used as the storage subsystem of the divided storage file system.

Figure 55:
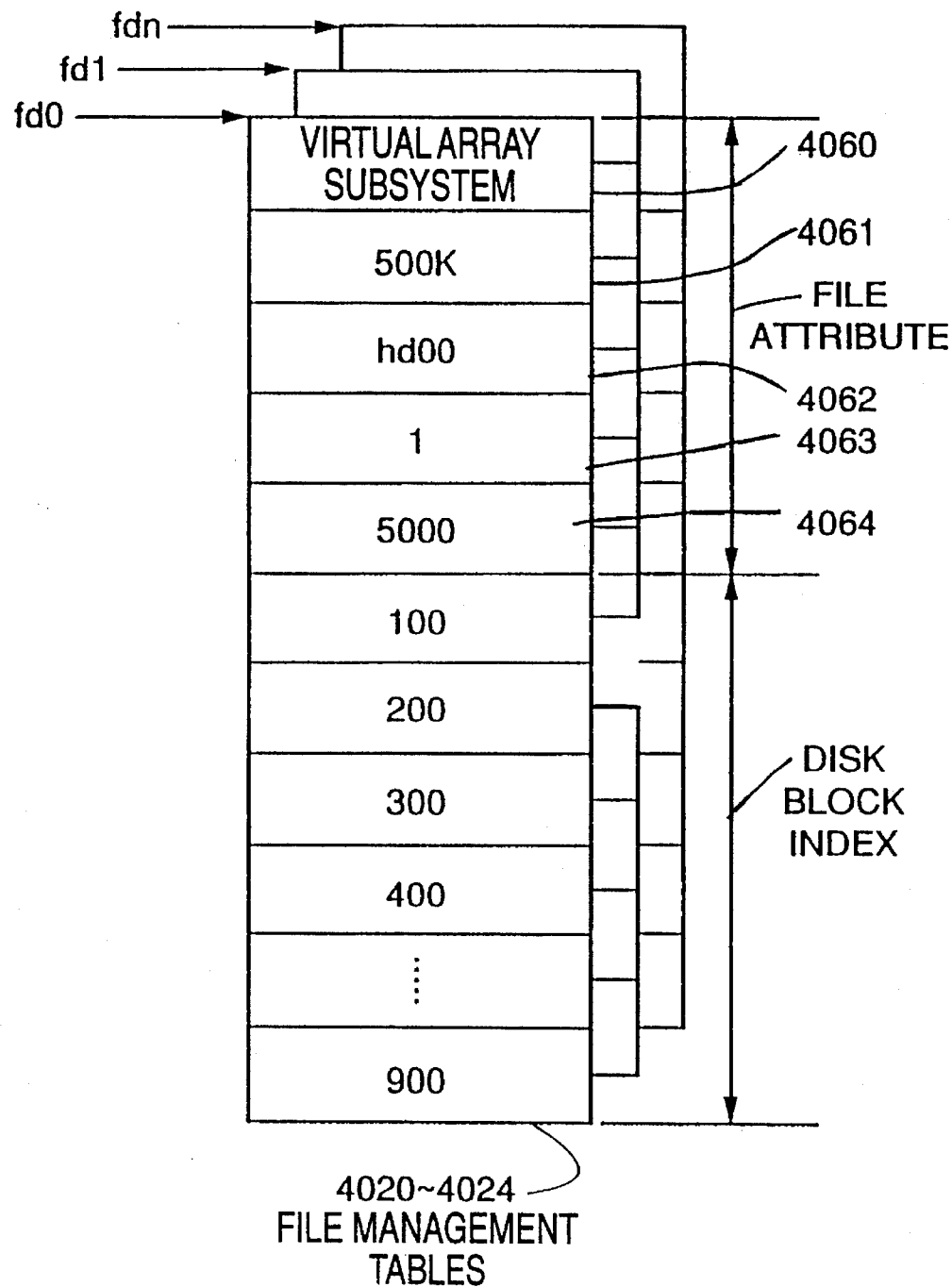
FIG. 55 shows an example of a file management table.

Next, one example of the construction of the file management tables 4020 to 4024 is shown in FIG. 55. The file management table is composed of a file attribute and a disk block index. The file attribute is composed of: a file type entry 4060 for storing a file type to indicate if the file belongs to the divided storage file system; a file size entry 4061 for storing a file size; a storage device entry 4062 for indicating a stored magnetic disk subsystem; a striping block entry 4063 for indicating the number of data blocks of the division size as a unit when the file is to be striped; and a table pointer entry 4064 stores a pointer in the file management table. The disk block index is stored with the block number indicating the position on the magnetic disk subsystem indicating the stored device entry in which the data blocks composing the subfile area are present. At the file access time, therefore, the storage device entry 4062 and the disk block index are referred to. Moreover, the table pointer entry 4064 stores either the number capable of designating the file management table corresponding table 4030 uniquely or the storage address in the memory so that the file management table corresponding table 4030 can be referred to by using that number.

Both the file in the subfile system 4010 constructing the virtual directory and the file in the subfile systems 4000 to 4003 for storing the subject of the file have a file management table like that shown in FIG. 54. Since, however, no subject of the file corresponding to the file management table 4024 is present in the subfile system 4010 constructing the virtual directory, the disk block index is not used in this case.

One example of the construction of the file management table corresponding table 4030 to be referred to from the file management table is shown in FIG. 56. The file management table corresponding table 4030 holds the corresponding relation between the file management tables of the individual files which are divided from the single file. Specifically, the discriminators of the file management table of the individual subfiles are consecutively stored for one line, as shown in FIG. 56. The subfile in the virtual directory 4010 of FIG. 51 is one which can be seen from an application and is stored consecutively with a file management table discriminator vfd of the data file and file management table discriminators fd0, fd1, fd2 and fd3 data subfiles. The file management table discriminators can be used either a number times capable of designating a specific file uniquely from the file management table in the system or the storage address in the memory of the file management table.

Next, with reference to FIG. 52, in the subfile system 4010 (/dev/hd40) a file is designated by using a path name describing the hierarchy structure of the directory reaching the subject file. A this time, the directory in the subfile system 4010 may be moved, if necessary. The file management table 4245 is obtained from the path name of the designated file. FIG. 52 shows an example at the time of accessing the /data/file. The file management table corresponding table 4030 is obtained with reference to the table pointer entry 4064 of the file management table 4024. The file management table corresponding table 4030 stores the file management table discriminators of the subfiles file 0, file 1, file 2 and file 3 in the subfile systems 4000 to 4003 (/dev/hd00, /dev/hd10, /dev/hd20 and /dev/hd30) storing the divided file. The file management tables 4020 to 4023 of the subfiles are obtained from that file management table discriminators. The file management tables manage the attribute information of the subfiles and the information of the stored position on the disk of the subfiles.

Since all the subfiles can be related by the procedures thus far described, not only the file operations of generating, deleting and moving the files /data/file for the virtual director 410 but also the directory operation of generating and deleting the directory /data/tmp can be likewise effected even for the directories of the subfile systems 4000 to 4003 for storing the file. As a result, the directory structures of all the subfiles can be held identical to operate and manage the whole divided storage file system 4040 using the virtual directory as the interface.

Moreover, by accessing the subfiles /data/file 0 to /data/file 3 consecutively from the file management tables 4020 to 4023 at the reading/writing times, the files in the virtual directory can be used as if they were continuously stored in a single disk.

An application program can be utilized without any correction even if the ordinary file system stored in one magnetic disk subsystem were replaced by an array file system for the divided storage.

Figure 57:
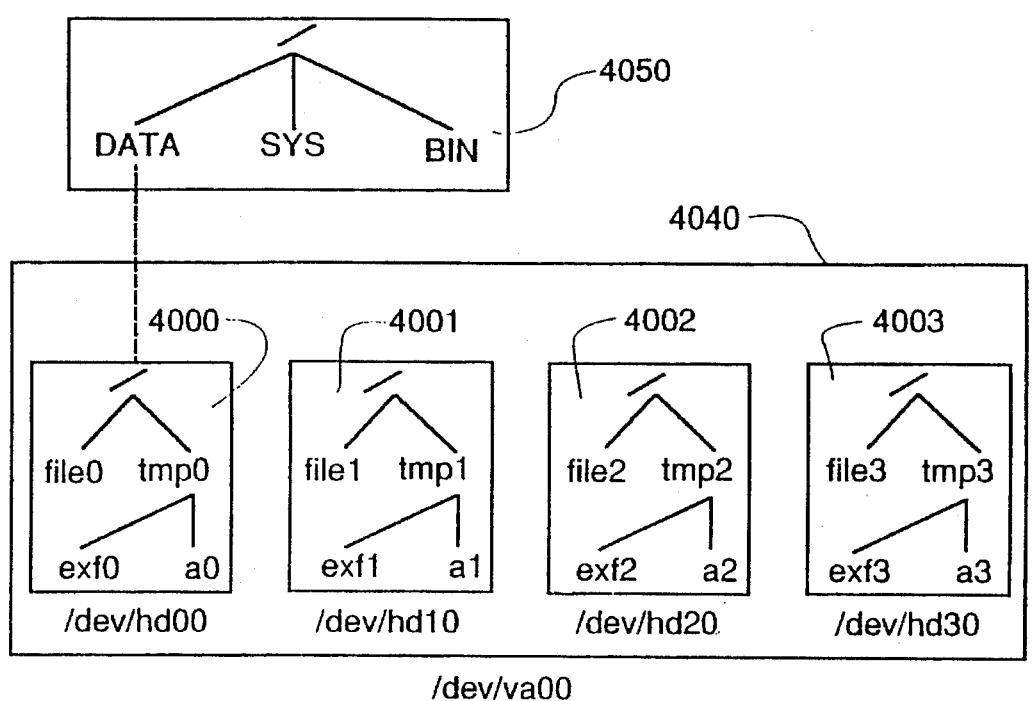
FIG. 57 is a diagram showing a simplified version of the directory structure of FIG. 51.
Figure 58:
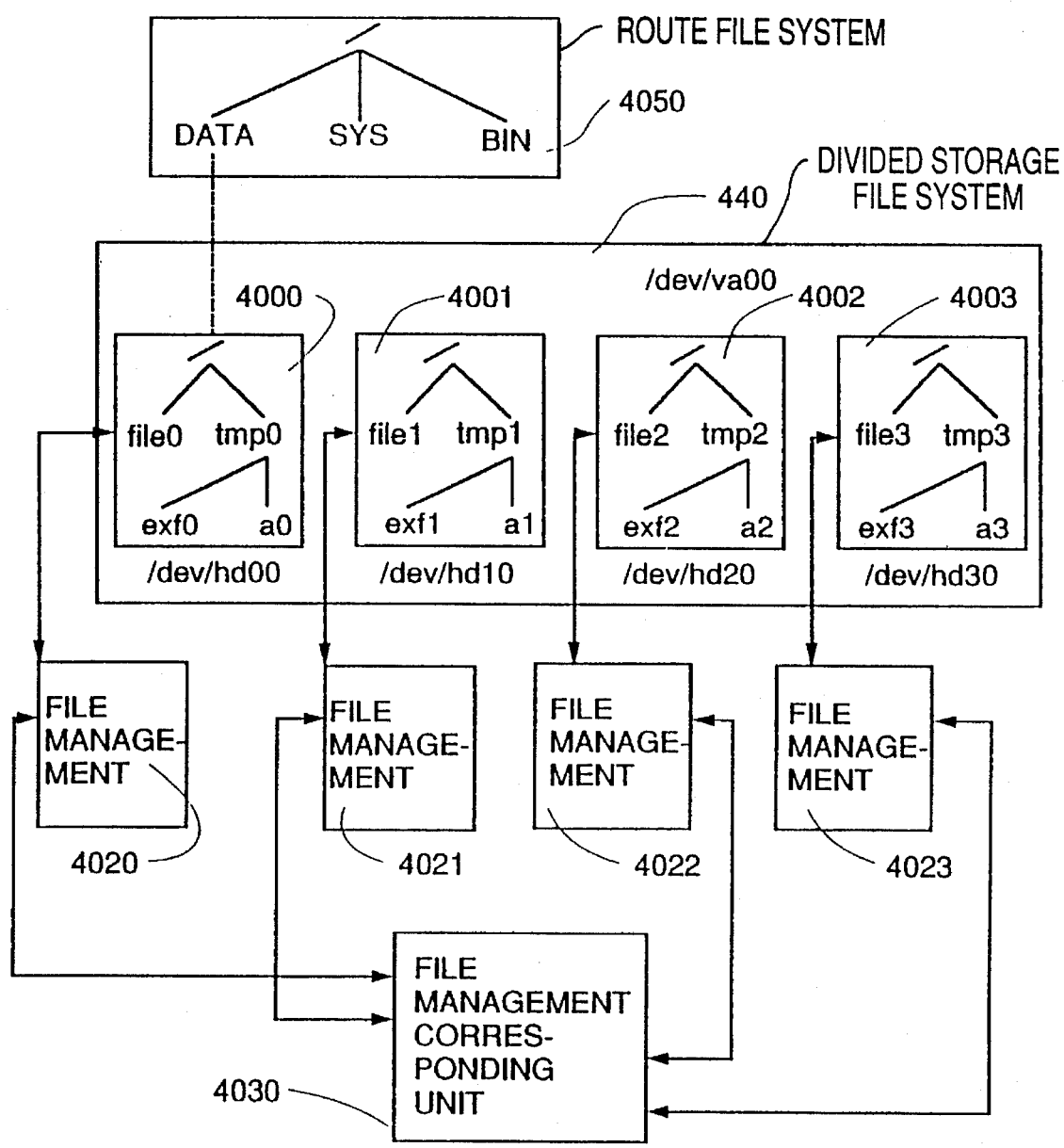
FIG. 58 is a diagram showing the directory structure of FIG. 57 including subfile corresponding management.

In a basic directory structure according to FIG. 57, the relations to the directory structure in case the file management table is used as the file management means and in case the file management table corresponding table is used as the file management corresponding means are shown in FIG. 58. Broken lines appearing in FIG. 58 indicate the mounting of the directory. One subfile system 4000 storing the subject of a file is also used as the virtual directory. At the time of mounting on the route file system 4050, only the subfile system dev/hd00 is mounted. At this time, it can be known from the disk management table that the subfile systems /dev/hd10, /dev/hd20 and /dev/hd30 are simultaneously used. The operation and management for the virtual directory are accomplished as in the ordinary file system, but the corresponding relations to the other unmounted subfile systems 4001, 4002 and 4003 are accomplished by using the file management tables 4020 to 4023 and the file management table corresponding table 4030 as previously explained.

One example of the file management table corresponding table is shown in FIG. 59. Like the example shown in FIG. 56, the discriminators of the file management table of each subfile are consecutively stored in each line. Specifically, there are consecutively stored the file management table discriminator vfd of the file seen from the application, and shared with the virtual directory, and the file management table discriminators fd0, fd1 and fd2 of the subfiles. As a result, the divided storage file system 440 can be operated and managed by using the virtual directory as the interface.

The application program can be used without any correction even if the ordinary file system stored in one magnetic disk subsystem were replaced by the file system for the divided storage.

While a preferred embodiment has been set forth with specific details, further embodiments, modifications and variations are contemplated according to the broader aspects of the present invention, all as determined by the spirit and scope of the following claims.

We claim:

1. In a method of operating a storage array system comprising storage subsystems connected on a bus to a computer system through individual disconnect reconnect units, a method of conducting a read cycle, the method comprising the steps of:

issuing a plurality of read instructions respectively for a plurality of the storage subsystems, serially over the bus;

operating the disconnect reconnect units to serially connect the storage subsystems for receiving respective read instructions;

in response to receipt of the read instructions in the storage subsystems, respectively, operating the disconnect reconnect units for disconnecting the respective storage subsystems;

after disconnecting each of the storage subsystems, accessing data corresponding to the read instructions in the corresponding ones of the storage subsystems;

reconnecting the corresponding storage subsystem to the bus through the corresponding disconnect reconnect unit and thereafter transferring the data corresponding to the read instruction from the corresponding storage subsystem to the bus; and controlling all of said steps so that said accessing data step for each storage subsystem is conducted in parallel with other operations of the storage subsystems.

2. The method of claim 1, wherein said step of accessing data is conducted, at least in part, with the storage subsystems by transferring data from disk storage media to an internal cache of said storage subsystems.

3. The method of claim 1, wherein said step of issuing issues the read instructions serially in a fixed order and said step of transferring is conducted in a different fixed order of the storage subsystems.

4. The method of claim 1, further including steps of:

receiving a read request for a data file; and dividing the read request for the data file into the plurality of read instructions for data subfiles that would together constitute the data file.

5. The method of claim 4, wherein said step of receiving receives the read request as a request to a single logical storage for a logical data file; and said step of dividing divides the read request into the read instructions for a plurality of virtual storages corresponding to specific storage portions of the storage subsystems.

6. The method of claim 5, further including:

receiving the data subfiles from the storage subsystems over the bus and rearranging a received order to correspond to order of said issuing of the read instructions for assembling the data file; and transferring the data file to a requester as the data file from the single logical storage according to the read request.

7. The method of claim 4, wherein said step of dividing divides the read request into a plurality of read instructions greater in number than the greatest number of read instructions processed in a single read cycle;

repeating the read cycle a plurality of times sufficient to process all of the read instructions comprising the read request; and conducting adjacent read cycles in time overlapping, partially parallel, operation.

8. The method of claim 7, wherein said step of receiving receives the read request in the form of a request to a single logical storage for a logical data file;

said step of dividing divides the read request into the read instructions for a plurality of virtual storages corresponding to specific storage areas of the storage subsystems;

receiving the data subfiles transferred from the storage subsystems over the bus and rearranging a received order to correspond to order of said issuing of the read instructions for assembling the data file; and transferring the data file to a requester as the data file from the single logical storage according to the read request.

9. The method of claim 1, further including:

repeating all of said steps for another read request; and in response to a length of a data file of the another read request with respect to the length of the data file of the first mentioned read request, changing a number of storage subsystems to which read instructions are issued in each read cycle for the another read request relative to the first-mentioned read request.

10. The method of claim 1, further including:

conducting seek and latency with respect to reading magnetic disk media within each storage subsystem during a time period that the corresponding storage subsystem is disconnected from the bus.

11. The method of claim 10, further including:

issuing to the bus a reconnect request from each storage subsystem when the storage subsystem has completed the seek and latency so that elapsed time between disconnect and reconnect requests is independently established by each storage subsystem; and sending control over the bus by the computer system for operating the individual disconnect reconnect units to reconnect respective storage subsystems in an order of receipt of reconnect requests so that the data subfiles are received by the computer system in a same or a different order of said issuing of the read instructions.

12. The method of claim 1, wherein the computer system rearranges an order of the data subfiles from an order of receipt to an order of said issuing of the read instructions to make up the data file.

13. The method of claim 1, wherein said accessing includes seek and latency with respect to a disk.

14. The method of claim 1, wherein said accessing includes transfer of data from a disk media to internal cache memory of said storage subsystems.

15. The method of claim 14, further including steps of:

receiving a read request for a data file; and dividing the read request for the data file into the plurality of read instructions for data subfiles that would together constitute the data file.

16. The method of claim 15, further including:

conducting seek and latency with respect to reading magnetic disk media within each storage subsystem during a time period that the corresponding storage subsystem is disconnected from the bus.

17. The method of claim 16, wherein said step of receiving receives the read request as a request to a single logical storage for a logical data file; and said step of dividing divides the read request into the read instructions for a plurality of virtual storages corresponding to specific storage areas of the storage subsystems.

18. The method of claim 17, further including:

issuing to the bus a reconnect request from each storage subsystem when the storage subsystem has completed the seek and latency so that elapsed time between disconnect and reconnect requests is independently established by each storage subsystem; and sending control over the bus by the computer system for operating the individual disconnect reconnect units to reconnect respective storage subsystems in an order of receipt of reconnect requests so that the data subfiles are received by the computer system in a same or a different order of said issuing of the read instructions.

19. In a method of operating a storage array system comprising a plurality of storage subsystems connected on a bus to a computer system, a method of conducting one of a read cycle and a write cycle, the method comprising the steps of:

receiving one of a write and a read request as a request to a single logical storage with respect to a data file;

dividing the request to a single logical storage into a plurality of instructions for a plurality of virtual storages corresponding to the storage subsystems with respect to a plurality of data subfiles;

issuing the plurality of instructions respectively to a plurality of the storage subsystems, serially over the bus;

accessing a data corresponding to one of the instructions in each of the corresponding storage subsystems;

transferring the data corresponding to the instruction from the corresponding storage subsystem to the bus; and combining the data to provide the data file in response to the request.

20. The method of claim 19, wherein said steps are conducted with the storage subsystems as disk storage subsystems having disk media as main memory and an internal cache of the storage subsystems as auxiliary memory.

21. The method of claim 19, wherein said step of issuing issues the instructions serially in a fixed order and said steps of transferring are conducted in a different fixed order of the storage subsystems.

22. The method of claim 19, wherein the bus is an SCSI bus.

23. The method of claim 19, further including:

receiving the data from the storage subsystems and rearranging a received order to correspond to an order of said issuing of the instructions, for assembling the data file; and transferring the data file to a requester as the data file according to the read request.

24. The method of claim 19, wherein said step of dividing divides the request to a single logical storage into a plurality of instructions greater in number than a greatest number of instructions processed in a single cycle;

repeating the cycle a plurality of times sufficient to process all of the instructions comprising the request; and conducting adjacent cycles in time overlapping, partially parallel, operation.

25. The method of claim 19, further including repeating all of said steps for another request and in response to the length of the data file of the another request with respect to a length of the data file of the first mentioned request, changing a number of storage subsystems to which instructions are issued in each cycle.

26. The method of claim 19, wherein the computer system rearranges an order of the data subfiles from an order of receipt to an order of said issuing of the instructions to make up the data file.

27. The method of claim 19, wherein said accessing is conducted between disk media and an internal cache of the storage subsystems;

receiving the subfiles from the storage subsystems and rearranging a received order to correspond to an order of said issuing of instructions for assembling the data file; and transferring the data file to a requester as the data file according to the request.

28. The method of claim 27, wherein said step of dividing divides the request into a plurality of instructions greater in number than a greatest number of instructions processed in a single cycle;

repeating the cycle a plurality of times sufficient to process all of the instructions comprising the request; and conducting adjacent cycles in time overlapping, partially parallel, operation.

29. The method of claim 27, further including repeating all of said steps for another request and in response to a length of the data file of the another request with respect to the length of the data file of the first mentioned request, changing a number of storage subsystems to which read instructions are issued in each cycle.

30. The method of claim 29, wherein said step of dividing divides the request into a plurality of instructions greater in number than a greatest number of instructions processed in a single cycle;

repeating the cycle a plurality of times sufficient to process all of the instructions comprising the request; and conducting adjacent cycles in time overlapping, partially parallel, operation.

31. In a method of operating a storage array system comprising storage subsystems connected on a bus to a computer system through individual disconnect reconnect units, a method of conducting a write cycle, the method comprising the steps of:

issuing a plurality of write instructions respectively for a plurality of the storage subsystems, serially over the bus;

operating the disconnect reconnect units to serially connect the storage subsystems for receiving respective write instructions;

in response to receipt of the write instructions in the storage subsystems, respectively, operating the disconnect reconnect units for disconnecting the respective storage subsystems;

after disconnecting each storage subsystem, writing data corresponding to ones of the write instruction in the corresponding storage subsystem, and thereafter sending a write end message to the bus; and controlling all of said steps so that said writing step for each storage subsystem is conducted in parallel with other operations of the storage subsystems.

32. The method of claim 31, wherein said writing is conducted between disk media and an internal cache of the storage subsystems.

33. The method of claim 32, further including steps of:

receiving a write request for a data file; and dividing the write request for the data file into the plurality of write instructions for data subfiles that would together constitute the data file.

34. The method of claim 31, further including steps of:

receiving a write request for a data file; and dividing the write request for the data file into the plurality of write instructions for data subfiles that would together constitute the data file.

35. The method of claim 34, wherein said step of receiving receives the write request as a request to a single logical storage for a single fixed data file; and said step of dividing divides the write request into the write instructions for a plurality of virtual storages corresponding to the storage subsystems.

36. The method of claim 34, wherein said step of dividing divides the write request into a plurality of write instructions greater in number than a greatest number of write instructions processed in a single write cycle;

repeating the write cycle a plurality of times sufficient to process all of the write instructions comprising the write request; and conducting adjacent write cycles in time overlapping, partially parallel, operation.

37. The method of claim 31, further including repeating all of said steps for another write request and in response to a length of the data file of the another write request with respect to a length of the data file of the first mentioned write request, changing the number of storage subsystems to which write instructions are issued in each write cycle.

38. The method of claim 31, further including:

conducting seek and latency with respect to writing magnetic disk media within each storage subsystem during a time period that the corresponding storage subsystem is disconnected from the bus.

39. The method of claim 38, further including:

issuing to the bus a write end message from each storage subsystem when the storage subsystem has completed the seek and latency so that the time between disconnect and reconnect is independently established by each storage subsystem; and reconnecting respective storage subsystems in an order of receipt of write end messages.

40. The method of claim 31, wherein said writing includes seek and latency with respect to a disk.

41. The method of claim 35, wherein said step of dividing divides the request to a single logical storage into a plurality of write instructions greater in number than a greatest number of write instructions processed in a single write cycle;

repeating the write cycle a plurality of times sufficient to process all of the write instructions comprising the write request; and conducting adjacent write cycles in time overlapping, partially parallel, operation.

42. The method of claim 41, further including repeating all of said steps for another write request and in response to a length of the data file of the another write request with respect to a length of the data file of the first mentioned write request, changing a number of storage subsystems to which write instructions are issued in each write cycle.

43. The method of claim 41, further including:

conducting seek and latency with respect to writing magnetic disk media within each storage subsystem during a time period that the corresponding storage subsystem is disconnected from the bus.

44. The method of claim 35, further including repeating all of said steps for another write request and in response to a length of the data file of the another write request with respect to a length of the data file of the first mentioned write request, changing a number of storage subsystems to which write instructions are issued in each write cycle.

45. The method of claim 35, further including:

conducting seek and latency with respect to writing magnetic disk media within each storage subsystem during a time period that the corresponding storage subsystem is disconnected from the bus.

46. The method of claim 45, further including repeating all of said steps for another write request and in response to a length of the data file of the another write request with respect to a length of the data file of the first mentioned write request, changing a number of storage subsystems to which write instructions are issued in each write cycle.

47. The method of claim 19, wherein the first mentioned request is a first write request;

further including repeating all of said steps with respect to a second write request; and wherein said accessing for the first write request is conducted with respect to different storage subsystems than with respect to a second write request.

48. The method of claim 19, further including repeating all of said steps under control of the computer system with respect to a different bus, different storage subsystems and different disconnect reconnect units connected to the different bus, with respect to a second request from a requester that provided the first mentioned request, when the first mentioned request and second request refer to a common single storage subsystem.

49. The method of claim 19, further including thereafter providing extended storage by adding additional storage subsystems to the bus;

thereafter conducting all of the steps, except said providing, for a read request with respect to data stored prior to said step of providing and without taking into consideration the additional storage subsystems; and repeating all of the steps, except said providing and conducting, with respect to a write request for storing data at least partially in the additional storage subsystems added by said step of providing, so that said step of providing is transparent to a requester issuing the one of the read and write requests.

50. The method of claim 19, further including:

in response to a write request, setting a table with correspondence between a file descriptor in the write request and subfile descriptors of a virtual array of the storage subsystems;

in response to a read request, accessing the table with a file descriptor of the read request and providing from the table corresponding subfile descriptors for the virtual array; and wherein said issuing issues read instructions respectively for the subfile descriptors, so that structure of the virtual array is transparent to a requester requesting the one of the read and write requests.

* * * * *